US012185335B2

(12) United States Patent
Ang et al.

(10) Patent No.: US 12,185,335 B2
(45) Date of Patent: *Dec. 31, 2024

(54) DOWNLINK CONTROL INFORMATION SIGNALING SCHEMES FOR BANDWIDTH PART SWITCHING

(71) Applicant: QUALCOMM Incorporated, San Diego, CA (US)

(72) Inventors: Peter Pui Lok Ang, San Diego, CA (US); Peter Gaal, San Diego, CA (US); Wanshi Chen, San Diego, CA (US); Alexei Yurievitch Gorokhov, San Diego, CA (US); Jing Sun, San Diego, CA (US); Joseph Binamira Soriaga, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,800

(22) Filed: Apr. 10, 2023

(65) Prior Publication Data

US 2023/0232413 A1 Jul. 20, 2023

Related U.S. Application Data

(63) Continuation of application No. 17/235,487, filed on Apr. 20, 2021, now Pat. No. 11,582,787, which is a (Continued)

(51) Int. Cl.
*H04W 4/00* (2018.01)
*H04L 5/00* (2006.01)
(Continued)

(52) U.S. Cl.
CPC ........... *H04W 72/23* (2023.01); *H04L 5/0053* (2013.01); *H04L 5/0096* (2013.01); *H04W 28/06* (2013.01);
(Continued)

(58) Field of Classification Search
CPC ............ H04W 72/23; H04W 72/0446; H04W 72/0453; H04W 72/1263; H04L 5/0053; H04L 5/0096; H04L 5/0098
See application file for complete search history.

(56) References Cited

U.S. PATENT DOCUMENTS 8,582,592 B2   11/2013   Gorokhov et al.
10,993,254 B2   4/2021   Ang et al.
(Continued)

FOREIGN PATENT DOCUMENTS

CN   102771098 A   11/2012
CN   107453840 A   12/2017
(Continued)

OTHER PUBLICATIONS

Ericsson: "Summary of 7.3.1.4 (DCI Contents and Formats)", TSG-RAN WG1 AdHoc 1801, R1-1801012 Summary of 7.3.1.4 (DCI Content), 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018, Jan. 23, 2018, 11 Pages, XP051385251, Default values, p. 1, Paragraph 5-p. 2, The Whole Document, sections 4, 8, 9.1, 9.4, 9.6-9.8, 9.10, 9.15.
(Continued)

*Primary Examiner* — Abdelnabi O Musa
(74) *Attorney, Agent, or Firm* — Holland & Hart LLP/Qualcomm

(57) ABSTRACT

Different sets of downlink control information (DCI) fields may be configured for DCI that includes an indication to
(Continued)

trigger bandwidth part switching at a user equipment (UE). For example, a UE may receive DCI that triggers the UE to switch operation from a first bandwidth part to a second bandwidth part. The UE may also identify a set of transformable DCI fields and a set of non-transformable DCI fields within the DCI. The UE may then determine updated content of the DCI for application to the second bandwidth part based on whether DCI fields are included in the set of transformable or the set of non-transformable fields. In some cases, the UE may identify a null assignment in the received DCI and may switch its operation from the first bandwidth part to the second bandwidth part based on the null assignment.

30 Claims, 26 Drawing Sheets

Related U.S. Application Data continuation of application No. 16/273,564, filed on Feb. 12, 2019, now Pat. No. 10,993,254.

(60) Provisional application No. 62/710,474, filed on Feb. 16, 2018.

(51) Int. Cl.
*H04W 28/06* (2009.01)
*H04W 72/0446* (2023.01)
*H04W 72/0453* (2023.01)
*H04W 72/1263* (2023.01)
*H04W 72/23* (2023.01)

(52) U.S. Cl.
CPC ... *H04W 72/0446* (2013.01); *H04W 72/0453* (2013.01); *H04W 72/1263* (2013.01); *H04L 5/0098* (2013.01)

(56) References Cited

U.S. PATENT DOCUMENTS

| | | | |
|---|---|---|---|
| 2003/0117951 A1 | 6/2003 | Wiebe et al. | |
| 2018/0279289 A1* | 9/2018 | Islam | H04W 72/0446 |
| 2019/0132824 A1* | 5/2019 | Jeon | H04L 5/00 |
| 2019/0132845 A1* | 5/2019 | Babaei | H04L 1/1812 |
| 2019/0166529 A1* | 5/2019 | Chen | H04L 5/0053 |
| 2019/0253230 A1* | 8/2019 | Loehr | H04W 72/0453 |
| 2019/0261405 A1 | 8/2019 | Ang et al. | |
| 2019/0357070 A1* | 11/2019 | Zhang | H04W 24/10 |
| 2021/0243793 A1 | 8/2021 | Ang et al. | |

FOREIGN PATENT DOCUMENTS

| | | |
|---|---|---|
| WO | WO2007149961 | 12/2007 |
| WO | WO2017050251 A1 | 3/2017 |
| WO | WO2017079530 A1 | 5/2017 |
| WO | WO2018031664 A1 | 2/2018 |

OTHER PUBLICATIONS

Huawei, et al., "Scheduling and Resource Allocation Mechanism for Active Bandwidth Parts", 3GPP Draft, R1-1709974, 3GPP TSG RAN WG1 NR Ad Hoc Meeting, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051299199, 7 Pages, Section 3.3.

International Search Report and Written Opinion—PCT/US2019/017770—ISA/EPO—Jun. 28, 2019.

International Preliminary Report on Patentability—PCT/US2019/017770, The International Bureau of WIPO—Geneva, Switzerland, Aug. 27, 2020.

Partial International Search Report—PCT/US2019/017770—ISA/EPO—Apr. 30, 2019.

Qualcomm Incorporated: "Remaining Issues on BWP", 3GPP Draft, 3GPP TSG RAN WG1 Meeting AH 1801, R1-1800879_Remaining Issues on BWP, 3rd Generation Partnership Project (3GPP), Mobile Competence Centre, 650, Route Des Lucioles, F-06921 Sophia-A, vol. RAN WG1. No. Vancouver, Canada, Jan. 22, 2018-Jan. 26, 2018, Jan. 13, 2018, (Jan. 13, 2018), pp. 1-13, XP051385148, Paragraph [2.1.2]-Paragraph [2.1.3].

VIVO: "Remaining Issues on BWP Operation", 3GPP Draft, 3GPP TSG RAN WG1 Meeting #92, R1-1801544_Remaining Issues on BWP Operation-Final, 3rd Generation Partnership Project (3GPP), Mobile Competence Centre, 650, Route Des Lucioles, F-06921 Sophia-A, vol. RAN WG1. No. Athens, Greece, Feb. 26, 2018-Mar. 2, 2018, Feb. 15, 2018, (Feb. 15, 2018), 5 Pages, XP051396796, tables 1, 2, sections 1, 2.1.

European Search Report—EP24181506—Search Authority—The Hague—Oct. 8, 2024.

Qualcomm Incorporated: "Open Issues on BWP", 3GPP TSG RAN WG1 #91, R1-1720693, 3rd Generation Partnership Project, Mobile Competence Centre, 650, Route Des Lucioles, F-06921 Sophia-Antipolis Cedex, France, vol. RAN WG1, No. Reno, NV, USA, Nov. 27, 2017-Dec. 1, 2017, Nov. 18, 2017, pp. 1-15, XP051370154, The Whole Document.

* cited by examiner

First BWP

Second BWP

Transition

First BWP

Second BWP

Transition

DOWNLINK CONTROL INFORMATION SIGNALING SCHEMES FOR BANDWIDTH PART SWITCHING

CROSS REFERENCES

The present Application for Patent is a Continuation of U.S. patent application Ser. No. 17/235,487 by Ang et al., entitled "Downlink Control Information Signaling Schemes For Bandwidth Part Switching" filed Apr. 20, 2021, which is a Continuation of U.S. patent application Ser. No. 16/273,564 by Ang et al., entitled "Downlink Control Information Signaling Schemes For Bandwidth Part Switching" filed Feb. 12, 2019, which claims the benefit of U.S. Provisional Patent Application No. 62/710,474 by Ang et al., entitled "Downlink Control Information Signaling Schemes for Bandwidth Part Switching," filed Feb. 16, 2018, each of which is assigned to the assignee hereof, and expressly incorporated by reference in their entirety herein.

BACKGROUND

The following relates generally to wireless communication, and more specifically to downlink control information (DCI) signaling schemes for bandwidth part (BWP) switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (OFDM) (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may operate within different portions of a channel or carrier. For example, a UE may operate in one or more BWPs of a channel used for wireless communications. In such cases, the UE may be capable of switching between different BWPs, for example, to conserve energy by tuning a radio to a smaller BWP (e.g., as compared to other BWPs). As a result, techniques that ensure reduced BWP switching delays and correct interpretation of control information in respective BWPs may be desirable to ensure efficient communications.

SUMMARY

The described techniques relate to improved methods, systems, devices, or apparatuses that support downlink control information (DCI) signaling schemes for bandwidth part (BWP) switching. Generally, the described techniques provide for the configuration of different sets of DCI fields for DCI that includes an indication that triggers BWP switching at a user equipment (UE). For example, a UE may receive DCI that triggers the UE to switch operation from a first BWP to a second BWP. The UE may also identify a set of transformable DCI fields and another set of DCI fields within the DCI (e.g., non-transformable DCI fields). The set of transformable DCI fields may include DCI fields having content that may be updated from the first BWP to the second BWP (e.g., through zero-padding or truncation) in accordance with a transformation rule (e.g., with various parameters on the content within each DCI field). Additionally, the set of non-transformable fields may include DCI fields having exceptions to the transformation rules, and may have content that may not be updated between the BWPs in accordance with the transformation rule. The UE may determine updated content of the DCI for application to the second BWP based on whether DCI fields are included in the set of transformable or the set of non-transformable fields. In some examples, the UE may determine different sizes for DCI fields in two or more BWPs. In other examples, a null assignment (e.g., an assignment that does not currently assign resources for communications) may be included in the DCI, and the UE may use the null assignment to identify the BWP switch trigger. In such cases, the UE may refrain from attempting to update the DCI content of the non-transformable fields for the second BWP.

A method of wireless communications is described. The method may include receiving, from a base station and while operating in a first BWP, DCI having a plurality of DCI fields, each DCI field of the plurality of DCI fields having a respective first size based on the first BWP, receiving, as part of the DCI, an indication that the UE is to switch from operating in the first BWP to operating in a second BWP, identifying, from the plurality of DCI fields, a first set of DCI fields having content in the first BWP that is able to be updated via a transformation rule to DCI fields having a respective second size in the second BWP, identifying, from the plurality of DCI fields, a second set of DCI fields having content in the first BWP that is unable to be updated via the transformation rule, and determining an updated content of the plurality of DCI fields for application to the second BWP based at least in part on whether each DCI field is from the first set of DCI fields or the second set of DCI fields.

An apparatus for wireless communications is described. The apparatus may include means for receiving, from a base station and while operating in a first BWP, DCI having a plurality of DCI fields, each DCI field of the plurality of DCI fields having a respective first size based on the first BWP, means for receiving, as part of the DCI, an indication that the UE is to switch from operating in the first BWP to operating in a second BWP, means for identifying, from the plurality of DCI fields, a first set of DCI fields having content in the first BWP that is able to be updated via a transformation rule to DCI fields having a respective second size in the second BWP, means for identifying, from the plurality of DCI fields, a second set of DCI fields having content in the first BWP that is unable to be updated via the transformation rule, and means for determining an updated content of the plurality of DCI fields for application to the second BWP based at least in part on whether each DCI field is from the first set of DCI fields or the second set of DCI fields.

Another apparatus for wireless communications is described. The apparatus may include a processor, memory in electronic communication with the processor, and instructions stored in the memory. The instructions may be operable to cause the processor to receive, from a base station and while operating in a first BWP, DCI having a plurality of DCI fields, each DCI field of the plurality of DCI fields having a respective first size based on the first BWP, receive, as part of the DCI, an indication that the UE is to switch from operating in the first BWP to operating in a second BWP, identify, from the plurality of DCI fields, a first set of DCI fields having content in the first BWP that is able to be updated via a transformation rule to DCI fields having a respective second size in the second BWP, identify, from the plurality of DCI fields, a second set of DCI fields having content in the first BWP that is unable to be updated via the transformation rule, and determine an updated content of the plurality of DCI fields for application to the second BWP based at least in part on whether each DCI field is from the first set of DCI fields or from the second set of DCI fields.

A non-transitory computer-readable medium for wireless communications is described. The non-transitory computer-readable medium may include instructions operable to cause a processor to receive, from a base station and while operating in a first BWP, DCI having a plurality of DCI fields, each DCI field of the plurality of DCI fields having a respective first size based on the first BWP, receive, as part of the DCI, an indication that the UE is to switch from operating in the first BWP to operating in a second BWP, identify, from the plurality of DCI fields, a first set of DCI fields having content in the first BWP that is able to be updated via a transformation rule to DCI fields having a respective second size in the second BWP, identify, from the plurality of DCI fields, a second set of DCI fields having content in the first BWP that is unable to be updated via the transformation rule, and determine an updated content of the plurality of DCI fields for application to the second BWP based at least in part on whether each DCI field is from the first set of DCI fields or the second set of DCI fields.

Some examples of the method, apparatus, and non-transitory computer-readable medium described herein may further include processes, features, means, or instructions for updating the content of the first set of DCI fields via the transformation rule. Some examples of the method, apparatus, and non-transitory computer-readable medium described herein may further include processes, features, means, or instructions for determining the updated content for the first set of DCI fields based at least in part on the second BWP.

Some examples of the method, apparatus, and non-transitory computer-readable medium described herein may further include processes, features, means, or instructions for identifying, within the received DCI, a null assignment for the second BWP. Some examples of the method, apparatus, and non-transitory computer-readable medium described herein may further include processes, features, means, or instructions for switching operation from the first BWP to the second BWP based at least in part on the null assignment. Some examples of the method, apparatus, and non-transitory computer-readable medium described herein may further include processes, features, means, or instructions for refraining from determining content in at least the second set of DCI fields. In some examples of the method, apparatus, and non-transitory computer-readable medium described herein, identifying the null assignment for the second BWP includes detecting the null assignment within a resource assignment field of the plurality of DCI fields. In some examples of the method, apparatus, and non-transitory computer-readable medium described herein, the null assignment may be based at least in part on the DCI triggering the switch from the first BWP to the second BWP.

Some examples of the method, apparatus, and non-transitory computer-readable medium described herein may further include processes, features, means, or instructions for detecting a null assignment within a resource assignment field from the plurality of DCI fields. Some examples of the method, apparatus, and non-transitory computer-readable medium described herein may further include processes, features, means, or instructions for detecting a BWP identity (ID) that indicates the switch from the first BWP to the second BWP. Some examples of the method, apparatus, and non-transitory computer-readable medium described herein may further include processes, features, means, or instructions for determining a timing value indicating a time difference between the received DCI and a start of the second BWP. Some examples of the method, apparatus, and non-transitory computer-readable medium described herein may further include processes, features, means, or instructions for refraining from detecting a remaining set of DCI fields from the plurality of DCI fields based at least in part on the detected null assignment.

Some examples of the method, apparatus, and non-transitory computer-readable medium described herein may further include processes, features, means, or instructions for detecting, within the DCI, a BWP ID that indicates the switch from the first BWP to the second BWP. Some examples of the method, apparatus, and non-transitory computer-readable medium described herein may further include processes, features, means, or instructions for determining, based at least in part on the DCI, a timing value that indicates a time difference between the received DCI and a start of the second BWP.

Some examples of the method, apparatus, and non-transitory computer-readable medium described herein may further include processes, features, means, or instructions for identifying a minimum size for each DCI field of the second set of DCI fields, wherein content within a DCI field having the minimum size may be able to be updated to a DCI field in the second BWP. In some examples of the method, apparatus, and non-transitory computer-readable medium described herein, a size of the content within the DCI may be a static size greater than or equal to the minimum size.

Some examples of the method, apparatus, and non-transitory computer-readable medium described herein may further include processes, features, means, or instructions for identifying a DCI field from the first set of DCI fields to be truncated based at least in part on the DCI field having the respective first size in the first BWP that may be larger than the respective second size in the second BWP. Some examples of the method, apparatus, and non-transitory computer-readable medium described herein may further include processes, features, means, or instructions for determining that content within the DCI field may have a predetermined value. Some examples of the method, apparatus, and non-transitory computer-readable medium described herein may further include processes, features, means, or instructions for truncating the DCI field based at least in part on the determination that the content may have the predetermined value. In some examples of the method, apparatus, and non-transitory computer-readable medium described herein, the predetermined value may be zero.

In some examples of the method, apparatus, and non-transitory computer-readable medium described herein, the first set of DCI fields includes the plurality of DCI fields. In some examples of the method, apparatus, and non-transitory computer-readable medium described herein, the second set of DCI fields includes the plurality of DCI fields. In some examples of the method, apparatus, and non-transitory computer-readable medium described herein, a configuration of the first set of DCI fields and the second set of DCI fields may be preconfigured. In some examples of the method, apparatus, and non-transitory computer-readable medium described herein, a configuration of the first set of DCI fields and the second set of DCI fields may be received via high-layer signaling.

Some examples of the method, apparatus, and non-transitory computer-readable medium described herein may further include processes, features, means, or instructions for determining whether an aggregate first size of the second set of DCI fields in the first BWP may be different from an aggregate second size of the second set of DCI fields in the second BWP.

Some examples of the method, apparatus, and non-transitory computer-readable medium described herein may further include processes, features, means, or instructions for determining that the aggregate first size may be different from the aggregate second size, wherein the aggregate second size may be greater than the aggregate first size. Some examples of the method, apparatus, and non-transitory computer-readable medium described herein may further include processes, features, means, or instructions for identifying, in the first BWP, a set of partial size equalization bits including a difference between the aggregate first size and the aggregate second size, wherein a total aggregate size of the set of partial size equalization bits and the second set of DCI fields in the first BWP may be equal to the aggregate second size of the second set of DCI fields in the second BWP.

Some examples of the method, apparatus, and non-transitory computer-readable medium described herein may further include processes, features, means, or instructions for updating the content of the second set of DCI fields based at least in part on the set of partial size equalization bits. Some examples of the method, apparatus, and non-transitory computer-readable medium described herein may further include processes, features, means, or instructions for determining, based at least in part on the second BWP, the second set of DCI fields to identify the respective second size, an ordering, a packing, a content of a DCI field, or a combination thereof.

Some examples of the method, apparatus, and non-transitory computer-readable medium described herein may further include processes, features, means, or instructions for determining that the aggregate first size may be different from the aggregate second size, wherein the aggregate second size may be less than the aggregate first size. Some examples of the method, apparatus, and non-transitory computer-readable medium described herein may further include processes, features, means, or instructions for identifying, in the second BWP, a set of partial size equalization bits including a difference between the aggregate first size and the aggregate second size, wherein a total aggregate size of the set of partial size equalization bits and the second set of DCI fields in the first BWP may be equal to the aggregate second size of the second set of DCI fields in the second BWP.

Some examples of the method, apparatus, and non-transitory computer-readable medium described herein may further include processes, features, means, or instructions for updating the content of the second set of DCI fields based at least in part on the set of partial size equalization bits. Some examples of the method, apparatus, and non-transitory computer-readable medium described herein may further include processes, features, means, or instructions for determining, based at least in part on the second BWP, the updated content of the second set of DCI fields to identify the respective second size, an ordering, a packing, a content of a DCI field, or a combination thereof.

Some examples of the method, apparatus, and non-transitory computer-readable medium described herein may further include processes, features, means, or instructions for determining that the aggregate first size may be less than the aggregate second size. Some examples of the method, apparatus, and non-transitory computer-readable medium described herein may further include processes, features, means, or instructions for determining whether a respective aggregate size of each DCI field of the second set of DCI fields in a plurality of BWPs may be the same, wherein the plurality of BWPs includes at least the first BWP and the second BWP.

Some examples of the method, apparatus, and non-transitory computer-readable medium described herein may further include processes, features, means, or instructions for determining that an aggregate first size of the second set of DCI fields in the first BWP may be different from at least one respective aggregate size. Some examples of the method, apparatus, and non-transitory computer-readable medium described herein may further include processes, features, means, or instructions for identifying, in the first BWP, a set of partial size equalization bits including a difference between a maximum respective aggregate size and the aggregate first size, wherein a total aggregate size of the set of partial size equalization bits and the second set of DCI fields in the first BWP may be equal to the maximum respective aggregate size.

Some examples of the method, apparatus, and non-transitory computer-readable medium described herein may further include processes, features, means, or instructions for determining that an aggregate second size of the second set of DCI fields in the second BWP may be different from at least one respective aggregate size. Some examples of the method, apparatus, and non-transitory computer-readable medium described herein may further include processes, features, means, or instructions for identifying, in the second BWP, a set of partial size equalization bits including a difference between a maximum respective aggregate size and the aggregate second size, wherein a total aggregate size of the set of partial size equalization bits and the second set of DCI fields in the second BWP may be equal to the maximum respective aggregate size.

A method of wireless communications is described. The method may include receiving, from a base station and while operating in a first BWP, DCI during a first TTI, receiving, as part of the DCI, an indication that the UE is to switch from operating in the first BWP to operating in a second BWP, determining that the second BWP begins at a second TTI that is subsequent to the first TTI, and refraining from monitoring for a physical downlink control channel (PDCCH) based at least in part on the received DCI triggering the switch from the first BWP to the second BWP.

An apparatus for wireless communications is described. The apparatus may include means for receiving, from a base station and while operating in a first BWP, DCI during a first TTI, means for receiving, as part of the DCI, an indication that the UE is to switch from operating in the first BWP to operating in a second BWP, means for determining that the second BWP begins at a second TTI that is subsequent to the first TTI, and means for refraining from monitoring for a PDCCH based at least in part on the received DCI triggering the switch from the first BWP to the second BWP.

Another apparatus for wireless communications is described. The apparatus may include a processor, memory in electronic communication with the processor, and instructions stored in the memory. The instructions may be operable to cause the processor to receive, from a base station and while operating in a first BWP, DCI during a first TTI, receive, as part of the DCI, an indication that the UE is to switch from operating in the first BWP to operating in a second BWP, determine that the second BWP begins at a second TTI that is subsequent to the first TTI, and refrain from monitoring for a PDCCH based at least in part on the received DCI triggering the switch from the first BWP to the second BWP.

A non-transitory computer-readable medium for wireless communications is described. The non-transitory computer-readable medium may include instructions operable to cause a processor to receive, from a base station and while operating in a first BWP, DCI during a first TTI, receive, as part of the DCI, an indication that the UE is to switch from operating in the first BWP to operating in a second BWP, determine that the second BWP begins at a second TTI that is subsequent to the first TTI, and refrain from monitoring for a PDCCH based at least in part on the received DCI triggering the switch from the first BWP to the second BWP.

In some examples of the method, apparatus, and non-transitory computer-readable medium described herein, the second TTI immediately follows a physical downlink shared channel (PDSCH) transmission scheduled by the received DCI or a physical uplink shared channel (PUSCH) transmission scheduled by the received DCI.

A method of wireless communications is described. The method may include determining to switch operation of a UE from a first BWP to a second BWP, generating DCI having a plurality of DCI fields, each DCI field of the plurality of DCI fields having a respective first size based on the first BWP, configuring the DCI with a first set of DCI fields having content in the first BWP that is able to be updated via a transformation rule to DCI fields having a respective second size in the second BWP, configuring the DCI with a second set of DCI fields having content in the first BWP that is unable to be updated via the transformation rule to DCI fields having the respective second size in the second BWP, configuring the DCI with an indication that the UE is to switch from operating in the first BWP to operating in the second BWP, and transmitting the DCI to the UE.

An apparatus for wireless communications is described. The apparatus may include means for determining to switch operation of a UE from a first BWP to a second BWP, means for generating DCI having a plurality of DCI fields, each DCI field of the plurality of DCI fields having a respective first size based on the first BWP, means for configuring the DCI with a first set of DCI fields having content in the first BWP that is able to be updated via a transformation rule to DCI fields having a respective second size in the second BWP, means for configuring the DCI with a second set of DCI fields having content in the first BWP that is unable to be updated via the transformation rule, means for configuring the DCI with an indication that the UE is to switch from operating in the first BWP to operating in the second BWP, and means for transmitting the DCI to the UE.

Another apparatus for wireless communications is described. The apparatus may include a processor, memory in electronic communication with the processor, and instructions stored in the memory. The instructions may be operable to cause the processor to determine to switch operation of a UE from a first BWP to a second BWP, generate DCI having a plurality of DCI fields, each DCI field of the plurality of DCI fields having a respective first size based on the first BWP, configure the DCI with a first set of DCI fields having content in the first BWP that is able to be updated via a transformation rule to DCI fields having a respective second size in the second BWP, configure the DCI with a second set of DCI fields having content in the first BWP that is unable to be updated via the transformation rule, configure the DCI with an indication that the UE is to switch from operating in the first BWP to operating in the second BWP, and transmit the DCI to the UE.

A non-transitory computer-readable medium for wireless communications is described. The non-transitory computer-readable medium may include instructions operable to cause a processor to determine to switch operation of a UE from a first BWP to a second BWP, generate DCI having a plurality of DCI fields, each DCI field of the plurality of DCI fields having a respective first size based on the first BWP, configure the DCI with a first set of DCI fields having content in the first BWP that is able to be updated via a transformation rule to DCI fields having a respective second size in the second BWP, configure the DCI with a second set of DCI fields having content in the first BWP that is unable to be updated via the transformation rule, configure the DCI with an indication that the UE is to switch from operating in the first BWP to operating in the second BWP, and transmit the DCI to the UE.

Some examples of the method, apparatus, and non-transitory computer-readable medium described herein may further include processes, features, means, or instructions for transmitting a null assignment for the second BWP based at least in part on the aggregate first size being less than the aggregate second size. In some examples of the method, apparatus, and non-transitory computer-readable medium described herein, transmitting the null assignment for the second BWP includes transmitting the null assignment within a resource assignment field of the plurality of DCI fields.

Some examples of the method, apparatus, and non-transitory computer-readable medium described herein may further include processes, features, means, or instructions for generating a BWP ID that indicates the switch from the first BWP to the second BWP. Some examples of the method, apparatus, and non-transitory computer-readable medium described herein may further include processes, features, means, or instructions for transmitting the BWP ID as part of the DCI, wherein a timing value that indicates a time difference between the transmitted DCI and a start of the second BWP may be based at least in part on the DCI.

Some examples of the method, apparatus, and non-transitory computer-readable medium described herein may further include processes, features, means, or instructions for configuring a minimum size for each DCI field of the second set of DCI fields, wherein content within a DCI field having the minimum size may be able to be updated to a DCI field in the second BWP. In some examples of the method, apparatus, and non-transitory computer-readable medium described herein, a size of the content within the DCI may be a static size greater than or equal to the minimum size.

Some examples of the method, apparatus, and non-transitory computer-readable medium described herein may further include processes, features, means, or instructions for identifying a DCI field from the first set of DCI fields to be truncated based at least in part on the DCI field having the respective first size in the first BWP that may be larger than the respective second size in the second BWP. Some examples of the method, apparatus, and non-transitory computer-readable medium described herein may further include processes, features, means, or instructions for configuring content within the DCI field with a predetermined value.

Some examples of the method, apparatus, and non-transitory computer-readable medium described herein may further include processes, features, means, or instructions for configuring an aggregate first size of the second set of DCI fields in the first BWP to be different than an aggregate second size of the second set of DCI fields in the second BWP, wherein the aggregate second size may be greater than the aggregate first size. Some examples of the method, apparatus, and non-transitory computer-readable medium described herein may further include processes, features, means, or instructions for inserting, in the first BWP, a set of partial size equalization bits including a difference between the aggregate first size and the aggregate second size, wherein a total aggregate size of the set of partial size equalization bits and the second set of DCI fields for the first BWP may be equal to the aggregate second size of the second set of DCI fields in the second BWP.

Some examples of the method, apparatus, and non-transitory computer-readable medium described herein may further include processes, features, means, or instructions for configuring an aggregate first size of the second set of DCI fields in the first BWP to be different than an aggregate second size of the second set of DCI fields in the second BWP, wherein the aggregate second size may be less than the aggregate first size. Some examples of the method, apparatus, and non-transitory computer-readable medium described herein may further include processes, features, means, or instructions for inserting, in the second BWP, a set of partial size equalization bits including a difference between the aggregate first size and the aggregate second size, wherein a total aggregate size of the set of partial size equalization bits and the second set of DCI fields for the first BWP may be equal to the aggregate second size of the second set of DCI fields in the second BWP.

Some examples of the method, apparatus, and non-transitory computer-readable medium described herein may further include processes, features, means, or instructions for configuring an aggregate first size of the second set of DCI fields in the first BWP to be different from at least one respective aggregate size of respective sets of non-transformable DCI fields in a plurality of BWPs. Some examples of the method, apparatus, and non-transitory computer-readable medium described herein may further include processes, features, means, or instructions for inserting, in the first BWP, a set of partial size equalization bits including a difference between a maximum respective aggregate size and the aggregate first size, wherein a total aggregate size of the set of partial size equalization bits and the second set of DCI fields in the first BWP may be equal to the maximum respective aggregate size.

Some examples of the method, apparatus, and non-transitory computer-readable medium described herein may further include processes, features, means, or instructions for configuring an aggregate second size of the second set of DCI fields in the second BWP to be different from at least one respective aggregate size of the respective sets of non-transformable DCI fields in a plurality of BWPs. Some examples of the method, apparatus, and non-transitory computer-readable medium described herein may further include processes, features, means, or instructions for inserting, in the second BWP, a set of partial size equalization bits including a difference between a maximum respective aggregate size and the aggregate second size, wherein a total aggregate size of the set of partial size equalization bits and the second set of DCI fields in the second BWP may be equal to the maximum respective aggregate size.

Some examples of the method, apparatus, and non-transitory computer-readable medium described herein may further include processes, features, means, or instructions for configuring an aggregate first size of the second set of DCI fields in the first BWP to be less than an aggregate second size of the second set of DCI fields in the second BWP.

In some examples of the method, apparatus, and non-transitory computer-readable medium described herein, the predetermined value may be zero. Some examples of the method, apparatus, and non-transitory computer-readable medium described herein may further include processes, features, means, or instructions for transmitting a null assignment within a resource assignment field from the plurality of DCI fields, wherein the null assignment may be based at least in part on the DCI triggering the switch from the first BWP to the second BWP.

In some examples of the method, apparatus, and non-transitory computer-readable medium described herein, the first set of DCI fields includes the plurality of DCI fields. In some examples of the method, apparatus, and non-transitory computer-readable medium described herein, the second set of DCI fields includes the plurality of DCI fields. In some examples of the method, apparatus, and non-transitory computer-readable medium described herein, a configuration of the first set of DCI fields and the second set of DCI fields may be preconfigured. In some examples of the method, apparatus, and non-transitory computer-readable medium described herein, a configuration of the first set of DCI fields and the second set of DCI fields may be transmitted via high-layer signaling.

DETAILED DESCRIPTION

In some wireless communication systems, the size (e.g., bit length) of downlink control information (DCI) may be based on the size (e.g., bandwidth) of an associated bandwidth part (BWP). Additionally, different BWPs may be used for wireless communications, and switching between respective BWPs may be controlled through downlink signaling, such as DCI, which may enable various schemes for resource assignments and triggering BWP switching. That is, DCI signaling may be used to control and facilitate switching between a current BWP of a first size and a target BWP of a second size during a BWP switching event.

In some cases, cross-slot scheduling, as well as cross-BWP scheduling, may be used to accommodate latency in switching between narrow and wide BWPs. For example, DCI signaling may be used to control a switch from a first BWP format (e.g., a narrow or smaller BWP) in a first slot to a second BWP format (e.g., a BWP that is relatively wider or larger than the first BWP format) in a second slot, or vice versa, where the different BWP formats may have different DCI field sizes. In some cases, a BWP switch may be triggered without cross-BWP scheduling. For example, after a first slot having a first BWP format with DCI corresponding to a payload in the first slot, a transition may be made to a second slot having a second BWP format with a DCI corresponding to a payload in the second slot. In some cases, a base station may signal to a user equipment (UE) a transmission delay associated with downlink and uplink transmissions. When transitioning from a first BWP format to a second BWP format, the DCI size may be determined based on a maximum DCI size across all configured BWPs. Alternatively, the size of one or more, or all, DCI bit fields may be determined according to the current BWP. As another alternative, the UE may perform BWP switching without an assignment of scheduled data transmission for the upcoming slot.

Transmission schemes are described herein and include transformation rules that may be applied to a DCI field of a current BWP (e.g., having a first size) to transform the DCI field size to a target DCI field size for a target BWP (e.g., having a second size). The transformation rules may differentiate between transformable fields and non-transformable fields, including transformation and interpretation algorithms to facilitate the switch in BWP sizes.

Aspects of the disclosure are initially described in the context of a wireless communications system. Additional aspects are then described with reference to transmission timelines and transmission schemes. Aspects of the disclosure are further illustrated by and described with reference to apparatus diagrams, system diagrams, and flowcharts that relate to DCI signaling schemes for BWP switching.

Figure 1:
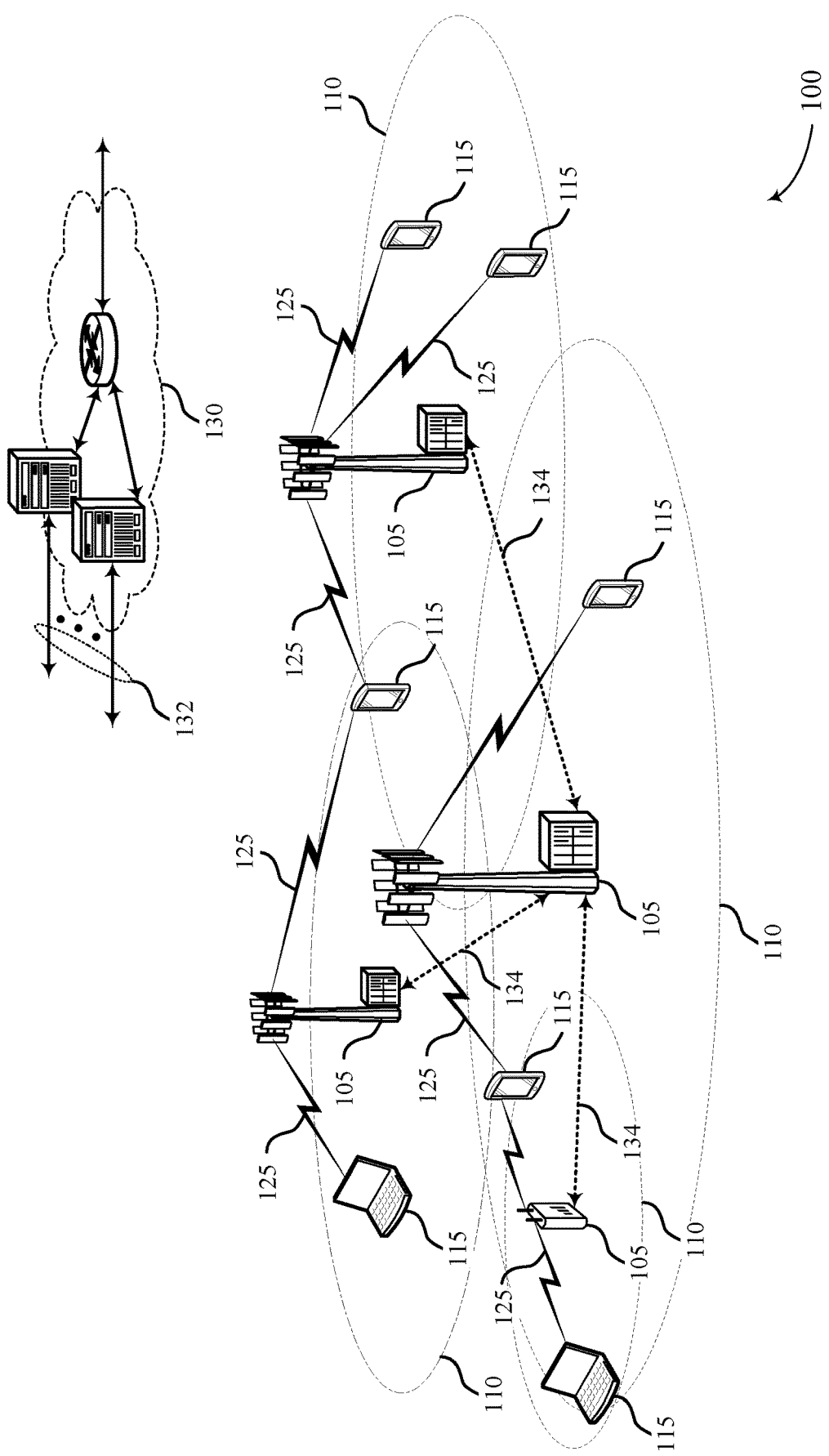
FIG. 1 illustrates an example of a system for wireless communication that supports DCI signaling schemes for BWP switching in accordance with aspects of the present disclosure.

FIG. 1 illustrates an example of a system for wireless communication that supports DCI signaling schemes for BWP switching in accordance with aspects of the present disclosure. Wireless communications system 100 includes base stations 105, UEs 115, and a core network 130. In some examples, wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, the base stations 105 may interface with the core network 130 through backhaul links 132 (e.g., via an Si or other interface). The base stations 105 may communicate with one another over backhaul links 134 (e.g., via an X2 or other interface) either directly (e.g., directly between base stations 105) or indirectly (e.g., via the core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A physical downlink control channel (PDCCH) or shortened PDCCH (sPDCCH) may carry DCI in control channel elements (CCEs), which may, for example, consist of nine logically contiguous resource element groups (REGs), where each REG contains four resource elements (REs). DCI includes information regarding downlink scheduling assignments, uplink resource grants, transmission scheme, uplink power control, HARQ information, modulation and coding schemes (MCSs), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI may include additional signaling information. DCI size and format may depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell random network temporary identifier (C-RNTI) and cyclic redundancy check (CRC) bits attached to each DCI may be scrambled based on the C-RNTI. To reduce power consumption and overhead at the UE 115, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures, and the like. The UE-specific search space may include user-specific control information. CCEs may be indexed, and the common search space may start from CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

A carrier may be associated with a particular bandwidth of the radio frequency spectrum, and in some examples the carrier bandwidth may be referred to as a "system bandwidth" of the carrier for wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of wireless communications system 100 (e.g., base stations 105 or UEs 115) may have a hardware configuration that supports communications over a particular carrier bandwidth, or may be configurable to support communications over one of a set of carrier bandwidths. In some examples, wireless communications system 100 may include base stations 105 and/or UEs that support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications systems, such as an NR system, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the configuration of different sets of DCI fields for DCI that includes an indication to trigger BWP switching at a UE 115.

For example, the UE 115 may receive DCI that triggers the UE 115 to switch operation from a first BWP to a second BWP. The UE 115 may also identify a set of transformable DCI fields and a set of non-transformable DCI fields within the DCI. The set of transformable DCI fields may include DCI fields having content that may be updated from the first BWP to the second BWP (e.g., through zero-padding) in accordance with a transformation rule (e.g., with various levels of restrictions on the content within each DCI field). Additionally, the set of non-transformable fields may include DCI fields having content that may not be updated between the BWPs in accordance with the transformation rule. The UE 115 may then determine updated content of the DCI for application to the second BWP, which may be based on whether DCI fields are included in the set of transformable or the set of non-transformable fields.

For instance, the UE 115 may determine an aggregate size for each set of non-transformable DCI fields in two or more BWPs. In cases where respective aggregate sizes of non-transformable DCI fields are different across the two or more BWPs, the non-transformable DCI fields may be configured for partial size equalization such that additional bits based on a maximum aggregate size of a set of non-transformable fields may be included for a BWP (e.g., equalizing respective aggregate sizes of non-transformable fields across multiple BWPs). In other examples, the difference in aggregate sizes may indicate that a null assignment is to be sent in the DCI, and the UE 115 may identify the BWP switch trigger, but refrain from attempting to update the DCI content of the non-transformable fields based on the second BWP. In other cases, a minimum size for DCI fields in the set of non-transformable DCI fields may be used, which may further enable content to be updated between respective BWPs without issues. The described techniques may provide configuration-based transformation rules that reduce complexity and improve efficiency in updating content between BWPs. For instance, the techniques described herein may reduce decoding failures at a UE 115 that may be caused by zero-padding certain non-transformable fields.

In other examples, wireless communications system 100 may support DCI signaling that enables a UE 115 to defer monitoring of PDCCH following receipt of DCI that includes an indication of a BWP switch. In such cases, the UE 115 may receive the DCI in a first TTI and determine that the second BWP starts at a subsequent TTI based on a timeline for switching operation between different BWPs. The subsequent TTI may be a TTI that immediately follows a physical downlink shared channel (PDSCH)/physical uplink shared channel (PUSCH) transmission that is scheduled by the received DCI. In any event, the UE 115 may refrain from monitoring for PDCCH based on the indication to switch BWPs. Such techniques may enable efficient wakeup schemes (e.g., two-stage wakeup schemes) and may further enhance power savings at the UE 115.

The base stations 105 and the UEs 115 may be configured to communicate using BWPs and DCI that varies in size based on the size of a corresponding BWPs. The varying size of the DCI may create complications during BWP switching events and when using fallback DCI. To address these issues, techniques are described for generating and interpreting resource allocation information in the DCI during BWP switching events. In addition, techniques for providing a size invariant fallback DCI associated with a reference BWP are also described.

Figure 2:
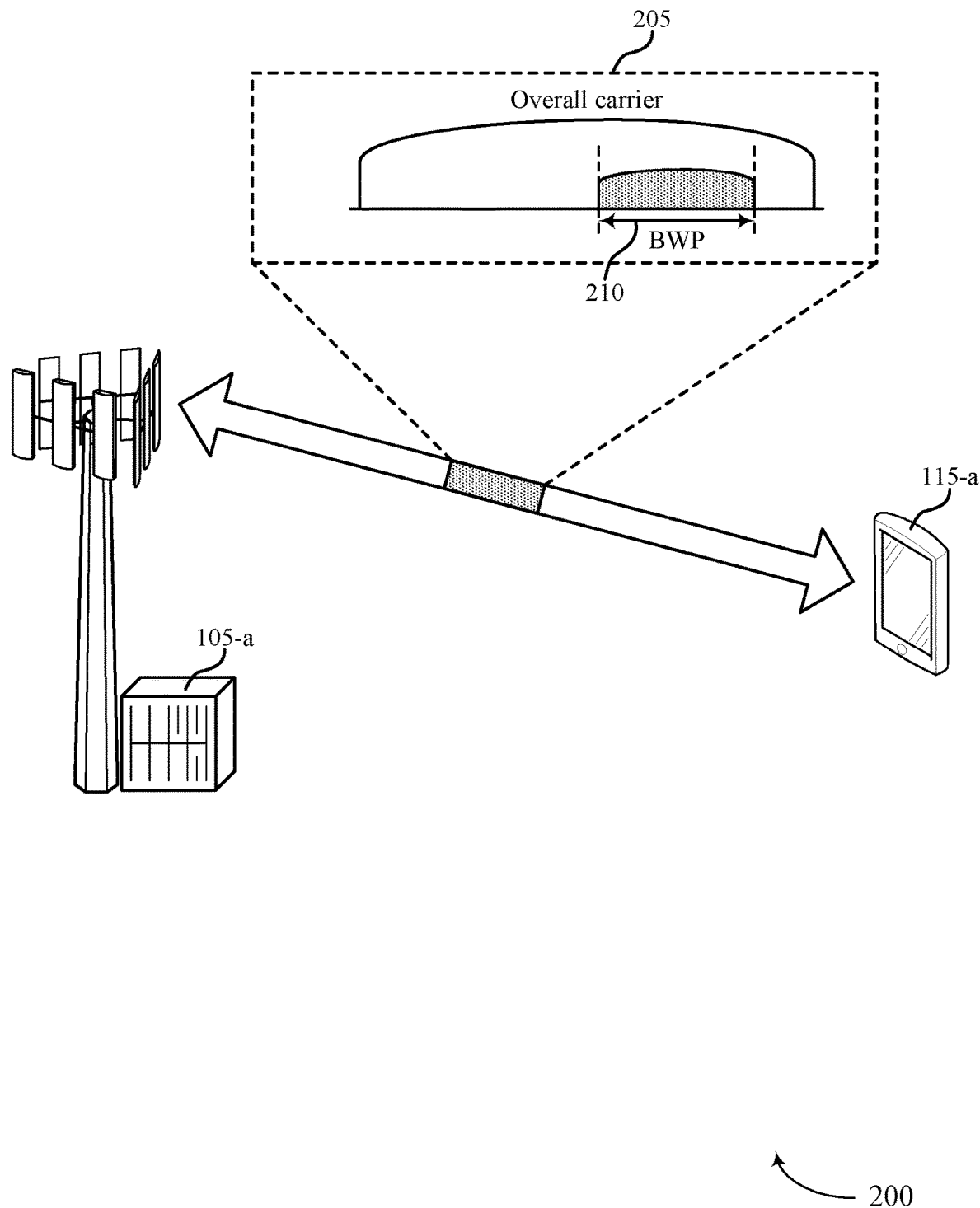
FIG. 2 illustrates an example of a wireless communications system that supports DCI signaling schemes for BWP switching in accordance with aspects of the present disclosure.

FIG. 2 illustrates an example of a wireless communication system 200 that supports DCI signaling schemes for BWP switching in accordance with aspects of the present disclosure. In some examples, wireless communications system 200 may implement aspects of wireless communications system 100. Wireless communications system 200 may include a base station 105-a and a UE 115-a that may communicate information using a carrier 205. Wireless communications system 200 may be configured to use one or more BWPs 210 to communicate information in the carrier 205.

A BWP 210 may be a group of contiguous physical resource blocks (PRBs). The bandwidth of the BWP 210 may be equal to or smaller than a maximum bandwidth capability supported by UE 115-a or the bandwidth of the overall carrier 205. In some cases, the bandwidth of the BWP 210 may be at least as large as a bandwidth of a synchronization signal (SS) block.

In some cases, the BWP 210 may be a dynamically-configured (or semi-statically configured) portion of the carrier 205. The BWP 210 may include a number of dynamically (or semi-statically) configurable parameters. Examples of such parameters may include frequency location (e.g., center frequency), bandwidth (e.g., number of PRBs), numerology (e.g., sub-carrier spacing and/or cyclic prefix type), or a combination thereof. The parameters of the BWP 210 may be communicated using DCI, a medium access control (MAC) control element (CE), radio resource control (RRC) signaling, and/or a time pattern (e.g., in a discontinuous reception situation). The granularity of certain parameters may be the size of one PRB (e.g., bandwidth granularity may be one PRB and frequency location granularity may be one PRB).

A BWP 210 may be configured for downlink and for uplink. BWPs 210 may be configured independently for each cell (e.g., primary cells and/or secondary cells). In such cases, if an SCell is deactivated, the BWPs of that cell may also be deactivated. In some cases, UE 115-a may be configured to communicate using one or more downlink BWPs and/or one or more uplink BWPs at the same time. In some cases, there may be at most one active downlink BWP and at most one active uplink BWP at a given time for a serving cell. A primary cell (PCell) may be a serving cell that handles the RRC connection between UE 115-a and base station 105-a, and a secondary cell (SCell) may be any other serving cells established between UE 115-a and base station 105-a.

BWPs 210 may be used in both paired spectrum and unpaired spectrum. In paired spectrum, a first frequency spectrum band may be allocated (e.g., dedicated) to downlink communications and a second frequency spectrum band may be allocated (e.g., dedicated) to uplink communications. Paired spectrum may use FDD systems to establish two-way communications between nodes. In unpaired spectrum, the same frequency spectrum band may be used for both uplink and downlink communications. Unpaired spectrum may use TDD systems to establish two-way communications between nodes. In some cases, such as for paired spectrum, a maximum number of BWP configurations may include four downlink BWPs and four uplink BWPs. In other cases, such as for unpaired spectrum, a maximum number of BWP configurations may include four downlink/uplink BWP pairs. For FDD, the BWPs for downlink and the BWPs for uplink may be configured independently on a per-component carrier (CC) basis. For TDD, a joint set of downlink BWPs and uplink BWPs may be configured on a per-CC basis.

In some cases, an active BWP 210 of UE 115-a may not span a frequency spectrum band larger than a bandwidth of a CC for UE 115-a. The configuration for a downlink BWP may include at least one control resource set (CORESET). In some cases, at least one configured downlink BWP may include a CORESET with a control search space in a primary component carrier (PCC). In some cases, in a PCell for UE 115-a, a control search space may be configured in each BWP 210. In some cases, each configured downlink BWP may include at least one CORESET with a UE-specific search space (UE-SS) for the case of single active BWP at a given time. In some cases, if the active downlink BWP does not include a control search space, then UE 115-a may not monitor the control search. The control search space may include communication resources where UE 115-a may be configured to look for physical downlink control channel (PDCCH) carrying DCI as its payload.

Upon establishing an RRC connection, UE 115-a or base station 105-a may activate a default configuration of one or more BWPs 210 (e.g., a downlink BWP and an uplink BWP). UE 115-a and base station 105-a may use those default BWPs 210 until the BWPs 210 are explicitly configured or reconfigured.

Wireless communications system 200 may also support a BWP switching event. In some cases, UE 115-a (or base station 105-a) may be configured to use one BWP 210 of carrier 205 at a time, where the BWPs may be of a different size. In such cases, if UE 115-a (or base station 105-a) is to use a different BWP for the carrier 205, UE 115-a (or base station 105-a) may reconfigure its BWP 210. As part of a BWP switching event, UE 115-a (or base station 105-a) may switch the active BWP to a target BWP within a given serving cell. A BWP switching event may be signaled using DCI. In some cases, a downlink BWP may be switched using a downlink scheduling DCI and an uplink BWP may be switched using an uplink scheduling DCI. In some cases, either downlink BWPs or uplink BWPs may be switched using either downlink DCI or uplink DCI. In some cases, Wireless communications system 200 may support a timer for timer-based BWP switching. In such a time-based configuration, the BWP 210 may switch from an active BWP to a default BWP based on a timer expiring.

As described in further detail below, various techniques may be used for efficient BWP switching in wireless communications system 200. For example, a configuration of different sets of DCI fields may include a set of transformable DCI fields and a set of non-transformable DCI fields within the DCI. The set of transformable DCI fields may include DCI fields having content that may be updated from a first BWP to a second BWP (e.g., through zero-padding or truncation, etc.) in accordance with a transformation rule (e.g., with various levels of restrictions on the content within each DCI field). Additionally, the set of non-transformable fields may include DCI fields having content that may not be updated between the BWPs in accordance with the transformation rule. That is, the non-transformable fields may serve as DCI fields that include exceptions to the transformation rule(s) used on the transformable fields. In some cases, the non-transformable fields may be a subset of the transformable fields. UE 115-a determine updated content of the DCI for application to the second BWP based on whether DCI fields are included in the set of transformable or the set of non-transformable fields. For instance, UE 115-a may determine updated content between BWPs based on a partial equalization scheme for different sets of non-transformable DCI fields. Additionally or alternatively, UE 115-a may identify a null assignment and refrain from interpreting at least a set of non-transformable DCI fields. In some cases, UE 115-a may also identify a minimum aggregate size for certain non-transformable DCI fields. In other examples, UE 115-a may defer monitoring of PDCCH following receipt of DCI that includes an indication of a BWP switch. In such cases, UE 115-a may receive the DCI in a first TTI and determine that the second BWP starts at a subsequent TTI based on a timeline for switching operation between different BWPs.

Figure 3:
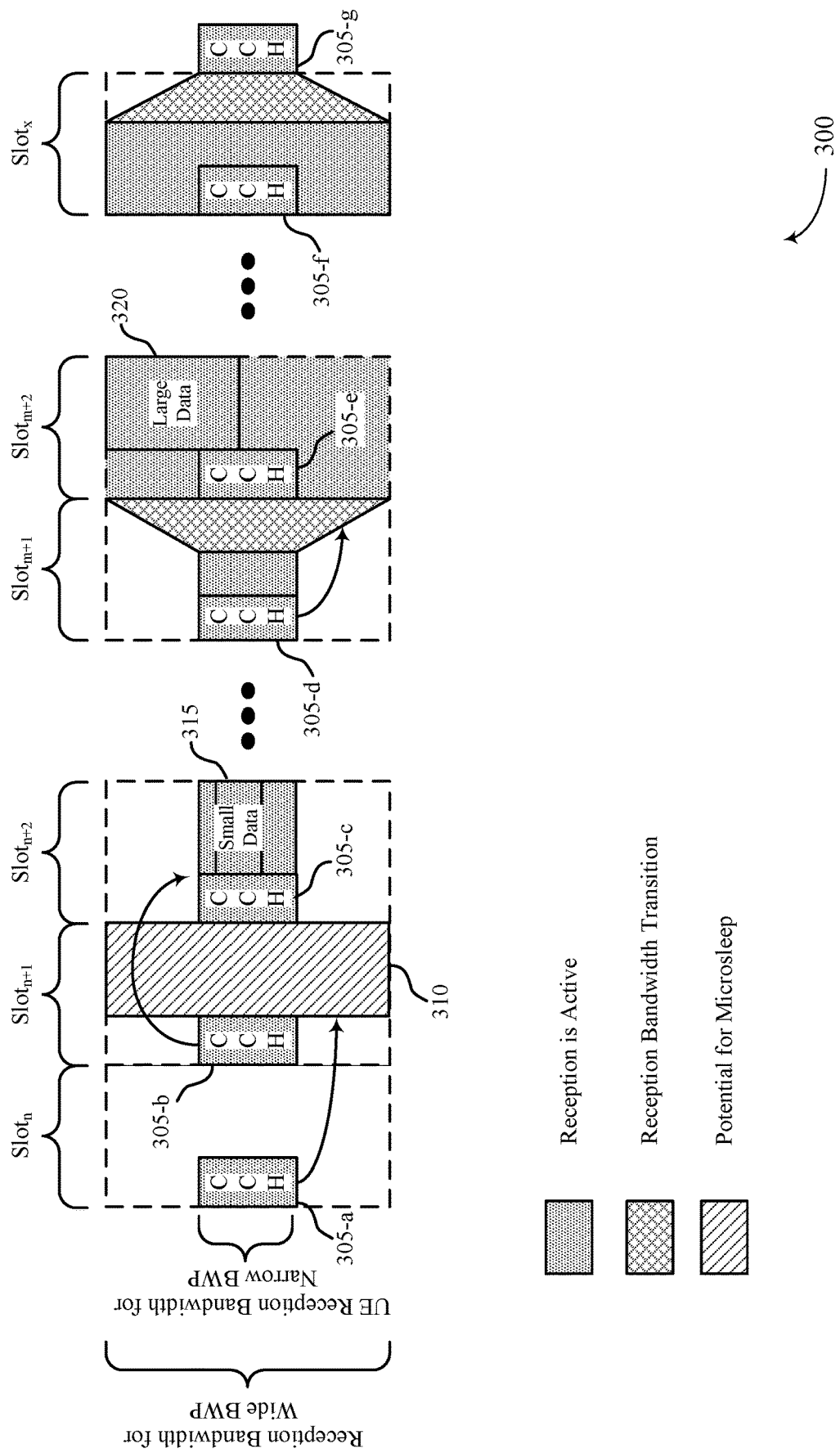
FIG. 3 illustrates an example of a transmission timeline that supports DCI signaling schemes for BWP switching in accordance with aspects of the present disclosure.

FIG. 3 illustrates an example of a transmission timeline 300 that supports DCI signaling schemes for BWP switching in accordance with aspects of the present disclosure. In some examples, transmission timeline 300 may implement aspects of the wireless communications systems 100 and 200. Transmission timeline 300 illustrates techniques used by a UE 115 switching between a narrow BWP and a wide BWP based on control channel signaling transmitted by a base station 105.

Transmission timeline 300 includes several slots, for example, including $slot_n$, $slot_{n+1}$, $slot_{n+2}$, $slot_{m+2}$, through $slot_x$. Each slot may include a control channel (CCH) 305, transmitted from a base station 105 and received at a UE 115. In some wireless communications systems, an amount of radio frequency bandwidth used for reception of the control channel 305 may be smaller than an amount of radio frequency bandwidth for reception of data. In such cases, the reception bandwidth may be adapted by switching an active BWP between a narrow BWP (e.g., for the control channel 305) and a wide BWP (e.g., for data). DCI may trigger the BWP switch between a narrow BWP and wide BWP, or vice-versa. The DCI may include one or more BWP identifier (BWP ID) fields (having, e.g., a BWP ID equal to 1 or 2) corresponding to different BWP formats (e.g., narrow BWP and wide BWP, respectively). That is, for example, a narrow BWP format may be identified by BWP ID with a value equal to "1," and a wide BWP format may be identified by a BWP ID with a value equal to "2."

In some cases, cross-slot scheduling, as well as cross-BWP scheduling, as shown in FIG. 3, may help to accommodate latency in switching between the narrow and wide BWPs. The DCI may further include additional scheduling information for a particular slot, such as information for cross-slot scheduling and cross-BWP scheduling. For example, the scheduling information in the DCI may include a k0 value, which may indicate a scheduling delay indicating a quantity of slots in which a PDSCH may arrive after receiving a control channel 305. As illustrated in FIG. 3, the value of k0 is shown to be equal to 1, indicating a scheduling delay of one slot between the control channel 305 and the corresponding PDSCH. For example, control channel 305-b, corresponding to $slot_{n+1}$, may not provide a downlink grant, and thus the region 310 may be suitable for a period of sleep or microsleep by the UE 115. Control channel 305-c, corresponding to $slot_{n+2}$, may provide a downlink grant including, for example, a BWP ID having a value of 1, indicating a narrow BWP for the data transmission 315 (e.g., a relatively small data transmission). Accordingly, there may not be a BWP switch from $slot_{n+1}$ to $slot_{n+2}$.

Additionally or alternatively, control channel 305-d, corresponding to $slot_{m+1}$, may provide a downlink grant including, for example, a BWP ID having a value of 2, indicating a wide BWP format for $slot_{m+2}$ to accommodate the data transmission 320 (e.g., a data transmission larger than data transmission 315). Accordingly, the BWP may switch, for example, where a reception bandwidth transition from a narrow BWP in $slot_{m+1}$ to a wide BWP in $slot_{m+2}$ may be performed. In some cases, data transmission 320 may not be scheduled by control channel 305-d. Rather, the UE 115 may listen at control channel 305-e for a downlink grant for data transmission 320. In this case, control channel 305-e may have full scheduling functionality, due to the wide BWP of $slot_{m+2}$. In some cases, and as further discussed below, the DCI may include fields (e.g., a frequency domain resource allocation field) having a bit field size proportional to a corresponding BWP.

In some cases, a BWP timer may be used to account for a period of inactivity. That is, a BWP may be set to expire after a period of time of scheduling inactivity. At the expiration of the BWP timer, an active BWP may then be switched (e.g., autonomously) to a narrower bandwidth, for example, for reception of a control channel 305. Illustratively, this is shown in FIG. 3 to be a time period between $slot_{m+2}$ and $slot_x$. At the expiration of the BWP timer prior to $slot_x$, there may be a transition from the wide BWP back to a narrow BWP during $slot_x$. In some cases, the BWP timer may be a separate timer from a DRX timer (e.g., for low-latency data). In some cases, the BWP scheduling information may be dedicated signaling for the purposes of BWP switching between different BWPs. For example, the BWP switching may be based on a scheduling DCI without an assignment.

In some cases, DCI may not contain a BWP ID field, in which case the DCI may not be used to trigger BWP switching. Alternatively, however, several techniques are described herein in which DCI signaling may be used to trigger a BWP switch, for example, from a narrow BWP to a wide BWP, or vice versa. As such, the transmission timeline 300 illustrated in FIG. 3 may utilize the described techniques for BWP switching between various BWP sizes, which may be based on DCI fields that may be transformed based at least in part on their content.

Figure 4A:
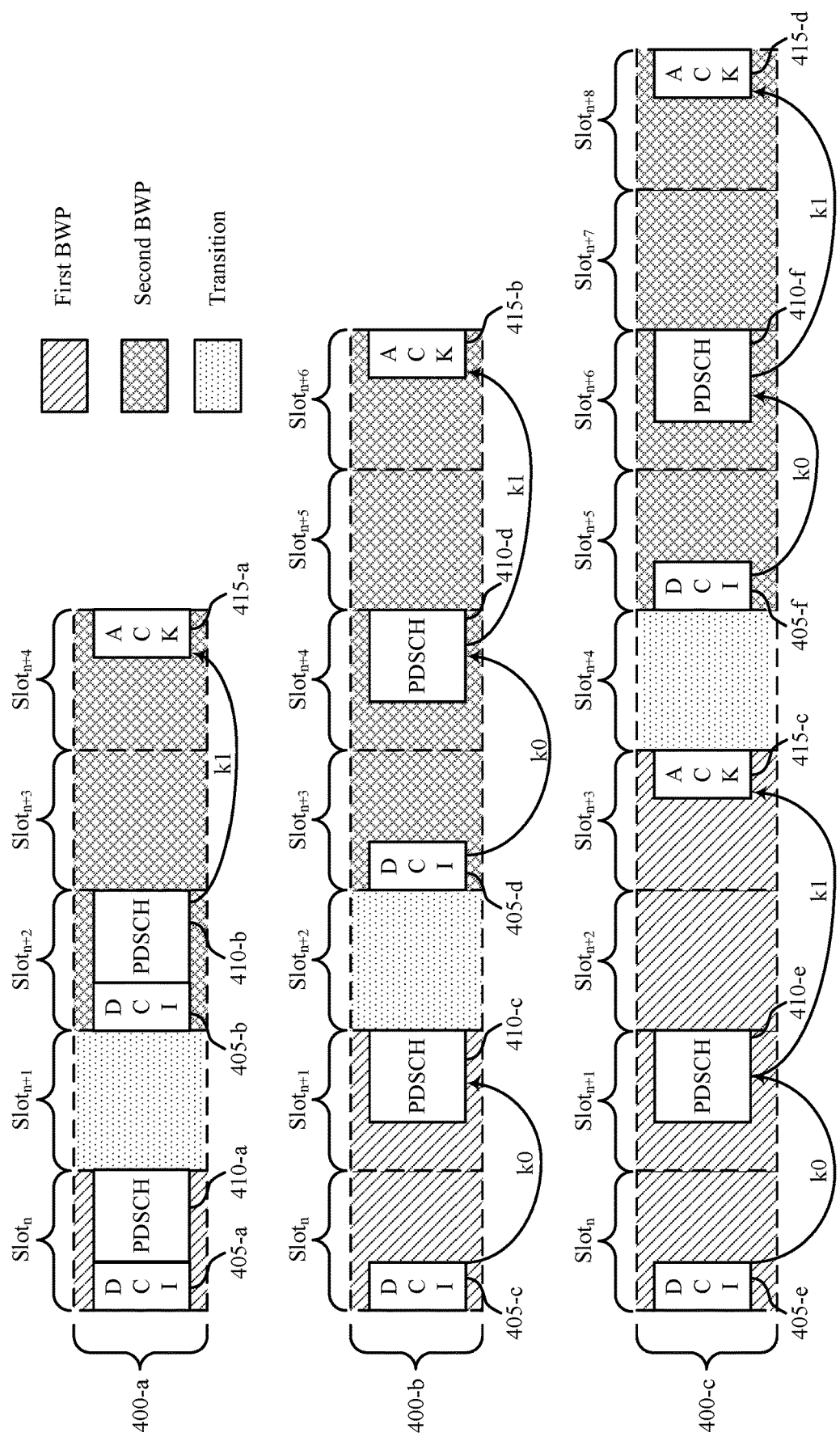
FIG. 4A illustrates examples of downlink transmission timelines that support DCI signaling schemes for BWP switching in accordance with aspects of the present disclosure.

FIG. 4A illustrates examples of downlink transmission timelines 400 that support DCI signaling schemes for BWP switching in accordance with aspects of the present disclosure. In some examples, downlink transmission timelines 400 may implement aspects of wireless communications systems 100 and 200. Downlink transmission timelines 400 may illustrate a first technique for a UE 115 switching between, for example, a narrow BWP and a wide BWP based on control channel signaling from a base station 105.

Downlink transmission timeline 400-*a* illustrates an example of a downlink transmission timeline with a k0=0 delay—that is, downlink transmission timeline 400-*a* may show transmissions with a scheduling delay of zero slots between a control channel and a PDSCH 410. Downlink transmission timeline 400-*b* illustrates an example of a downlink transmission timeline 400 with a k0=1 delay—that is, downlink transmission timeline 400-*b* may illustrate transmissions with a scheduling delay of one slot following a control channel until a PDSCH 410 is scheduled with respect to the DCI 405. Downlink transmission timeline 400-*c* illustrates another example of a downlink transmission timeline with a k0=1 delay.

According to the first technique for DCI signaling for triggering BWP switching, a BWP switch may be triggered without cross-BWP scheduling. According to the first technique, the DCI information may correspond to the current BWP size, and the DCI size may be determined according to the current BWP format. In this case, PDSCH may be received following the control channel in the same slot, or alternatively, in a later slot if the control channel provides for cross-slot scheduling. The DCI 405 may include a BWP index for an upcoming slot. If, for example, the BWP index activates a different BWP format than the current BWP, a BWP switch may be triggered to switch to a target BWP (e.g., from a narrow BWP to a wide BWP, or vice versa). In this case, the new BWP may be activated X μs later, where X may be based on a BWP transition latency and/or a delay, indicated, for example, by a k0 value. Accordingly, the current DCI may schedule a future DCI in a different BWP format than that of the current DCI.

In the example of downlink transmission timeline 400-*a*, a first slot (e.g., $slot_n$) may include DCI 405-*a*, and because of the k0=0 delay, the PDSCH 410-*a* may be immediately scheduled in $slot_n$ following DCI 405-*a*. The first slot, $slot_n$, may be of a first BWP format (e.g., a narrow BWP format). DCI 405-*a* may include a BWP index for an upcoming slot, shown here to be $slot_{n+2}$, where the BWP index indicates that the BWP format for a later slot is a second BWP format (e.g., a wide BWP format). In some cases, following $slot_n$, $slot_{n+1}$, may provide a transition period from the first BWP format to the second BWP format. Then, at $slot_{n+2}$, having transitioned to the second BWP format, and due to the k0=0 delay, DCI 405-*b* may immediately schedule a data transmission in PDSCH 410-*b* in the same $slot_{n+2}$. In some cases, downlink transmission timeline 400-*a* may further include an acknowledgment (ACK) transmission 415-*a* (i.e., a HARQ-ACK transmission) following a delay of one slot (represented by, e.g., k1).

In a second example a transmission delay may be set to k0=1. For example, as shown with the example of downlink transmission timeline 400-*b*, the first slot (e.g., $slot_n$) may include DCI 405-*c*, and based on the k0=1 delay set throughout downlink transmission timeline 400-*b*, the PDSCH 410-*c* may be scheduled in the next slot (e.g., $slot_{n+1}$) following $slot_n$ in which DCI 405-*c* was transmitted. In this case, the first slot, $slot_n$, may be of a first BWP format (e.g., a narrow BWP format). DCI 405-*c* may include a BWP index for an upcoming slot, shown here to be $slot_{n+3}$, where the BWP index indicates that the BWP format for the upcoming slow is a second BWP format (e.g., a wide BWP format). Following $slot_n$ and $slot_{n+1}$, $slot_{n+2}$, may provide a transition period from the first BWP format to the second BWP format. Then, at $slot_{n+3}$, having transitioned to the second BWP format, and due to the k0=1 delay, DCI 405-*d* may schedule a data transmission in PDSCH 410-*d* in $slot_{n+4}$. In some cases, downlink transmission timeline 400-*b* may further include an ACK transmission 415-*b* (i.e., a HARQ-ACK transmission) following a delay of one slot (represented by, e.g., k1). Thus, in downlink transmission timeline 400-*b* with k0=1, a one slot delay may be incurred before ACK transmission 415-*b*.

As another example, as shown with the example of downlink transmission timeline 400-*c*, with a delay of k0=1, $slot_n$ may include DCI 405-*e*, and because of the k0=1 delay throughout downlink transmission timeline 400-*c*, the PDSCH 410-*e* may be scheduled in $slot_{n+1}$ following $slot_n$ in which DCI 405-*e* was transmitted. In the example of downlink transmission timeline 400-*c*, an ACK transmission 415-*c* may further be scheduled for the first data transmission in PDSCH 410-*e*. Here, the ACK transmission may be transmitted in $slot_{n+3}$. In this case, the first slot, $slot_n$, may be of a first BWP format (e.g., a narrow BWP format). DCI 405-*e* may include a BWP index for an upcoming slot, shown here to be $slot_{n+5}$, where the BWP index indicates that the BWP format for the upcoming slow is a second BWP format (e.g., a wide BWP format).

According to the first technique for DCI signaling for triggering BWP switching, a transition may not occur until after transmitted ACK transmission 415-*c*, $slot_{n+4}$, may provide a transition period from the first BWP format to the second BWP format. Then, at $slot_{n+5}$, having transitioned to the second BWP format, DCI 405-*f* may schedule a data transmission in PDSCH 410-*f* in $slot_{n+6}$. In some cases, downlink transmission timeline 400-*a* may further include a second ACK transmission 415-d (i.e., a HARQ-ACK transmission) following a delay of one slot (represented by, e.g., k1). Thus, in downlink transmission timeline 400-c with k0=1, a one slot delay may be incurred before each of ACK transmission 415-c and ACK transmission 415-d. In some cases, the first technique for DCI signaling for triggering BWP switching may imply that the network schedule in the current BWP to trigger a BWP switch. However, this may conflict with a situation in which, for example, the current BWP is a narrow BWP, and the network does not intend to schedule a data transmission in the current BWP (i.e., the network intends to schedule the next data transmission in a wide BWP in a later slot).

Moreover, with a longer k0 delay, (and, e.g., if a transition is not to occur until after an ACK transmission 415) the transmission timeline may incur relatively longer overall delays. That is, for the first technique, an overall delay may be equal to the k0 delay setting, plus the PDSCH transmission time, plus a k1 delay, plus the transition time. Further, in some cases (e.g., when a transmission delay of k0 is equal to 2), the first technique for DCI signaling that triggers BWP switching may incur further delays at the time of BWP switching. However, as described herein, further techniques for DCI signaling may be used for triggering BWP switching and may, in some cases, avoid the described delays when switching BWPs. For instance, through the use of a null assignment in DCI that triggers the BWP switch, the overall timeline for BWP switching and subsequent communications may be reduced, as the absence of a resource assignment may, for example, have a shorter timeline than the examples shown in FIG. 4A, even when a larger k0 value is used (e.g., k0=2).

Figure 4B:
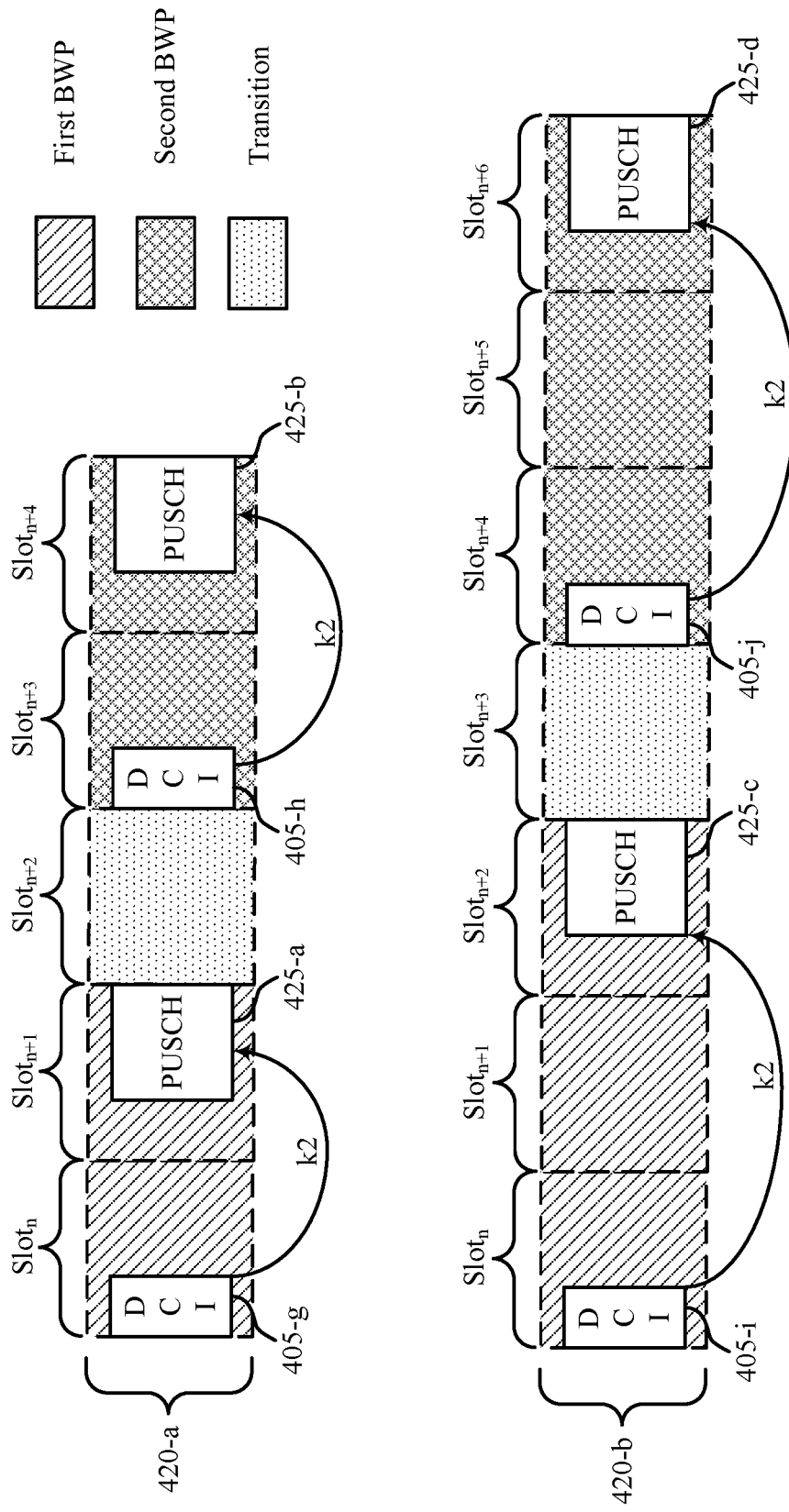
FIG. 4B illustrates examples of uplink transmission timelines that support DCI signaling schemes for BWP switching in accordance with aspects of the present disclosure.

FIG. 4B illustrates examples of uplink transmission timelines 420 that support DCI signaling schemes for BWP switching in accordance with aspects of the present disclosure. In some examples, uplink transmission timelines 420 may implement aspects of wireless communications systems 100 and 200. Uplink transmission timelines 420 illustrate a first technique for a UE 115 switching between a narrow BWP and a wide BWP based on control channel signaling from a base station 105.

Similar to the downlink transmission timelines 400 described with reference to FIG. 4A, a value for a delay for uplink transmission timelines 420 (e.g., a k2 delay) may be set to a particular value defining a number of slots from the DCI 405 that indicates the BWP switch to a later slot in which the different BWP format starts. Uplink transmission timeline 420-a illustrates an example of an uplink transmission timeline with a k2=1 delay—that is, uplink transmission timeline 420-a shows transmissions with a scheduling delay of one slot between receiving a control channel and receiving a PUSCH 425. Uplink transmission timeline 420-b illustrates an example of an uplink transmission timeline with a k2=2 delay—that is, uplink transmission timeline 420-b shows transmissions with a scheduling delay of two slots after a control channel until a PUSCH 425 may be sent.

In the example of uplink transmission timeline 420-a, a first slot (e.g., $slot_n$) may include DCI 405-g, and because of the k2=1 delay set throughout uplink transmission timeline 420-a, the PUSCH 425-a may be scheduled in the next slot (i.e., $slot_{n+1}$) following $slot_n$ in which DCI 405-g was transmitted. In this case, the first slot, $slot_n$, may be of a first BWP format (e.g., a narrow BWP format). DCI 405-g may include a BWP index for an upcoming slot, shown here to be $slot_{n+3}$, where the BWP index indicates that the BWP format for the upcoming slow is a second BWP format (e.g., a wide BWP format). Following $slot_n$ and $slot_{n+1}$, $slot_{n+2}$, may provide a transition period from the first BWP format to the second BWP format. Then, at $slot_{n+3}$, having transitioned to the second BWP format, and due to the k2=1 delay, DCI 405-h may schedule a data transmission in PUSCH 425-b in $slot_{n+4}$.

As mentioned above with reference to FIG. 4A, in some cases (e.g., when a transmission delay of k2 is equal to 2), the first technique for DCI signaling for triggering BWP switching may incur further delays at the BWP switch. For example, as shown with the example of uplink transmission timeline 400-b, with a delay of k2=2, the first slot ($slot_n$) may include DCI 405-i, and because of the k2=2 delay set throughout uplink transmission timeline 400-b, the PUSCH 425-c may be scheduled in $slot_{n+2}$, with a one slot delay at $slot_{n-1}$ following $slot_n$ in which DCI 405-b was transmitted. In this case, the first slot, $slot_n$, may be of a first BWP format (e.g., a narrow BWP format). DCI 405-i may include a BWP index for an upcoming slot, shown here to be $slot_{n+4}$, where the BWP index indicates that the BWP format for the upcoming slow is a second BWP format (e.g., a wide BWP format). Uplink transmission timeline 420-b may provide a transition period from the first BWP format to the second BWP format. Then, at $slot_{n+4}$, having transitioned to the second BWP format, DCI 405-j may schedule a data transmission in PUSCH 425-d in $slot_{n+6}$.

Accordingly, with a relatively longer k2 time, the transmission timeline may incur relatively longer overall delays (e.g., as compared to a shorter k2 value). For example, in cases in which latency is relatively low, a transition according to the first technique may incur an extra one slot delay due to the scheduling scheme and the need for transmissions to align with slot boundaries. In such cases, if the wireless communications system may otherwise provide for latency of less than one slot, it may be otherwise be possible to perform physical downlink control channel (PDCCH) or physical uplink control channel (PUCCH) processing (e.g., in one half slot or less), a radio frequency switching delay, and the transition (e.g., the transition also in one half slot or less) to all be performed within a single slot. However, because of the additional potential delay incurred according the described first technique, a this may not be possible, thus potentially resulting in increased latency at BWP switches. Accordingly, for uplink transmissions, a delay of k2=0 may be difficult to achieve because of potential delays. In some cases, however, the techniques described herein (e.g., including the use of null assignments within DCI) may be utilized to enhance BWP switching schemes to enable efficient BWP switching.

Figure 4C:
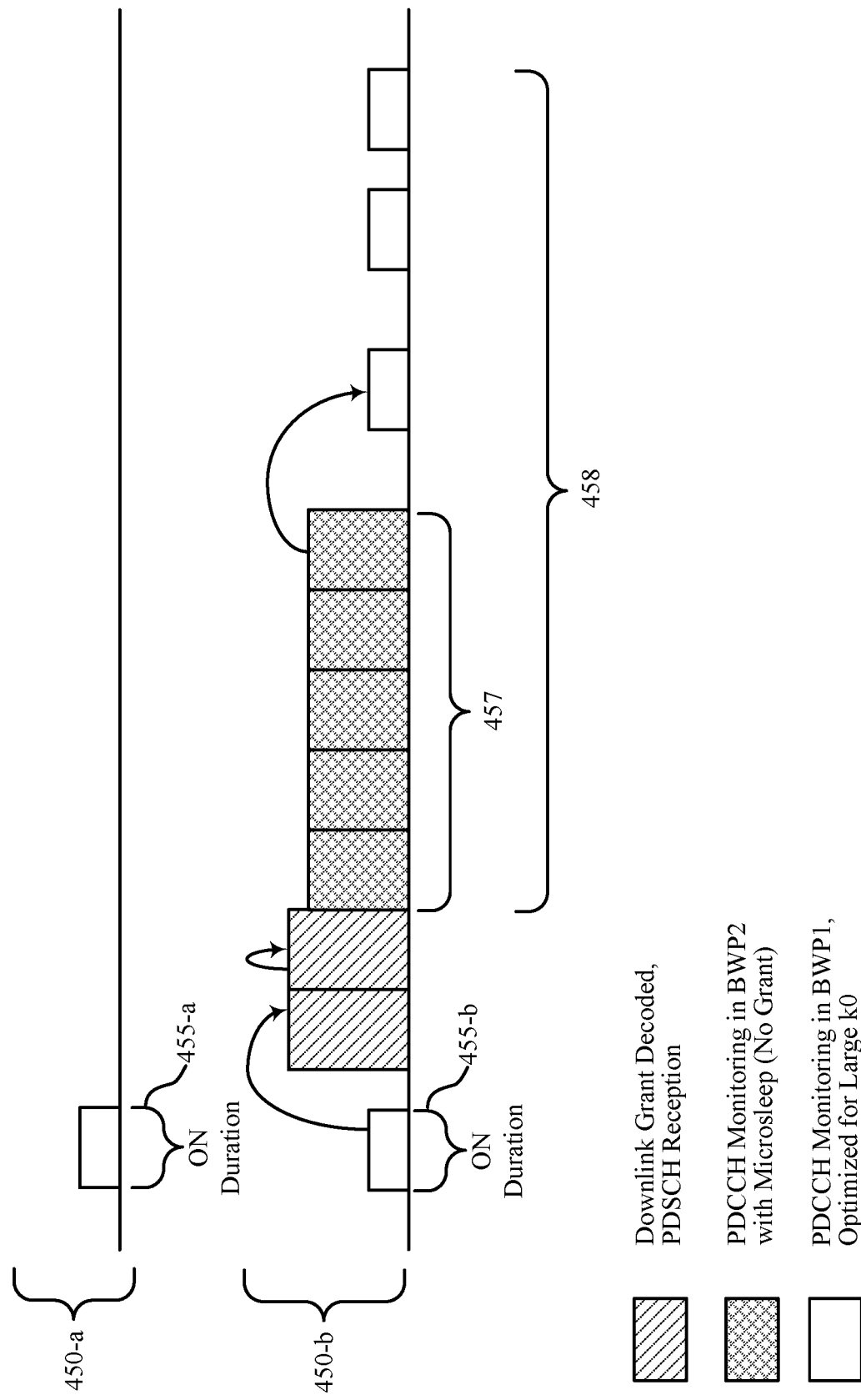
FIG. 4C illustrates an example of discontinuous reception (DRX) timelines that support DCI signaling schemes for BWP switching in accordance with aspects of the present disclosure.

FIG. 4C illustrates an example of DRX timelines 450 that support DCI signaling techniques for active BWP switching in accordance with aspects of the present disclosure. In some examples, DRX timelines 450 may implement aspects of the wireless communications systems 100 and 200. DRX timelines 450 illustrate an example of a two-stage pickup scheme.

DRX timeline 450-a may illustrate an example of a DRX timeline 450 with no data for a current DRX cycle. In some examples, DRX timeline 450-a may illustrate a first stage of a two-stage pickup scheme. DRX timeline 450-b may illustrate an example of a DRX timeline 450 where there is data for the current DRX cycle. In some cases, DRX timeline 450-b may illustrate a second stage of the two-stage pickup scheme.

In some cases, a UE 115 may receive indications of the k0 and/or k2 values, as discussed above, via signaling from a base station 105. In some cases, it may provide benefits for a k0 and/or k2 value to be configured to be relatively large.

For example, during DRX timeline 450-a, the UE 115 may not receive any data, and after an ON duration 455-a, the UE 115 may determine to enter a low-power mode (e.g., a sleep mode), thus conserving power until a future DRX cycle. Accordingly, in this first stage of the two-stage pickup scheme, the UE 115 may use minimal power to receive only control information during the ON duration 455-a.

In some cases, a UE 115 may wish to configure a larger k0 or k2 delay to accommodate a modem warm-up time along with the transition time. DRX timeline 450-b may, for example, be configured with a k0 value equal to 4, providing for a four-slot scheduling time between a control channel and a data transmission. A relatively longer k0 value (e.g., a k0 value of 4) may provide for additional time to accommodate a relatively longer modem warm-up time. In this second stage of the two-stage pickup scheme, the UE 115 may use more power than the first stage of the two-stage pickup scheme to receive control information as well as data transmissions. In the second stage of the two-stage pickup scheme, DRX timeline 450-b may provide a BWP timer 457 and an inactivity timer 458, that upon expiration may return to, for example, the first stage of the two-stage pickup scheme. As shown in FIG. 4C, the BWP timer 457 may provide for monitoring a number of slots (e.g., five slots) for a PDCCH in a particular BWP mode (e.g., a BWP2 mode, or a wider BWP mode). A UE 115 may monitor the PDCCH in, for example, a BWP1 mode optimized for a larger k0 (or, k2) value during the duration of, or until the expiration of, the inactivity timer 458.

However, according to the described first technique for DCI signaling for triggering BWP switching, a network may not be provided the flexibility to configure a larger value, because once a DCI indicating a BWP switch is decoded, it may be assumed a timeline provides only k0 or k2 slots (for downlink and uplink, respectively) for a transition time (e.g., the k0 and/or k2 delays may be hardcoded into the wireless communications system and/or configured based on a capability of the UE 115). Thus, the first technique may not be able to configure a relatively longer k0 and/or k2 time to accommodate a modem warm-up time. As described herein, further techniques for DCI signaling for triggering BWP switching may, in some cases, avoiding some of these additionally incurred delays, as well as provide for the flexibility to configure additional modem warm-up time.

In some cases, the technique described herein may provide for improvements on the first technique described herein. For example, in some cases, to accommodate a modem warm-up time, a constraint may be applied such that a UE 115 does not monitor the PDCCH after receiving a DCI indicating a BWP switch in a later slot. In some cases, (e.g., in case of further downlink scheduling) the later slot for this purpose may be the slot or slots immediately after the PDSCH scheduled by the current DCI (i.e., the slot or slots including the k0 delay plus the PDSCH transmission time plus the transition time). Accordingly, the UE 115 may receive a grant during this time period, in which case, the UE 115 may apply a current k0 and/or k2 delay for the current BWP, rather than a potentially outdated BWP (e.g., larger BWP) indicated from the BWP switch. Additionally or alternatively, the UE 115 may restrict a BWP switching DCI to slot-based scheduling only, similarly facilitating eliminating such conflicts. In some cases, if a PDSCH or PUSCH is scheduled by a prior grant for the current BWP (i.e., a scheduled transmission is before the DCI indicating the BWP switching), the UE 115 may still transmit if the scheduled timing is before the BWP transition. In this case, if the scheduled timing is after the BWP transition, PDSCH/PUSCH may be canceled.

In some cases, a UE 115 may drop a DCI field if the content of the field, after applying the transformation rule, becomes nonsensical (i.e., is no longer applicable). For example, this may be the case if a sounding reference signal (SRS) resource indicator points to a resource that no longer exists. If a field with nonsensical content is critical, the UE 115 may determine that the DCI is invalid, in which case, the UE 115 may determine whether the BWP ID and the k0 and/or k2 fields are still to be interpreted.

Figure 4D:
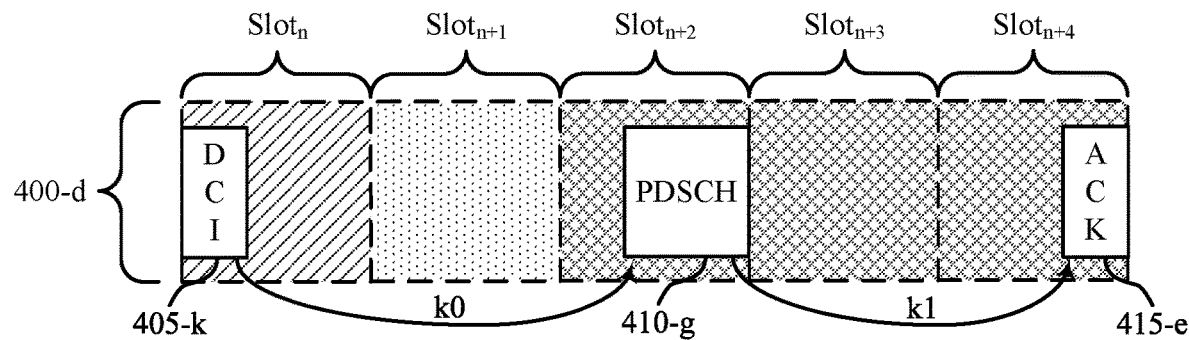
FIG. 4D illustrates examples of uplink and downlink transmission timelines that support DCI signaling techniques for active BWP switching in accordance with aspects of the present disclosure.
Figure 4D:
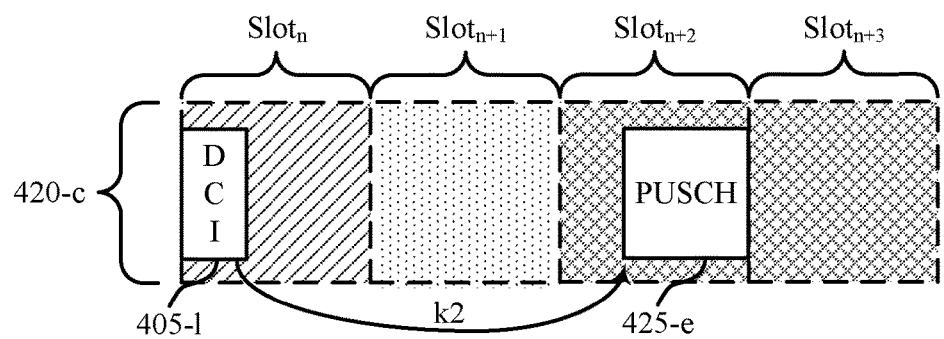
Figure 4D:
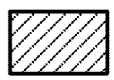
Figure 4D:
Figure 4D:
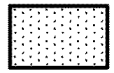

FIG. 4D illustrates examples of uplink and downlink transmission timelines that support DCI signaling techniques for active BWP switching in accordance with aspects of the present disclosure. In particular, FIG. 4D illustrates an example of a downlink transmission timeline 400-d that supports DCI signaling schemes for BWP switching in accordance with aspects of the present disclosure. FIG. 4D further illustrates an example of an uplink transmission timeline 420-c that supports DCI signaling schemes for BWP switching in accordance with aspects of the present disclosure. In some examples, downlink transmission timeline 400-d and uplink transmission timeline 420-c may implement aspects of the wireless communications systems 100 and 200. Downlink transmission timeline 400-d and uplink transmission timeline 420-c illustrate a second technique, a third technique, and a fourth technique for a UE 115 switching between a narrow BWP and a wide BWP based on control channel signaling from a base station 105.

Downlink transmission timeline 400-d may illustrate an example of a downlink transmission timeline with a k0=2 delay—that is, downlink transmission timeline 400-d shows transmissions with a scheduling delay of one slot after a control channel until a PDSCH 410 may arrive with respect to the DCI 405. Uplink transmission timeline 420-c may show an example of an uplink transmission timeline with a k2=2 delay—that is, uplink transmission timeline 420-c shows transmissions with a scheduling delay of two slots after a control channel until a PUSCH 425 may be transmitted.

In the second technique for DCI signaling for triggering BWP switching, the size of one or more, or all, DCI bit fields may be determined according to the current BWP. In this case, data may be transmitted using a BWP format as indicated by the corresponding BWP index. If a BWP index for an upcoming slot activates a different BWP format, a BWP switch may be triggered to switch to a target BWP (e.g., from a narrow BWP to a wide BWP, or vice versa). In this case, the DCI of the current BWP may schedule a data transmission for the upcoming slot of a different DCI format (e.g., the DCI of the current slot of a narrow BWP may schedule a large data transmission in an upcoming slot having a wide BWP following the control channel of the upcoming slot). In some cases, however, a DCI may include bit fields having a bit field size that is different than that of the target BWP. For example, the DCI may include fields having a bit field size of 9 (e.g., 9 bits), whereas the target BWP may support a size of 16 (e.g., 16 bits). In this case, a transformation rule may be applied to zero-pad applicable DCI fields to match the size of the target BWP. Alternatively, the DCI may have a bit field size that is larger than that which the target BWP supports. In this case, the one or more bit fields of the DCI may be truncated (e.g., via most significant bit (MSB) truncation) so that the bit field size of the truncated DCI matches that of the target BWP.

The second technique for DCI signaling for triggering BWP switching, a delay of k2=2 may provide a relatively similar delay to a k2=0 delay (as described according to the first technique for DCI signaling for triggering BWP switching). Further, according to the second technique, it may be possible to perform PDCCH or PUCCH processing (e.g., in one half slot or less), a software delay, and the transition (e.g., the transition also in one half slot or less) to all be performed within a single slot.

Additionally or alternatively, a third technique for DCI signaling for triggering BWP switching may proceed similarly as described for the second technique. According to the third technique, however, the DCI size may be determined overall based on the maximum DCI size across all configured BWPs. Accordingly, a transformation may be applied to zero-pad the DCI to the determined maximum DCI size. Then, the DCI field sizes and position may be interpreted particularly based on the target BWP. In some cases, the third technique may be based on a full DCI size equalization. In some cases, the third technique may be combined (i.e., to create a hybrid) with the second technique described herein, for cross-BWP scheduling. This is described in further detail below, as described with reference to FIGS. 5-6.

Additionally or alternatively, in a fourth technique for DCI signaling for triggering BWP switching, the size of one or more, or all, DCI bit fields may be determined according to the current BWP. In this case, the data transmitted using BWP format as indicated by the corresponding BWP index. If the BWP index activates a different BWP format, a BWP switch may be triggered to switch to a target BWP (e.g., from a narrow BWP to a wide BWP, or vice versa). According to the fourth technique, however, if DCI includes bit fields having a bit field size that is different than that of the target BWP, the DCI of the current slot may not schedule a data transmission for the upcoming slot, and the zero-padding or truncating as described herein with respect to the second technique may not be applied. In this case, an assumption may be used in which it is assumed to be possible to switch BWP without scheduling data, and the DCI of the upcoming slot provides the scheduling information for that slot's data. As described herein for the second technique for DCI signaling for triggering BWP switching, according to the fourth technique, a delay of k2=2 may provide a relatively similar delay to a k2=0 delay according to the first technique for DCI signaling for triggering BWP switching. That is, the fourth technique may provide for a similar delay as compared to the second technique, but without a scheduled payload. Further, according to the fourth technique, it may be possible to perform PDCCH or PUCCH processing (e.g., in one half slot or less), a software delay, and the transition (e.g., the transition also in one half slot or less) to all be performed within a single slot.

Figure 4E:
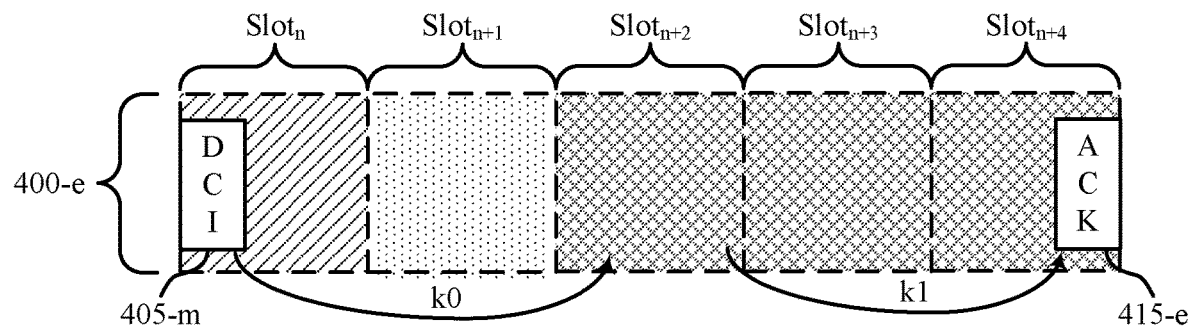
FIG. 4E illustrates examples of uplink and downlink transmission timelines that support DCI signaling techniques for active BWP switching in accordance with aspects of the present disclosure.
Figure 4E:
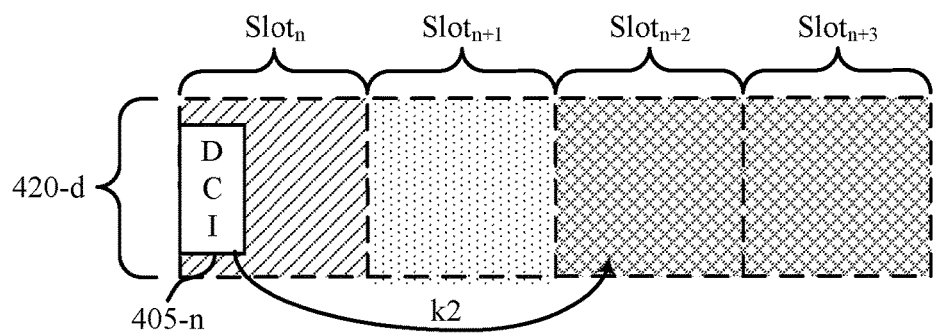
Figure 4E:
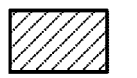
Figure 4E:
Figure 4E:
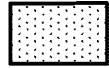

FIG. 4E illustrates examples of uplink and downlink transmission timelines that support DCI signaling techniques for active BWP switching in accordance with aspects of the present disclosure. In particular, FIG. 4E illustrates an example of a downlink transmission timeline 400-e that supports DCI signaling schemes for BWP switching in accordance with aspects of the present disclosure. FIG. 4E further illustrates an example of an uplink transmission timeline 420-d that supports DCI signaling schemes for BWP switching in accordance with aspects of the present disclosure. In some examples, downlink transmission timeline 400-e and uplink transmission timeline 420-d may implement aspects of wireless communications systems 100 and 200. Downlink transmission timeline 400-e and uplink transmission timeline 420-d illustrate a further example of the fourth technique described herein and a fifth technique for a UE 115 switching between a narrow BWP and a wide BWP based on control channel signaling from a base station 105.

Downlink transmission timeline 400-d may illustrate an example of a downlink transmission timeline with a k0=2 delay—that is, downlink transmission timeline 400-e shows transmissions with a scheduling delay of one slot after a control channel until a PDSCH 410 may arrive with respect to the DCI 405. Uplink transmission timeline 420-c may illustrate an example of an uplink transmission timeline with a k2=2 delay—that is, uplink transmission timeline 420-b shows transmissions with a scheduling delay of two slots after a control channel until a PUSCH 425 may arrive with respect to the DCI 405.

With regard to the fourth technique, as described herein with reference to FIG. 4D, rather than applying the transformations described above, a null assignment may be applied, indicating that DCI in the upcoming control channel of the upcoming slot will provide scheduling information. That is, instead of the current slot providing a grant for the data for the upcoming slot, the DCI of the upcoming slot may have full scheduling functionality and may accordingly schedule the data transmission for its own slot. In some cases, for consistency in timing in the case of a null assignment, a same timeline, but without a corresponding payload, may be assumed during a PUSCH and/or PDSCH transmission time.

Additionally or alternatively, a fifth technique for DCI signaling for triggering BWP switching may proceed similarly as described for the fourth technique. According to the fifth technique, however, the UE may always perform BWP switches without a scheduled data transmission for the upcoming slot. That is, according to the fifth technique, a null assignment may be used for the DCI of each control channel for the upcoming slot, such that each DCI will schedule the data transmission for its own slot. According to the fifth technique, a delay of k2=2 may provide a relatively similar or smaller timing to a k2=0 timing according to the first technique for DCI signaling for triggering BWP switching. That is, the fifth technique may provide for a similar delay as compared to the second technique, but without a scheduled payload. Further, according to the fifth technique, it may be possible to perform PDCCH or PUCCH processing (e.g., in one half slot or less), a software delay, and the transition (e.g., the transition also in one half slot or less) to all be performed within a single slot.

Figure 5:
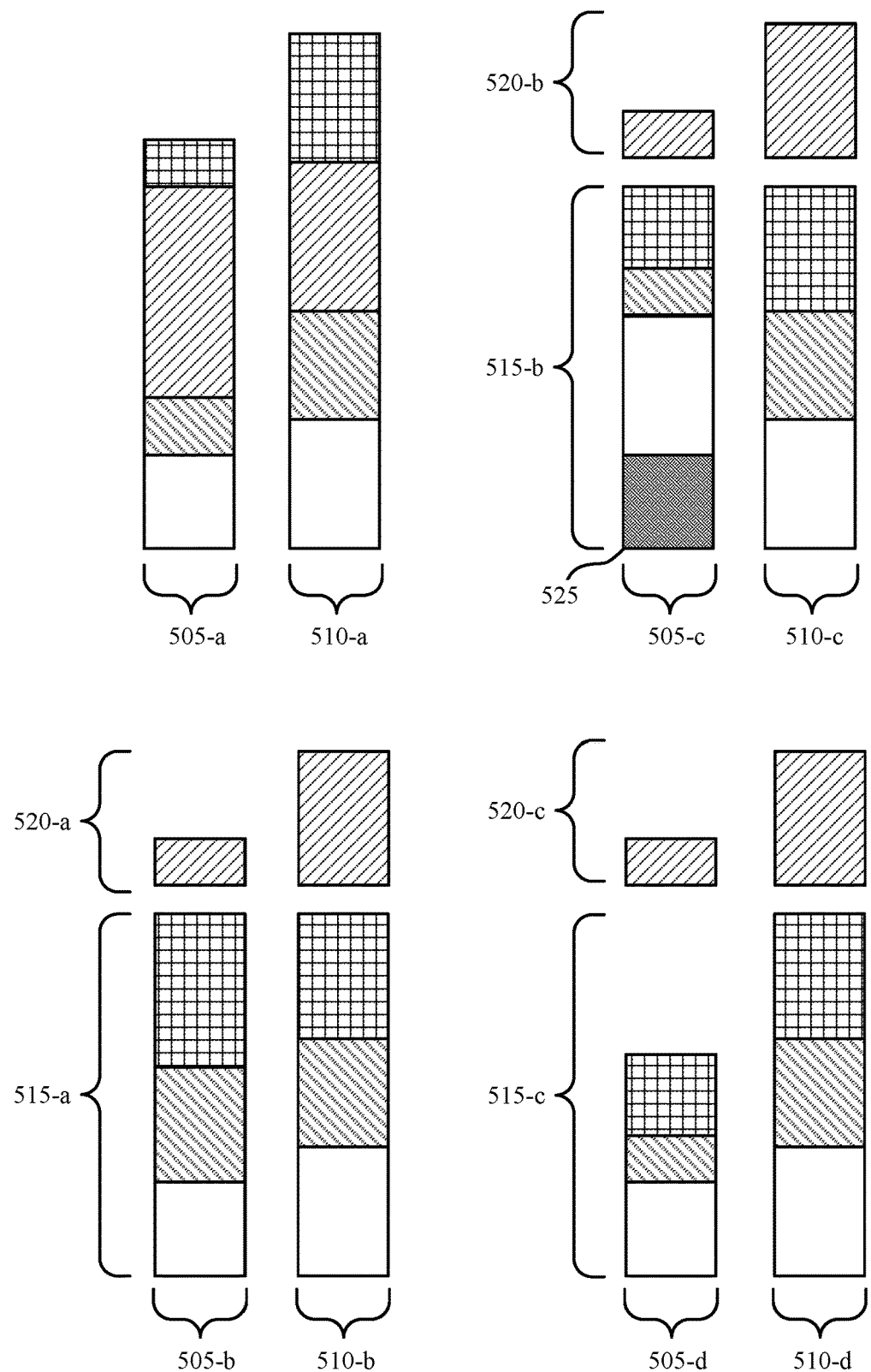
FIG. 5 illustrates an example of a transmission scheme that supports DCI signaling schemes for BWP switching in accordance with aspects of the present disclosure.

FIG. 5 illustrates an example of a transmission scheme 500 that supports DCI signaling schemes for BWP switching in accordance with aspects of the present disclosure. In some examples, transmission scheme 500 may implement aspects of the wireless communications systems 100 and 200. Transmission scheme 500 show DCI fields according to a translation from a first BWP to a second BWP.

Transmission scheme 500 includes current DCI fields 505-a, 505-b, 505-c, and 505-d, which may be examples of DCI configured according to a first BWP format. The first BWP format may be, for example, a narrow BWP format. Transmission scheme 500 includes target DCI fields 510-a, 510-b, 510-c, and 510-d, which may be examples of DCI configured according to a second BWP format. The second BWP format may be, for example, a narrow BWP format to which the UE 115 is to switch to.

A transformation rule may be first be applied to the current DCI fields 505-a (e.g., a set of packed DCI fields). When, for example, when a smaller resource assignment is transformed to a larger resource assignment, as shown in FIG. 5 (e.g., when a resource assignment based on a narrow BWP is scheduled to switch to a wide BWP), techniques may be provided for when both a BWP of a first format (e.g., type 0) and a BWP of a second format (e.g., type 1) are configured. In such cases, an MSB may be used to indicate which type is to be used. Further, in some cases, zero padding may not be used. Instead, a type 1 allocation may be, for example (assuming a zero pad of the MSBs): a large resource assignment of 16 bits that may correspond to 270 PRBs; and a small resource assignment of 9 bits that may correspond to 25 PRBs. In such cases, to schedule a relatively larger number of PRBs, a relatively larger numeric resource indication value (MV) may be used, represented, for example, with 9 bits to equal a value of 511, which may be viewed as a 16-bit value. In some cases, a number of PRBs may be set by: Floor(511/270)+1=2. In some cases, a starting PRB may be set by: 511 mod 270=241.

In some cases, a mapping rule may also be defined. In some cases, the resource assignment may be interpreted based on the current BWP (e.g., the narrow BWP), and then physically translating the resources to the new BWP. In some cases, a fixed alignment rule (e.g., aligned to a smaller frequency, or aligned to a smaller frequency) may defined. Additionally or alternatively, the physical location of the resources may be directly mapped to their physical location, and if not completely within the overlap, may be interpreted as a null assignment. Additionally or alternatively, a hybrid of the previous two methods may be applied, for example, if a PRB is completely within the overlap, a direct mapping may be used, and otherwise a fixed alignment rule may be used.

Alternatively, when, for example, a larger resource assignment is transformed to a smaller resource assignment (e.g., a resource assignment based on a wide BWP scheduling a narrow BWP), truncation may be applied when both type 0 and type 1 are configured and the MSB is used to indicate the type. In some cases, a base station 105 may ensure that the values of each of the truncated fields is zero (or another predetermined value), so that the UE 115 may perform error-checking.

In some cases, according to the describes techniques for DCI signaling that triggers BWP switching, a network (e.g., via a base station 105) may support transitions from larger BWPs to smaller BWPs by ensuring that the transformation (e.g., a resource assignment truncation) results in an appropriate allocation for the size of DCI for the size of the BWP. However, in some cases, for a transition from a smaller BWP to a larger BWP, not all of the BWP's PRBs may be addressed via the transformation. For example, the network may allocate assignment options other than those that it may determine to be appropriate. To remedy this potential conflict, techniques described herein describe the use of a null assignment. That is, resource assignment fields may be populated with a null assignment, and when a UE 115 detects the null assignment, the UE 115 may ignore other DCI fields other some defined fields (e.g., a BWP ID, for BWP switch triggering; and the k0 and/or k2 parameters in time domain-resource assignment, for determining the timing expected for the BWP switch). In some cases, a further restriction may be applied in which the null-assignment may be indicated in a DCI that indicates BWP switching. In some cases, these transformation considerations may apply to DCI fields 505, resource assignment fields, and/or to other fields within the DCI.

In some cases, an algorithm may be provided during BWP configuration or during RRC reconfiguration that affects parameters with a DCI field-size dependence. For each configured BWP, a DCI payload size may be calculated, and the size of a subset of the payload containing non-transformable fields 515 may be denoted as X(i), where i=0.numConfiguredBWPs−1.

As shown in FIG. 5, the current DCI fields 505-*a* may be configured according to a narrow BWP format, and the target DCI fields 510 may be configured according to a wide BWP format. Current DCI fields 505-*a* and current DCI fields 505-*b* may be examples of packed DCI fields of a DCI format before a transformation rule is to be applied.

In some cases, the described techniques (e.g., the third technique, as described with reference to FIG. 4E) may be based on a full DCI size equalization. In some cases, the third technique may be combined (i.e., to create a hybrid) with the second technique described herein, for cross-BWP scheduling. This may, for example, avoid a potential waste of bits because of a DCI size disparity across a configured BWP to apply a "one size fits all" transformation rule.

In some examples, a particular DCI field may be designated as "transformable," or as "non-transformable." Transformable fields may refer to an ability to convert a field with fewer bits to a field with more bits. Non-transformable fields may refer to fields for which zero-padding rules may not be applied. That is, non-transformable fields may correspond to field that may be an exception to transformation rules, and thus may not be transformed. Transformable DCI fields may be, for example, a null set (i.e., all fields are non-transformable), or can be the full set of DCI fields. In some cases, whether a field is transformable or not may be configure via higher-layer signaling. In some cases, a truncation rule to convert a field with more bits to a field with fewer bits may always be "transformable."

In some cases, the transformation rule for DCI fields whose size can be BWP-dependent may be defined according to one of two formats, as shown in the following tables.

TABLE 1

| | Format 1_1 | | |
|---|---|---|---|
| | Size (bits) | RRC parameter dependence | Impact of mismatched size (zero-padding) |
| Freq-domain resource assignment (this transformation may apply with restrictions) | See further discussion below | | Some resources may not be schedulable |
| Time-domain resource assignment (in some cases, this may be a non-transformable field) | 0, 1, 2, 3, 4 | pdsch-symbolAllocation | Index to a configurable table, e.g., network may put the most versatile configurations in the top entries. |

TABLE 1-continued

Format 1_1

| | Size (bits) | RRC parameter dependence | Impact of mismatched size (zero-padding) |
|---|---|---|---|
| VRB-to-PRB mapping (this transformation may apply with restrictions) | 0, 1 | Resource-allocation-config | May force no VRB-to-PRB mapping |
| PRB bundling size indicator (this transformation may apply with restrictions) | 0, 1 | PRB_bundling | May force choosing some particular PRB value |
| Rate matching indicator (in some cases, this may be a non-transformable field) | 0, 1, 2 | rate-match-PDSCH-resource-set (per BWP or per cell depending on type) | This may result in incorrect rate matching, potentially decoding failure |
| Zero power (ZP) channel state information (CSI)-reference signal (RS) trigger (this transformation may apply with restrictions) | 0, 1, 2 | ZP-CSI-RS-ResourceConfigList | Index to a configurable table, e.g., network may put the most versatile configurations in the top entries |
| MCS/NDI/RV | (5 + 1 + 2) × 1 or × 2 | Number-MCS-HARQ-DL-DCI | If current BWP has <=4 layers, and new BWP has >4 layers, this means $2^{nd}$ codeword may not be scheduled |
| Antenna port(s) | 4, 5, 6 | downlink-demodulation reference signal (DMRS)-config-type, downlink-DMRS-max-length | Index to fixed tables. May result in limitation in selection of code division multiplexing (CDM) group, DMRS ports, number of front-loaded symbols |
| Transmission configuration indication | 0, 3 | tci-PresentInDCI | For 0 to 3 bits mapping, special handling to assume the disabled case |

TABLE 2

Format 0_1

| | Size (bits) | RRC parameter dependence | Impact of mismatched size (zero-padding) |
|---|---|---|---|
| Freq-domain resource assignment (this transformation may apply with restrictions) | See further discussion below | | Some resources may not be schedulable |
| Time-domain resource assignment (in some cases, this may be a non-transformable field) | 0, 1, 2, 3, 4 | pusch-symbolAllocation | Index to a configurable table, e.g., network may put the most versatile configurations in the top entries |
| VRB-to-PRB mapping (this transformation may apply with restrictions) | 0, 1 | Resource-allocation-config, PUSCH-tp | May force no VRB-to-PRB mapping |
| Frequency hopping flag (this transformation may apply with restrictions) | 0, 1 | Resource-allocation-config | May force no frequency hopping |
| SRS resource indicator | 0, x, y | (General guidance is that SRS should be per BWP) | Index to fixed tables, which may result in limitation on the SRS resources that can be indicated (e.g., rank 1 only). |
| Precoding information and number of layers | 0 bit, {4, 5, 6}, {2, 4, 5}, {2, 4}, {1, 3} | ulTxConfig, PUSCH-tp, ULmaxRank, ULCodebookSubset | Index to fixed tables which may result in limitation in number of layers, transmitted precoding matrix indicator (TPMI) |
| Antenna port(s) | 2, 3, 4, 5 | PUSCH-tp, UL-DMRS-config-type, UL-DMRS-max-len | Index to fixed tables, which may result in limitation in selection of CDM group, DMRS ports, number of front-loaded symbols |

TABLE 2-continued

Format 0_1

| | Size (bits) | RRC parameter dependence | Impact of mismatched size (zero-padding) |
|---|---|---|---|
| CSI request (this transformation may apply with restrictions) | 0, 1, 2, 3, 4, 5, 6 | ReportTriggerSize (in CSI-MeasConfig) | 0 means no CSI-request. 1 bit may trigger periodic CSI only, etc. |
| PTRS-DMRS | 0, 2 | UL-PTRS-present, PUSCH-tp | Index to fixed tables, may result in use of first row only, leading to limitation on DMRS port, etc. |
| Beta_offset (this transformation may apply with restrictions) | 0, 2 | uci-on-PUSCH | Index to a configurable table, e.g., network may put the most versatile configurations in the top entries |
| DMRS sequence initialization (this transformation may apply with restrictions) | 0, 1 | PUSCH-tp | May not be able to do non-orthogonal MU-MIMO |

As for the frequency domain resource assignment, the transformation rule may be defined according to Table 3:

TABLE 3

Freq-domain Resource Assignment

| | | Type0 resource assignment | | Type1 |
|---|---|---|---|---|
| Carrier BW(MHz/$N_{RB}$) | BWP size ($N_{BWP-RB}$) | | $\lceil \frac{N_{BWP-RB}}{P} \rceil$ | resource assignment |
| 50/270 | 270 | 6 | 17 | 16 |
| | 52 | | 13 | 11 |
| | 25 | | 13 | 9 |

In a first example, the fields other those that may be directly related with the bandwidth (e.g., the frequency-domain resource assignment) may each be of the same size from a current DCI field 505 to a target DCI field 510. Current DCI fields 505-b and target DCI fields 510-b may be an example of a case in which the total size of the non-transformable fields 515-b of the current DCI fields 505-b may be equal to that of the target DCI fields 510-b. Current DCI fields 505-b and target DCI fields 510-b may also include transformable fields 520-a (e.g., bit fields). In this case in which the size of the non-transformable fields 515-b of the current DCI fields 505-b matches the size of non-transformable fields 515-b of the target DCI fields 510-b, the DCI size field sizes and content may be interpreted according to the BWP format of the target DCI fields 510-b. This is shown in FIG. 5 in the transformation of current DCI fields 505-b to the target DCI fields 510-b. In some cases, this technique may facilitate cross-BWP scheduling.

In some cases, however, the DCI field size may be mismatched, in which case the truncation or zero padding rules described herein may be applied. Some fields, for example, the time-domain resource assignment, a smaller field size may support fewer addressable rows in its corresponding table. In such cases, the network may commonly apply a configuration across configured BWPs in lower indexed rows.

In some cases, the described techniques for DCI signaling for triggering BWP switching may provide for relatively improved robustness of DCI pruning, and to provide for relatively reduced false detection probability. When truncating a larger DCI field into a smaller DCI field (e.g., following a transition from a wide BWP to a narrow BWP), a base station 105 may ensure that the content of each of the truncated fields has a value of zero (or, any other predetermined value). In this case, if the UE 115 detects a non-zero value in a truncated field, the UE may determine that the truncating process may not be valid, and thus may not process the DCI as being valid.

Current DCI fields 505-c and target DCI fields 510-c may illustrate an example in which the sizes of the non-transformable fields 515-b are mismatched, while the size of the transformable fields 520-b may be modified using transformation rules. In this case, when X(i) is not the same across all configured BWPs (i.e., i=0.numConfiguredBWPs-1), then a partial size equalization may be applied. For example, for i=0.numConfiguredBWPs-1, the DCI payload size may be increased for BWP of by the difference of max{X}-X(i).

In the case of current DCI fields 505-c to target DCI fields 510-c, the total size of the non-transformable fields 515-b of current DCI fields 505-c may be padded to equalize the size of the non-transformable fields 515-b with the target DCI fields 510-c. This is shown with the addition of the padding bits 525. In some cases, however, for a BWP with a maximum size, the difference may be zero, which may equalize the size of the subset of a payload containing only non-transformable fields 515-b.

Additionally or alternatively, a minimum size threshold may be defined for each of the fields of the non-transformable fields 515 of the current DCI fields 505-b and the non-transformable fields 515 of the target DCI fields 510-b. DCI content with at least the defined minimum size threshold for the corresponding field may then be defined to be compatible with any BWP format. For example, a rate matching indicator field may have a size of 0, 1, or 2 bits. If a minimum size threshold for the rate matching indicator field is defined to be 1 bit, then the content of the rate matching indicator field may be compatible with a BWP format nominally requiring 2 bits for the rate matching indicator field. Similarly, if the minimum size threshold for the rate matching indicator field were defined to be 2 bits, the content of the rate matching indicator field may again be compatible with the BWP format that requires 2 bits be used for the field. In some cases, the minimum size threshold for a particular DCI may specified or configure via higher-layer signaling.

Alternatively, in some cases of mismatched sizes of non-transformable fields 515, no scheduling may be applied, in which case for a BWP switch from one BWP format to another. This may be shown in FIG. 5 with current DCI fields 505-d to target DCI fields 510-d. Current DCI fields 505-d and target DCI fields 510-d may also include transformable fields 520-c. In this case, as X(a) (i.e., the size of the non-transformable bits of current DCI fields 505-d) may be smaller than X(b) (i.e., the size of the non-transformable bits of target DCI fields 510-d), the network may be expected to refrain from scheduling (e.g., provide a null assignment), but the BWP switch may still be triggered. In such cases, during per-slot operation, processing of the non-transformable fields 515-c may be skipped. Alternatively, the resource assignment fields may be populated with a null assignment, and when the UE 115 detects the null assignment, the UE 115 may ignore other DCI fields other some defined fields (e.g., a BWP ID, for BWP switch triggering; and the k0 and/or k2 parameters in time domain-resource assignment, for determining the timing expected for the BWP switch). In some cases, a further restriction may be applied in which the null-assignment can only be indicated in a DCI that indicates BWP switching.

Figure 6:
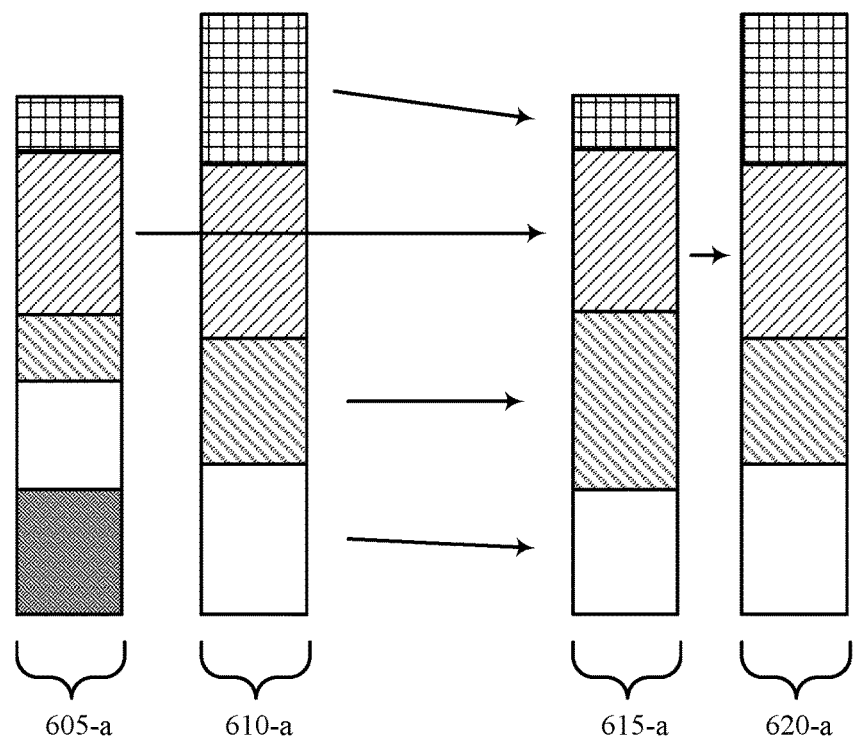
FIG. 6 illustrates an example of a processing scheme that supports DCI signaling schemes for BWP switching in accordance with aspects of the present disclosure.
Figure 6:
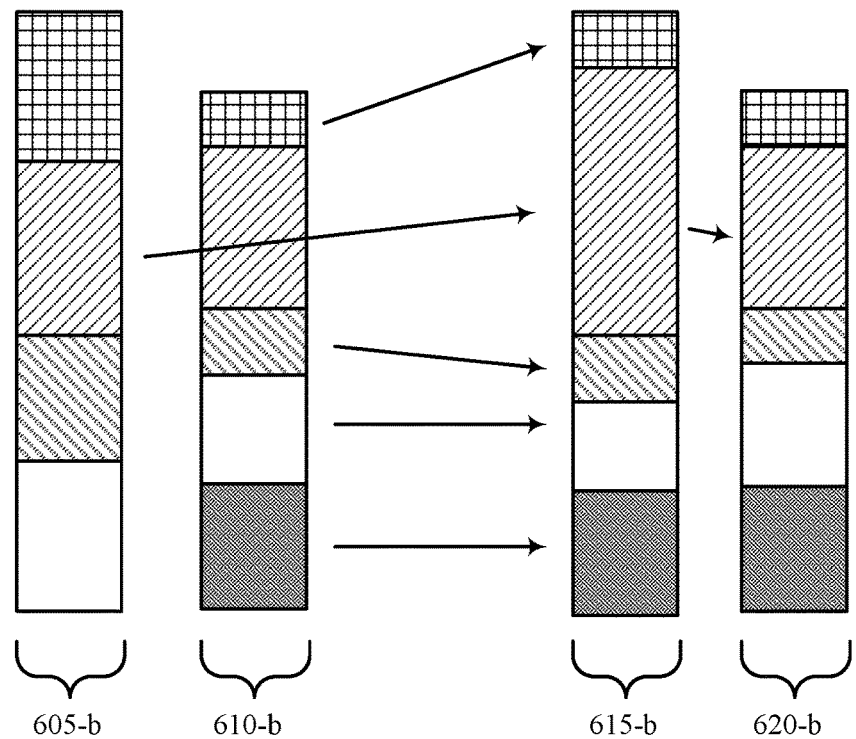

FIG. 6 illustrates an example of a processing scheme 600 that supports DCI signaling schemes for BWP switching in accordance with aspects of the present disclosure. In some examples, processing scheme 600 may implement aspects of wireless communications systems 100 and 200. Processing scheme 600 may illustrate DCI fields according to a translation from a first BWP to a second BWP.

Processing scheme 600 includes current DCI fields 605-a and 605-b, which may be examples of a DCI configured according to a first BWP format. The first BWP format may be, for example, a narrow BWP format. Processing scheme 600 includes target DCI fields 610-a and 610-b, which may be examples of a DCI configured according to a second BWP format, which may correspond to the respective current DCI fields 605. The second BWP format may be, for example, a narrow BWP format to which the UE 115 is to switch.

In some cases, for DCI processing, a BWP change from a current BWP to a new BWP may be signaled in a DCI, for example, for cross-BWP scheduling. In this case, each DCI field may be processed. If a field is transformable, the size may be determined based on the current BWP, and a transformation rule may be applied to the field, interpreted, and transformed for the new BWP. If the field is non-transformable, the size may be determined based on the new BWP, and the field content may be interpreted according to the new BWP. Otherwise (e.g., in the case of same-BWP scheduling), there may be no BWP change, and the DCI fields may be processed according to a current BWP.

As shown in FIG. 6, current DCI fields 605-a may be to switch to target DCI fields 610-a. The transformable bits of the current DCI fields 605-a may be parsed to obtain the parsed DCI fields 615-a. The parsed DCI fields 615-a may then have a transformation applied to obtain the transformed DCI field 620-a. The non-transformable bits of the current DCI fields 605-a may have their size determined based on the target DCI fields 610-a, and their corresponding content interpreted according to the target BWP. This may be an example of a transformation for a cross-scheduled switch from a narrow BWP to a wide BWP.

Similarly, current DCI fields 605-b may be to switch to target DCI fields 610-b. The transformable bits of the current DCI fields 605-b may be parsed to obtain the parsed DCI fields 615-b. The parsed DCI fields 615-b may then have a transformation applied to obtain the transformed DCI field 620-b. The non-transformable bits of the current DCI fields 605-b may have their size determined based on the target DCI fields 610-b, and their corresponding content interpreted according to the target BWP. This may be an example of a transformation for a cross-scheduled switch from a wide BWP to a narrow BWP.

Figure 7:
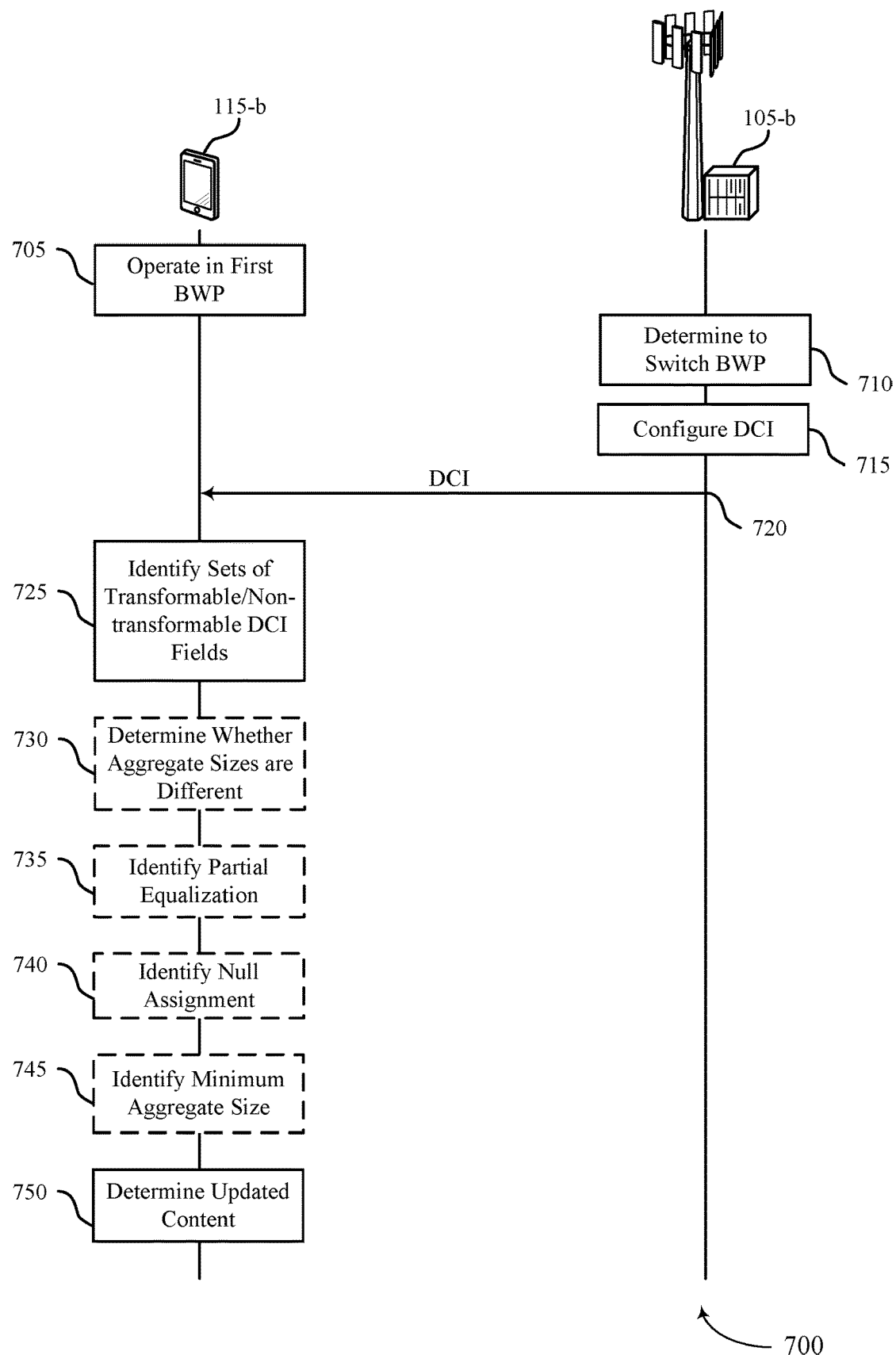
FIG. 7 illustrates an example of a process flow in a system that supports DCI signaling schemes for BWP switching in accordance with aspects of the present disclosure.

FIG. 7 illustrates an example of a process flow 700 in a system that supports DCI signaling schemes for BWP switching in accordance with aspects of the present disclosure. In some examples, process flow 700 may implement aspects of wireless communications system 100. For example, process flow 700 includes a UE 115-b and base station 105-b that may be examples of the corresponding devices described with reference to FIG. 1. Process flow may illustrate an example of DCI configurations that enable efficient updating of DCI fields between different BWPs. For example, DCI may be configured with a set of transformable DCI fields and a set of non-transformable fields, and UE 115-b may update the content of each DCI field in the DCI based on whether a DCI field is transformable or non-transformable.

UE 115-b may be capable of operation in multiple BWPs, and at 705 may be operating in a first BWP. For example, the first BWP may enable UE 115-b to monitor a relatively narrow BWP for energy saving. In other examples, UE 115-b may operate in the first BWP for the reception or transmission of a relatively large amount of data, and the first BWP may be appropriately wide enough to facilitate such data reception/transmission.

At 710, base station 105-b may determine to switch operation of UE 115-b from the first BWP to a second BWP. For example, base station 105-b may have data to send to UE 115-b in the second BWP that has a bandwidth that is greater than the first BWP. Additionally or alternatively, base station 105-b may have completed a data transmission to UE 115-b in the first BWP, and UE 115-b may accordingly conserve power by tuning a radio to a narrower second BWP.

At 715, base station 105-b may generate DCI having multiple DCI fields, where each of the multiple DCI fields may have a respective first size based on the first BWP. Base station 105-b may then configure the DCI with a set of transformable DCI fields and a set of non-transformable DCI fields. In some cases, the transformable fields may include content in the first BWP that is able to be updated via a transformation rule to DCI fields having a respective second size in the second BWP. Additionally, the non-transformable DCI fields may have content in the first BWP that is unable to be updated via the transformation rule. In some cases, the transformable fields may be the full set of DCI fields, or may be the null set (e.g., the non-transformable fields comprise the full set of DCI fields).

In some examples, base station 105-b may optionally configure an aggregate first size of the set of non-transformable DCI fields in the first BWP to be different than an aggregate second size of the set of non-transformable DCI fields in the second BWP, where the aggregate second size is greater than the aggregate first size. In such cases, base station 105-b may insert, in the first BWP, a set of partial size equalization bits including a difference between the aggregate first size and the aggregate second size, where a total aggregate size of the set of partial size equalization bits and the set of non-transformable DCI fields for the first BWP is equal to the aggregate second size of the set of non-transformable DCI fields in the second BWP. However, in some cases, multiple BWPs may be configured for UE 115-b, and base station 105-b may thus configure an aggregate first size of the set of non-transformable DCI fields in the first BWP to be different from at least one respective aggregate size of respective sets of non-transformable DCI fields in a plurality of BWPs. As a result, base station 105-b may insert, in the first BWP, a set of partial size equalization bits including a difference between a maximum respective aggregate size and the aggregate first size such that a total aggregate size of the set of partial size equalization bits and the set of non-transformable DCI fields in the first BWP may be equal to the maximum respective aggregate size.

Additionally or alternatively, base station 105-b may configure the aggregate first size of the set of non-transformable DCI fields in the first BWP to be different than the aggregate second size of the set of non-transformable DCI fields in the second BWP, where the aggregate second size is less than the aggregate first size. In such cases, base station 105-*b* may insert, in the second BWP, a set of partial size equalization bits including a difference between the aggregate first size and the aggregate second size, where a total aggregate size of the set of partial size equalization bits and the set of non-transformable DCI fields for the first BWP may be equal to the aggregate second size of the set of non-transformable DCI fields in the second BWP. In the case of multiple BWPs, base station 105-*b* may configure an aggregate second size of the set of non-transformable DCI fields in the second BWP to be different from at least one respective aggregate size of the respective sets of non-transformable DCI fields in a plurality of BWPs. Base station 105-*b* may then insert, in the second BWP, the set of partial size equalization bits including a difference between a maximum respective aggregate size and the aggregate second size such that a total aggregate size of the set of partial size equalization bits and the set of non-transformable DCI fields in the second BWP may be equal to the maximum respective aggregate size. In any of the above examples, the size of the sets of non-transformable DCI fields across different BWPs may be equalized such that UE 115-*b* may update the content of the DCI fields in a new BWP.

In other examples, base station 105-*b* may configure a minimum size for each DCI field of the set of non-transformable DCI fields, wherein content within a DCI field having the minimum size is able to be updated to a DCI field in the second BWP. Additionally or alternatively, base station 105-*b* may configure the aggregate first size of the set of non-transformable DCI fields in the first BWP to be less than the aggregate second size of the set of non-transformable DCI fields in the second BWP and transmit a null assignment (e.g., within the DCI) for the second BWP based on the aggregate first size being less than the aggregate second size.

At 720, base station 105-*b* may transmit, and UE 115-*b* may receive, DCI while UE 115-*b* is operating in the first BWP. Additionally, UE 115-*b* may receive, as part of the DCI, an indication to switch from operating in the first BWP to operating in a second BWP. At 725, UE 115-*b* may identify, from the multiple DCI fields, the configured set of transformable DCI fields having content in the first BWP that may be able to be updated via a transformation rule to DCI fields having a respective second size in the second BWP. UE 115-*b* may also identify, from the plurality of DCI fields, the set of configured non-transformable DCI fields having content in the first BWP that may be unable to be updated via the transformation rule to DCI fields having the respective second size in the second BWP.

Upon identifying the transformable and non-transformable DCI fields, at 730, UE 115-*b* may optionally determine whether the aggregate first size of the set of non-transformable DCI fields in the first BWP is different from the aggregate second size of the set of non-transformable DCI fields in the second BWP. In cases where the aggregate sizes of the non-transformable DCI fields are the same across multiple BWPs, UE 115-*b* may proceed to process the DCI fields based on the second BWP. In other cases, there may be a set of non-transformable DCI fields that has a different size than other sets of non-transformable DCI fields. Accordingly, UE 115-*b* may utilize the various configurations of the DCI for interpreting the DCI for the second BWP.

For example, at 735, UE 115-*b* may identify the set of partial equalization bits in the first BWP or the second BWP. In such cases, UE 115-*b* may update the content of the set of non-transformable DCI fields based on the set of partial size equalization bits. UE 115-*b* may also determine, based on the second BWP, the set of non-transformable DCI fields to identify the respective second size, an ordering, a packing, a content of a DCI field, or a combination thereof.

Additionally or alternatively, at 740, UE 115-*b* may identify, in the DCI, a null assignment for the second BWP. In some examples, the null assignment may be based on the aggregate first size being less than the aggregate second size. Upon receiving the null assignment, UE 115-*b* may switch operation from the first BWP to the second BWP based on the null assignment and refrain from determining content in at least the set of non-transformable DCI fields. In some cases, identifying the null assignment for the second BWP may include detecting the null assignment within a resource assignment field of the multiple DCI fields. In some cases, when UE 115-*b* detects a null assignment within a resource assignment field from the multiple DCI fields, UE 115-*b* may also detect a BWP ID that indicates the switch from the first BWP to the second BWP. In some examples, UE 115-*b* may also determine a timing value indicating a time difference between the received DCI and a start of the second BWP (which may be implicit or explicitly indicated) and refrain from detecting a remaining set of DCI fields from the plurality of DCI fields based on the detected null assignment.

In some examples, at 745, UE 115-*b* may identify a minimum size for each DCI field of the set of non-transformable DCI fields. In such cases, the content within a DCI field having the minimum size may be updated to a DCI field in the second BWP. In some cases, a size of the content within the DCI is a static size greater than or equal to the minimum size (e.g., certain content may always be configured to be the same size to eliminate errors when interpreting the content for a different BWP).

At 750, UE 115-*b* may then determine an updated content of the multiple DCI fields for application to the second BWP based at least in part on whether each DCI field is a transformable DCI field or a non-transformable DCI field. For instance, UE 115-*b* may update the content of the set of transformable DCI fields via the transformation rule and determine the updated content for the set of transformable DCI fields based on the second BWP. In some examples, UE 115-*b* may identify a DCI field from the set of transformable DCI fields to be truncated based on the DCI field having the respective first size in the first BWP that is larger than the respective second size in the second BWP. In such cases, UE 115-*b* may determine that content within the DCI field has a predetermined value (e.g., zero) and may truncate the DCI field based at least in part on the determination that the content has the predetermined value. In some cases, UE 115-*b* may assume that base station 105-*b* configured the DCI fields to be truncated with the predetermined value and, if UE 115-*b* determines that the content is not equal to the predetermined, may determine that the DCI is invalid.

Figure 8:
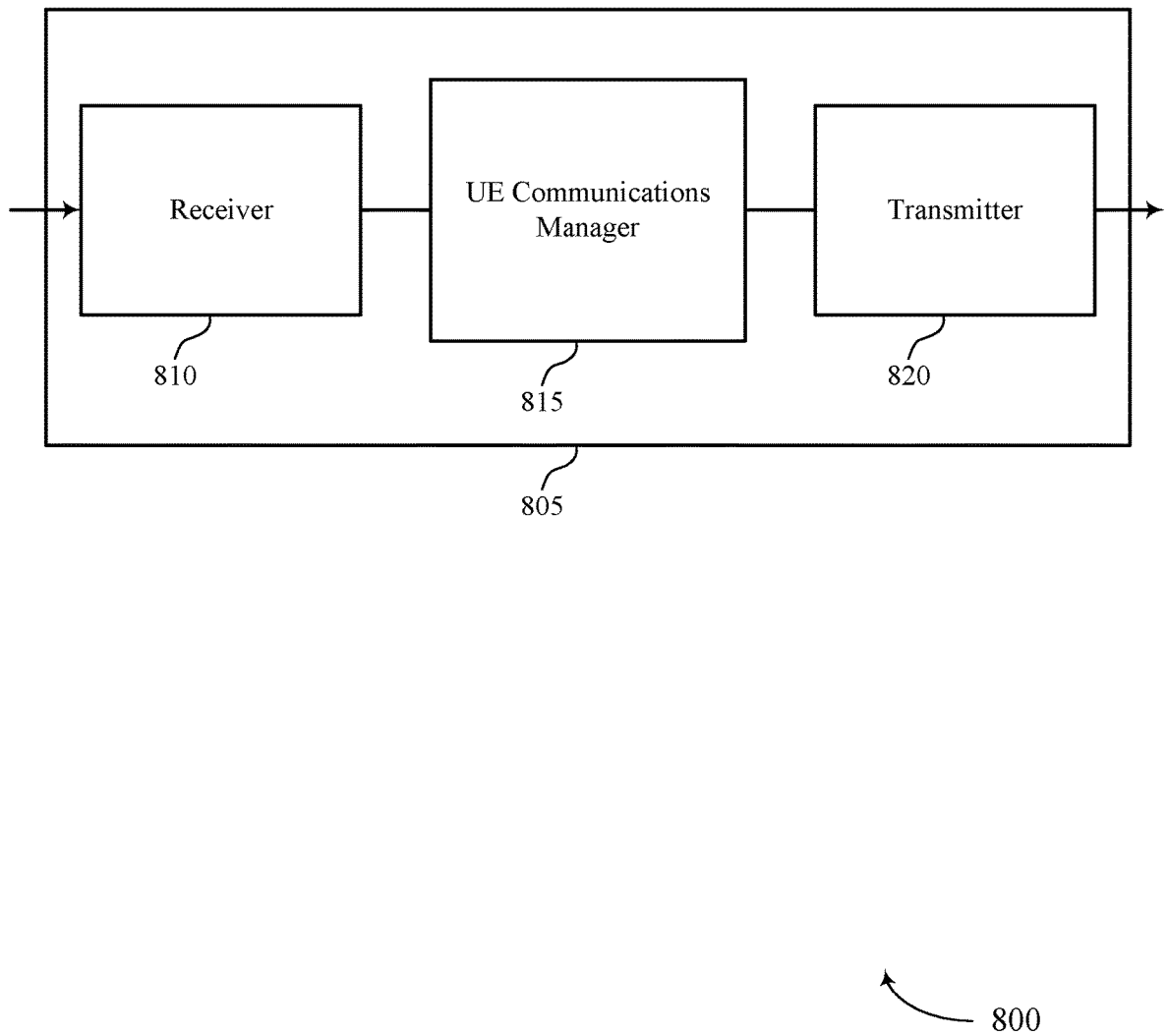
FIGS. 8 through 10 show block diagrams of a device that supports DCI signaling schemes for BWP switching in accordance with aspects of the present disclosure.

FIG. 8 shows a block diagram 800 of a wireless device 805 that supports DCI signaling schemes for BWP switching in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to DCI signaling schemes for BWP switching, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

UE communications manager 815 may receive, from a base station 105 and while operating in a first BWP, DCI having a set of DCI fields, each of the set of DCI fields having a respective first size based on the first BWP. In some cases, UE communications manager 815 may receive, as part of the DCI, an indication that the UE 115 is to switch from operating in the first BWP to operating in a second BWP. Additionally, UE communications manager 815 may identify, from the set of DCI fields, a set of transformable DCI fields having content in the first BWP that is able to be updated via a transformation rule to DCI fields having a respective second size in the second BWP, and identify, from the set of DCI fields, a set of non-transformable DCI fields having content in the first BWP that is unable to be updated via the transformation rule to DCI fields having the respective second size in the second BWP. UE communications manager 815 may determine an updated content of the set of DCI fields for application to the second BWP based on whether each DCI field is a transformable DCI field or a non-transformable DCI field.

In some examples, UE communications manager 815 may also receive, from a base station 105 and while operating in a first BWP, DCI during a first TTI and receive, as part of the DCI, an indication that the UE 115 is to switch from operating in the first BWP to operating in a second BWP. UE communications manager 815 may also determine that the second BWP begins at a second TTI that is subsequent to the first TTI and refrain from monitoring for a PDCCH based on the received DCI triggering the switch from the first BWP to the second BWP.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
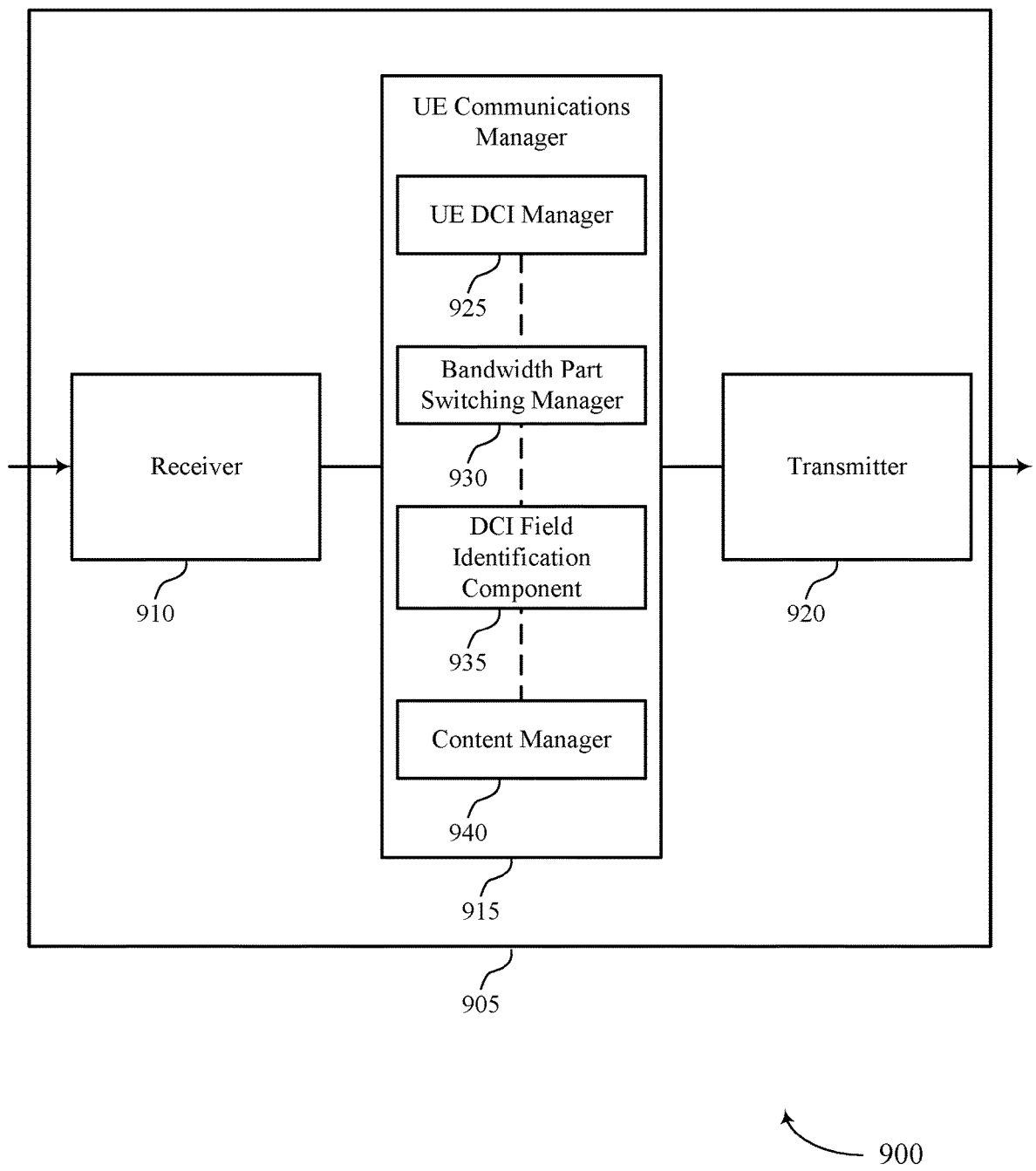

FIG. 9 shows a block diagram 900 of a wireless device 905 that supports DCI signaling schemes for BWP switching in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to DCI signaling schemes for BWP switching, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include UE DCI manager 925, bandwidth part switching manager 930, DCI field identification component 935, and content manager 940.

UE DCI manager 925 may receive, from a base station 105 and while operating in a first BWP, DCI having a set of DCI fields, each of the set of DCI fields having a respective first size based on the first BWP. In some examples, UE DCI manager 925 may identify, in a first BWP, a set of partial size equalization bits including a difference between the aggregate first size and the aggregate second size, where a total aggregate size of the set of partial size equalization bits and the set of non-transformable DCI fields in the first BWP is equal to the aggregate second size of the set of non-transformable DCI fields in the second BWP. Additionally or alternatively, UE DCI manager 925 may identify, in the second BWP, a set of partial size equalization bits including a difference between the aggregate first size and the aggregate second size, where a total aggregate size of the set of partial size equalization bits and the set of non-transformable DCI fields in the first BWP is equal to the aggregate second size of the set of non-transformable DCI fields in the second BWP.

In some examples, UE DCI manager 925 may identify, in the first BWP, a set of partial size equalization bits including a difference between a maximum respective aggregate size and the aggregate first size, where a total aggregate size of the set of partial size equalization bits and the set of non-transformable DCI fields in the first BWP is equal to the maximum respective aggregate size. Additionally or alternatively, UE DCI manager 925 may identify, in the second BWP, a set of partial size equalization bits including a difference between a maximum respective aggregate size and the aggregate second size, where a total aggregate size of the set of partial size equalization bits and the set of non-transformable DCI fields in the second BWP is equal to the maximum respective aggregate size. In some examples, UE DCI manager 925 may refrain from detecting a remaining set of DCI fields from the set of DCI fields based on a detected null assignment. In some cases, UE DCI manager 925 may receive, from a base station 105 and while operating in a first BWP, DCI during a first TTI. In some examples, UE DCI manager 925 may refrain from monitoring for a PDCCH based on the received DCI triggering the switch from the first BWP to the second BWP.

Bandwidth part switching manager 930 may receive, as part of the DCI, an indication that the UE 115 is to switch from operating in the first bandwidth part to operating in a second bandwidth part. In some cases, bandwidth part switching manager 930 may switch operation from the first bandwidth part to the second bandwidth part based on the null assignment. In other examples, bandwidth part switching manager 930 may detect a bandwidth part ID that indicates the switch from the first bandwidth part to the second bandwidth part and may determine a timing value indicating a time difference between the received DCI and a start of the second bandwidth part. In some examples, bandwidth part switching manager 930 may determine that the second bandwidth part begins at a second TTI that is subsequent to the first TTI. In some cases, the second TTI immediately follows a PDSCH transmission scheduled by the received DCI or a PUSCH transmission scheduled by the received DCI.

DCI field identification component 935 may identify, from the set of DCI fields, a set of transformable DCI fields having content in the first BWP that is able to be updated via a transformation rule to DCI fields having a respective second size in the second BWP. Additionally, DCI field identification component 935 may identify, from the set of DCI fields, a set of non-transformable DCI fields having content in the first BWP that is unable to be updated via the transformation rule to DCI fields having the respective second size in the second BWP. In some cases, DCI field identification component 935 may determine, based on the second BWP, the set of non-transformable DCI fields to identify the respective second size, an ordering, a packing, a content of a DCI field, or a combination thereof.

Content manager 940 may determine an updated content of the set of DCI fields for application to the second BWP based on whether each DCI field is a transformable DCI field or a non-transformable DCI field. In some examples, content manager 940 may update the content of the set of non-transformable DCI fields based on the set of partial size equalization bits. In some cases, content manager 940 may refrain from determining content in at least the set of non-transformable DCI fields. Additionally or alternatively, content manager 940 may update the content of the set of transformable DCI fields via the transformation rule, and determine the updated content for the set of transformable DCI fields based on the second BWP.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
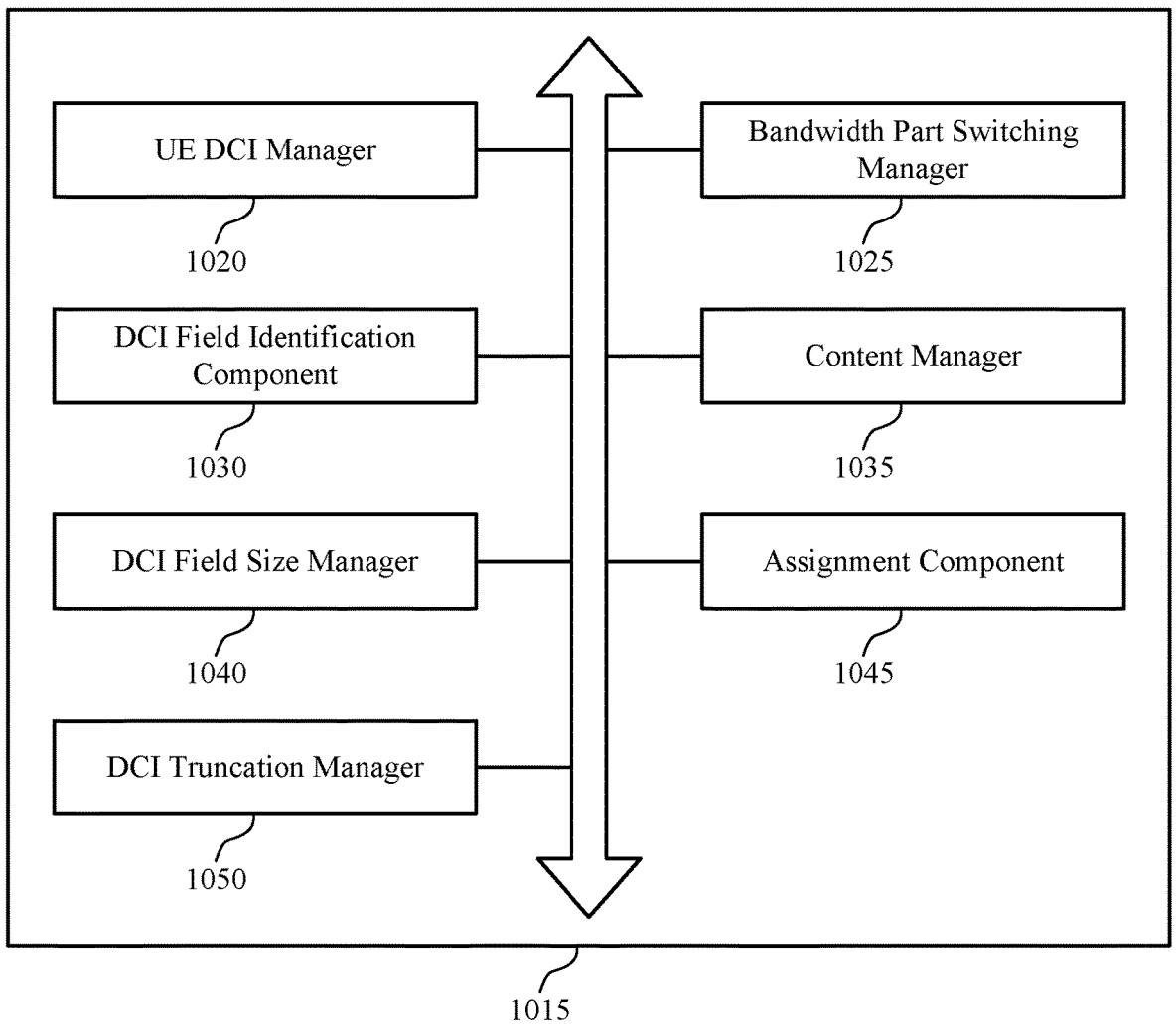

FIG. 10 shows a block diagram 1000 of a UE communications manager 1015 that supports DCI signaling schemes for BWP switching in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include UE DCI manager 1020, bandwidth part switching manager 1025, DCI field identification component 1030, content manager 1035, DCI field size manager 1040, assignment component 1045, and DCI truncation manager 1050. Each of these modules may communicate, directly or indirectly, with one another (e.g., via one or more buses).

UE DCI manager 1020 may receive, from a base station 105 and while operating in a first BWP, DCI having a set of DCI fields, each of the set of DCI fields having a respective first size based on the first BWP. In some examples, UE DCI manager 1020 may identify, in a first BWP, a set of partial size equalization bits including a difference between the aggregate first size and the aggregate second size, where a total aggregate size of the set of partial size equalization bits and the set of non-transformable DCI fields in the first BWP is equal to the aggregate second size of the set of non-transformable DCI fields in the second BWP. Additionally or alternatively, UE DCI manager 1020 may identify, in the second BWP, a set of partial size equalization bits including a difference between the aggregate first size and the aggregate second size, where a total aggregate size of the set of partial size equalization bits and the set of non-transformable DCI fields in the first BWP is equal to the aggregate second size of the set of non-transformable DCI fields in the second BWP.

In some examples, UE DCI manager 1020 may identify, in the first BWP, a set of partial size equalization bits including a difference between a maximum respective aggregate size and the aggregate first size, where a total aggregate size of the set of partial size equalization bits and the set of non-transformable DCI fields in the first BWP is equal to the maximum respective aggregate size. Additionally or alternatively, UE DCI manager 1020 may identify, in the second BWP, a set of partial size equalization bits including a difference between a maximum respective aggregate size and the aggregate second size, where a total aggregate size of the set of partial size equalization bits and the set of non-transformable DCI fields in the second BWP is equal to the maximum respective aggregate size. In some examples, UE DCI manager 1020 may refrain from detecting a remaining set of DCI fields from the set of DCI fields based on a detected null assignment. In some cases, UE DCI manager 1020 may receive, from a base station 105 and while operating in a first BWP, DCI during a first TTI. In some examples, UE DCI manager 1020 may refrain from monitoring for a PDCCH based on the received DCI triggering the switch from the first BWP to the second BWP.

Bandwidth part switching manager 1025 may receive, as part of the DCI, an indication that the UE 115 is to switch from operating in the first BWP to operating in a second BWP. In some cases, bandwidth part switching manager 1025 may switch operation from the first BWP to the second BWP based on the null assignment. In other examples, bandwidth part switching manager 1025 may detect a BWP ID that indicates the switch from the first BWP to the second BWP and may determine a timing value indicating a time difference between the received DCI and a start of the second BWP. In some examples, bandwidth part switching manager 1025 may determine that the second BWP begins at a second TTI that is subsequent to the first TTI. In some cases, the second TTI immediately follows a PDSCH transmission scheduled by the received DCI or a PUSCH transmission scheduled by the received DCI.

DCI field identification component 1030 may identify, from the set of DCI fields, a set of transformable DCI fields having content in the first BWP that is able to be updated via a transformation rule to DCI fields having a respective second size in the second BWP. Additionally, DCI field identification component 1030 may identify, from the set of DCI fields, a set of non-transformable DCI fields having content in the first BWP that is unable to be updated via the transformation rule to DCI fields having the respective second size in the second BWP. In some cases, DCI field identification component 1030 may determine, based on the second BWP, the set of non-transformable DCI fields to identify the respective second size, an ordering, a packing, a content of a DCI field, or a combination thereof. In some cases, the set of transformable DCI fields includes the set of DCI fields (e.g., the transformable DCI fields are full set of DCI fields). Alternatively, the set of non-transformable DCI fields includes the set of DCI fields (e.g., the transformable DCI fields are a null set of DCI fields where the non-transformable DCI fields are full set of DCI fields). In some cases, a configuration of the set of transformable DCI fields and the set of non-transformable DCI fields is preconfigured. In some cases, a configuration of the set of transformable DCI fields and the set of non-transformable DCI fields is received via high-layer signaling (e.g., RRC signaling).

Content manager 1035 may determine an updated content of the set of DCI fields for application to the second BWP based on whether each DCI field is a transformable DCI field or a non-transformable DCI field. In some examples, content manager 1035 may update the content of the set of non-transformable DCI fields based on the set of partial size equalization bits. In some cases, content manager 1035 may refrain from determining content in at least the set of non-transformable DCI fields. Additionally or alternatively, content manager 1035 may update the content of the set of transformable DCI fields via the transformation rule, and determine the updated content for the set of transformable DCI fields based on the second BWP.

DCI field size manager 1040 may determine whether an aggregate first size of the set of non-transformable DCI fields in the first BWP is different from an aggregate second size of the set of non-transformable DCI fields in the second BWP. In such cases, DCI field size manager 1040 may determine that the aggregate first size is different from the aggregate second size, where the aggregate second size is greater than the aggregate first size. In other examples, DCI field size manager 1040 may determine that the aggregate first size is different from the aggregate second size, where the aggregate second size is less than the aggregate first size. Additionally or alternatively, DCI field size manager 1040 may determine that the aggregate first size is less than the aggregate second size, and determine whether a respective aggregate size of each set of non-transformable DCI fields in a set of BWPs are the same, where the set of BWPs includes at least the first BWP and the second BWP.

In some examples, DCI field size manager 1040 may determine that an aggregate first size of the set of non-transformable DCI fields in the first BWP is different from at least one respective aggregate size. In some cases, DCI field size manager 1040 may determine that an aggregate second size of the set of non-transformable DCI fields in the second BWP is different from at least one respective aggregate size, and identify a minimum size for each DCI field of the set of non-transformable DCI fields, where content within a DCI field having the minimum size is able to be updated to a DCI field in the second BWP. In some cases, a size of the content within the DCI is a static size greater than or equal to the minimum size.

Assignment component 1045 may identify, within the received DCI, a null assignment for the second BWP based on the aggregate first size being less than the aggregate second size. Additionally or alternatively, assignment component 1045 may detect a null assignment within a resource assignment field from the set of DCI fields. In some cases, identifying the null assignment for the second BWP includes: detecting the null assignment within a resource assignment field of the set of DCI fields. In some cases, the null assignment is based on the DCI triggering the switch from the first BWP to the second BWP.

DCI truncation manager 1050 may identify a DCI field from the set of transformable DCI fields to be truncated based on the DCI field having the respective first size in the first BWP that is larger than the respective second size in the second BWP, determine that content within the DCI field has a predetermined value, and truncate the DCI field based on the determination that the content has the predetermined value. In some cases, the predetermined value is zero.

Figure 11:
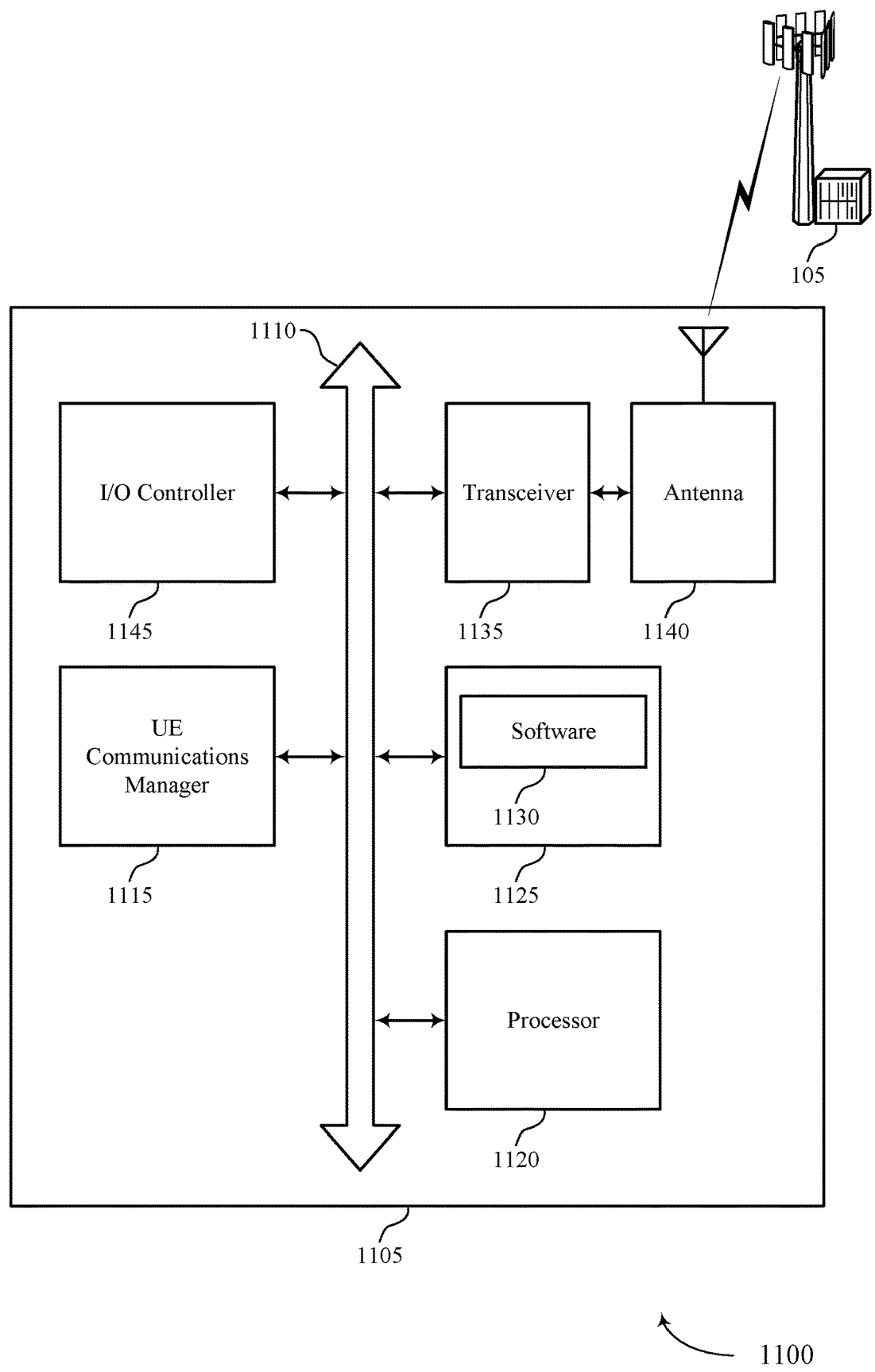
FIG. 11 illustrates a block diagram of a system including a UE that supports DCI signaling schemes for BWP switching in accordance with aspects of the present disclosure.

FIG. 11 shows a diagram of a system 1100 including a device 1105 that supports DCI signaling schemes for BWP switching in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting DCI signaling schemes for BWP switching).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support DCI signaling schemes for BWP switching. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
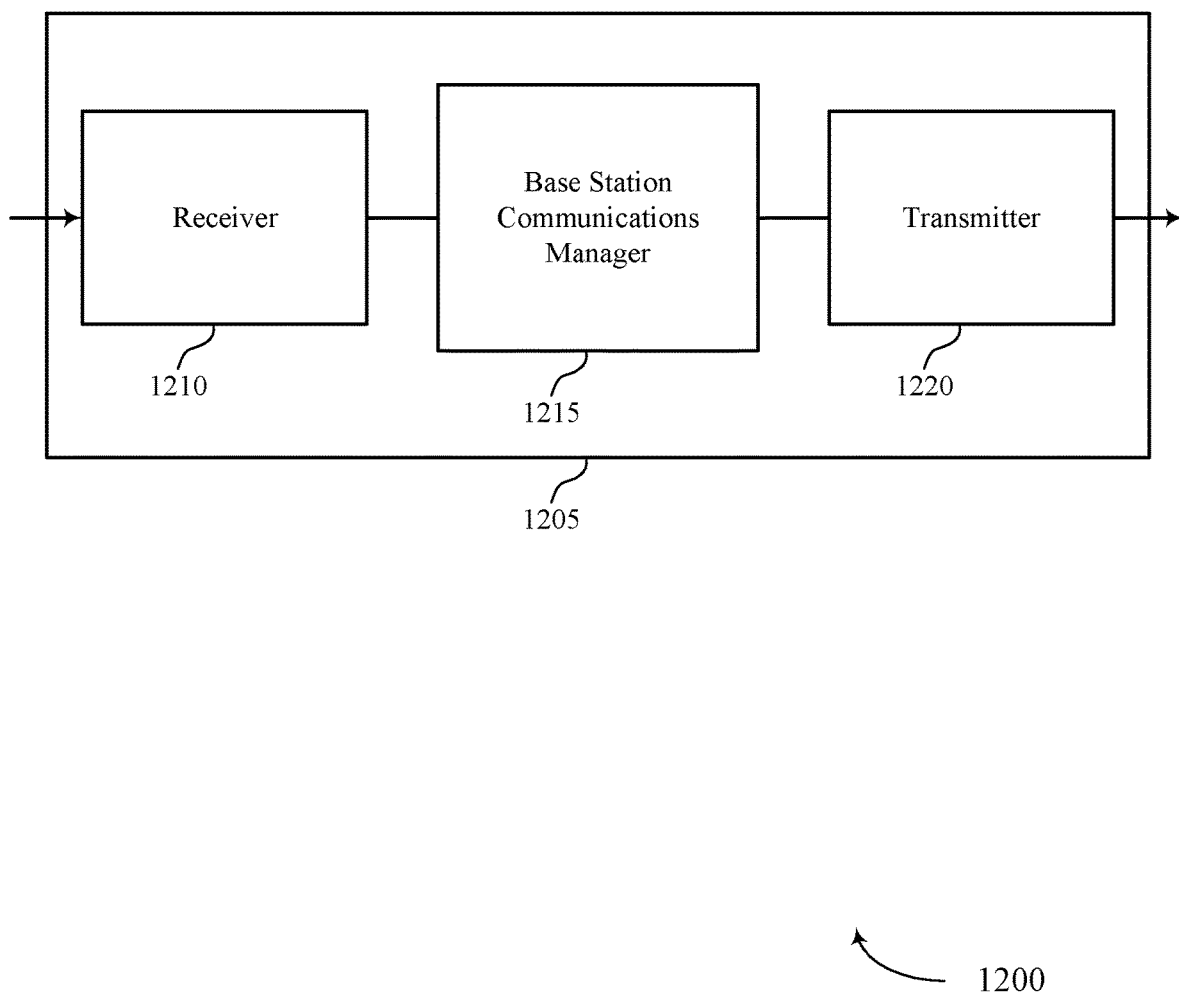
FIGS. 12 through 14 show block diagrams of a device that supports DCI signaling schemes for BWP switching in accordance with aspects of the present disclosure.

FIG. 12 shows a block diagram 1200 of a wireless device 1205 that supports DCI signaling schemes for BWP switching in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to DCI signaling schemes for BWP switching, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may determine to switch operation of a UE 115 from a first BWP to a second BWP, generate DCI having a set of DCI fields, each of the set of DCI fields having a respective first size based on the first BWP, configure the DCI with a set of transformable DCI fields having content in the first BWP that is able to be updated via a transformation rule to DCI fields having a respective second size in the second BWP, configure the DCI with a set of non-transformable DCI fields having content in the first BWP that is unable to be updated via the transformation rule to DCI fields having the respective second size in the second BWP, configure the DCI with an indication that the UE 115 is to switch from operating in the first BWP to operating in the second BWP, and transmit the DCI to the UE 115.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
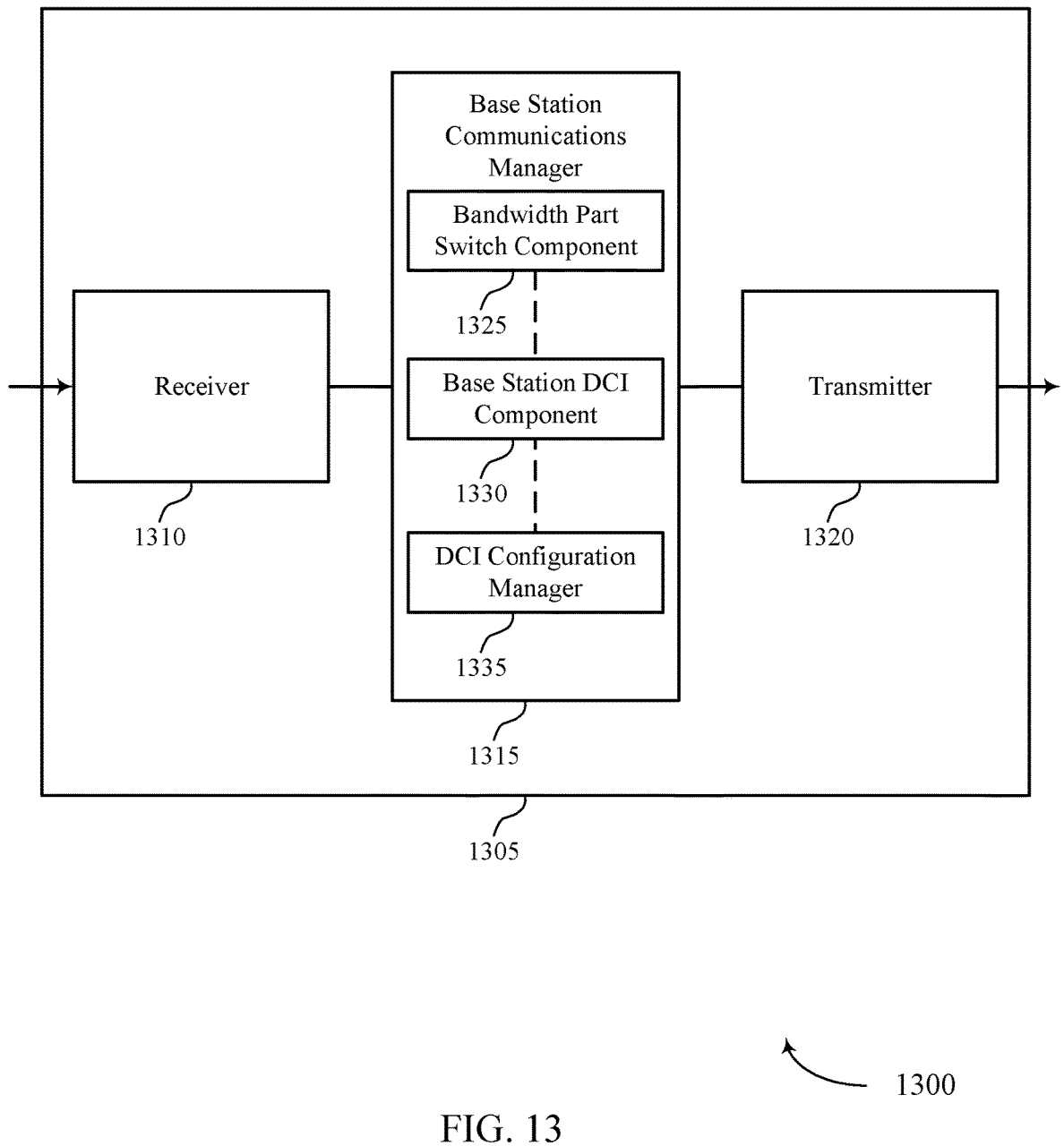

FIG. 13 shows a block diagram 1300 of a wireless device 1305 that supports DCI signaling schemes for BWP switching in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to DCI signaling schemes for BWP switching, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include bandwidth part switch component 1325, base station DCI component 1330, and DCI configuration manager 1335.

Bandwidth part switch component 1325 may determine to switch operation of a UE 115 from a first BWP to a second BWP, generate a BWP ID that indicates the switch from the first BWP to the second BWP, and transmit the BWP ID as part of DCI. In some cases, a timing value that indicates a time difference between the transmitted DCI and a start of the second BWP is based on the DCI. Base station DCI component 1330 may generate DCI having a set of DCI fields, each of the set of DCI fields having a respective first size based on the first BWP and transmit the DCI to a UE 115.

DCI configuration manager 1335 may configure the DCI with a set of transformable DCI fields having content in the first BWP that is able to be updated via a transformation rule to DCI fields having a respective second size in the second BWP. Additionally, DCI configuration manager 1335 may configure the DCI with a set of non-transformable DCI fields having content in the first BWP that is unable to be updated via the transformation rule to DCI fields having the respective second size in the second BWP. In some cases, DCI configuration manager 1335 may configure the DCI with an indication that the UE 115 is to switch from operating in the first BWP to operating in the second BWP. In some cases, the set of transformable DCI fields includes the full set of DCI fields. In some cases, the set of non-transformable DCI fields includes the full set of DCI fields. In some cases, a configuration of the set of transformable DCI fields and the set of non-transformable DCI fields is preconfigured. In some cases, a configuration of the set of transformable DCI fields and the set of non-transformable DCI fields is transmitted via high-layer signaling.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
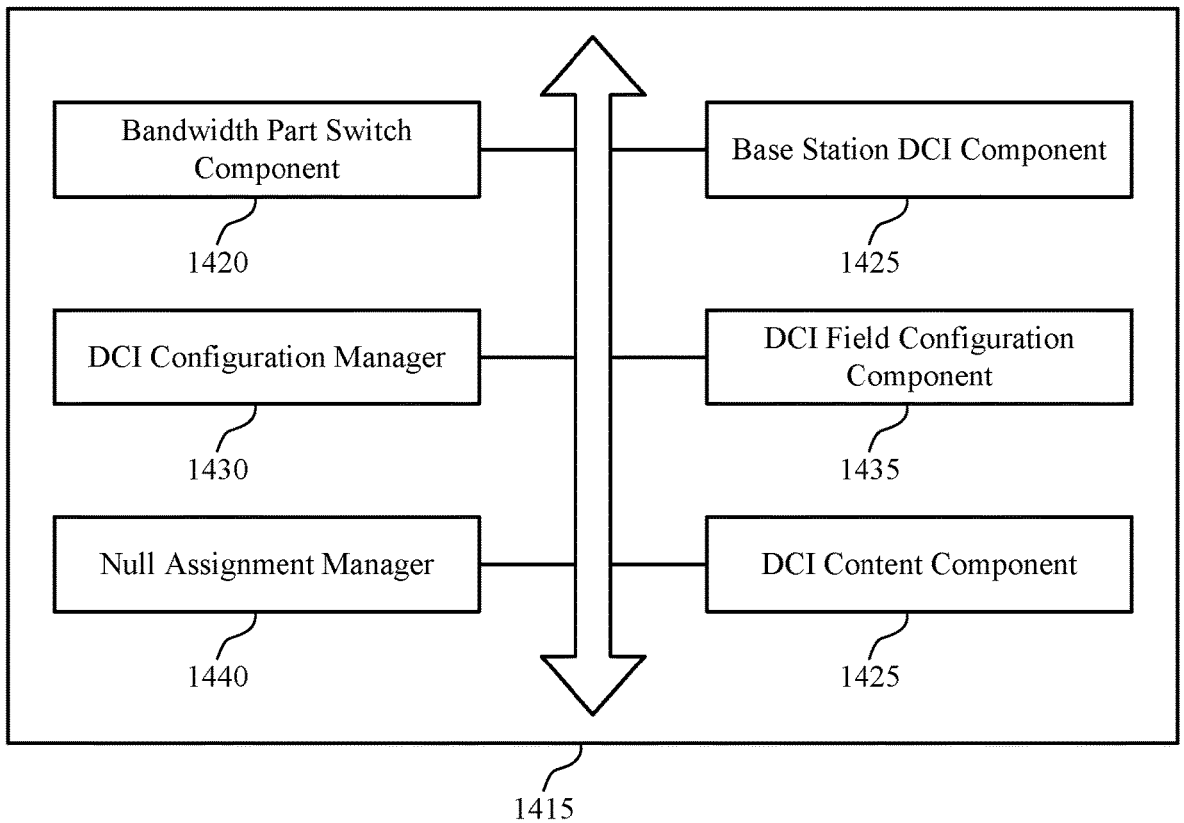

FIG. 14 shows a block diagram 1400 of a base station communications manager 1415 that supports DCI signaling schemes for BWP switching in accordance with aspects of the present disclosure. The base station communications manager 1415 may be an example of aspects of a base station communications manager 1515 described with reference to FIGS. 12, 13, and 15. The base station communications manager 1415 may include bandwidth part switch component 1420, base station DCI component 1425, DCI configuration manager 1430, DCI field configuration component 1435, null assignment manager 1440, and DCI content component 1445. Each of these modules may communicate, directly or indirectly, with one another (e.g., via one or more buses).

Bandwidth part switch component 1420 may determine to switch operation of a UE 115 from a first BWP to a second BWP, generate a BWP ID that indicates the switch from the first BWP to the second BWP, and transmit the BWP ID as part of the DCI, where a timing value that indicates a time difference between the transmitted DCI and a start of the second BWP is based on the DCI. Base station DCI component 1425 may generate DCI having a set of DCI fields, each of the set of DCI fields having a respective first size based on the first BWP and transmit the DCI to the UE 115.

DCI configuration manager 1430 may configure the DCI with a set of transformable DCI fields having content in the first BWP that is able to be updated via a transformation rule to DCI fields having a respective second size in the second BWP. Additionally, DCI configuration manager 1430 may configure the DCI with a set of non-transformable DCI fields having content in the first BWP that is unable to be updated via the transformation rule to DCI fields having the respective second size in the second BWP. In some cases, DCI configuration manager 1430 may configure the DCI with an indication that the UE 115 is to switch from operating in the first BWP to operating in the second BWP. In some cases, the set of transformable DCI fields includes the full set of DCI fields. In some cases, the set of non-transformable DCI fields includes the full set of DCI fields. In some cases, a configuration of the set of transformable DCI fields and the set of non-transformable DCI fields is preconfigured. In some cases, a configuration of the set of transformable DCI fields and the set of non-transformable DCI fields is transmitted via high-layer signaling.

DCI field configuration component 1435 may configure an aggregate first size of the set of non-transformable DCI fields in the first BWP to be different than an aggregate second size of the set of non-transformable DCI fields in the second BWP, where the aggregate second size is greater than the aggregate first size. In some cases, DCI field configuration component 1435 may identify a DCI field from the set of transformable DCI fields to be truncated based on the DCI field having the respective first size in the first BWP that is larger than the respective second size in the second BWP. In some examples, DCI field configuration component 1435 may configure an aggregate first size of the set of non-transformable DCI fields in the first BWP to be different than an aggregate second size of the set of non-transformable DCI fields in the second BWP, where the aggregate second size is less than the aggregate first size. In some cases, DCI field configuration component 1435 may insert, in the second BWP, a set of partial size equalization bits including a difference between the aggregate first size and the aggregate second size, where a total aggregate size of the set of partial size equalization bits and the set of non-transformable DCI fields for the first BWP is equal to the aggregate second size of the set of non-transformable DCI fields in the second BWP.

Additionally or alternatively DCI field configuration component 1435 may configure an aggregate first size of the set of non-transformable DCI fields in the first BWP to be different from at least one respective aggregate size of respective sets of non-transformable DCI fields in a set of BWPs. In some examples, DCI field configuration component 1435 may insert, in the first BWP, a set of partial size equalization bits including a difference between a maximum respective aggregate size and the aggregate first size, where a total aggregate size of the set of partial size equalization bits and the set of non-transformable DCI fields in the first BWP is equal to the maximum respective aggregate size. In some cases, DCI field configuration component 1435 may insert, in the first BWP, a set of partial size equalization bits including a difference between the aggregate first size and the aggregate second size, where a total aggregate size of the set of partial size equalization bits and the set of non-transformable DCI fields for the first BWP is equal to the aggregate second size of the set of non-transformable DCI fields in the second BWP.

In other examples, DCI field configuration component 1435 may insert, in the second BWP, a set of partial size equalization bits including a difference between a maximum respective aggregate size and the aggregate second size, where a total aggregate size of the set of partial size equalization bits and the set of non-transformable DCI fields in the second BWP is equal to the maximum respective aggregate size. DCI field configuration component 1435 may configure a minimum size for each DCI field of the set of non-transformable DCI fields, where content within a DCI field having the minimum size is able to be updated to a DCI field in the second BWP. In some cases, DCI field configuration component 1435 may configure an aggregate first size of the set of non-transformable DCI fields in the first BWP to be less than an aggregate second size of the set of non-transformable DCI fields in the second BWP. Additionally or alternatively, DCI field configuration component 1435 may configure an aggregate second size of the set of non-transformable DCI fields in the second BWP to be different from at least one respective aggregate size of the respective sets of non-transformable DCI fields in a set of BWPs. In some cases, a size of the content within the DCI is a static size greater than or equal to the minimum size.

Null assignment manager 1440 may transmit a null assignment for the second BWP based on the aggregate first size being less than the aggregate second size. In some cases, null assignment manager 1440 may transmit a null assignment within a resource assignment field from the set of DCI fields, where the null assignment is based on the DCI triggering the switch from the first BWP to the second BWP. In some cases, transmitting the null assignment for the second BWP includes: transmitting the null assignment within a resource assignment field of the set of DCI fields. DCI content component 1445 may configure content within the DCI field with a predetermined value. In some cases, the predetermined value is zero.

Figure 15:
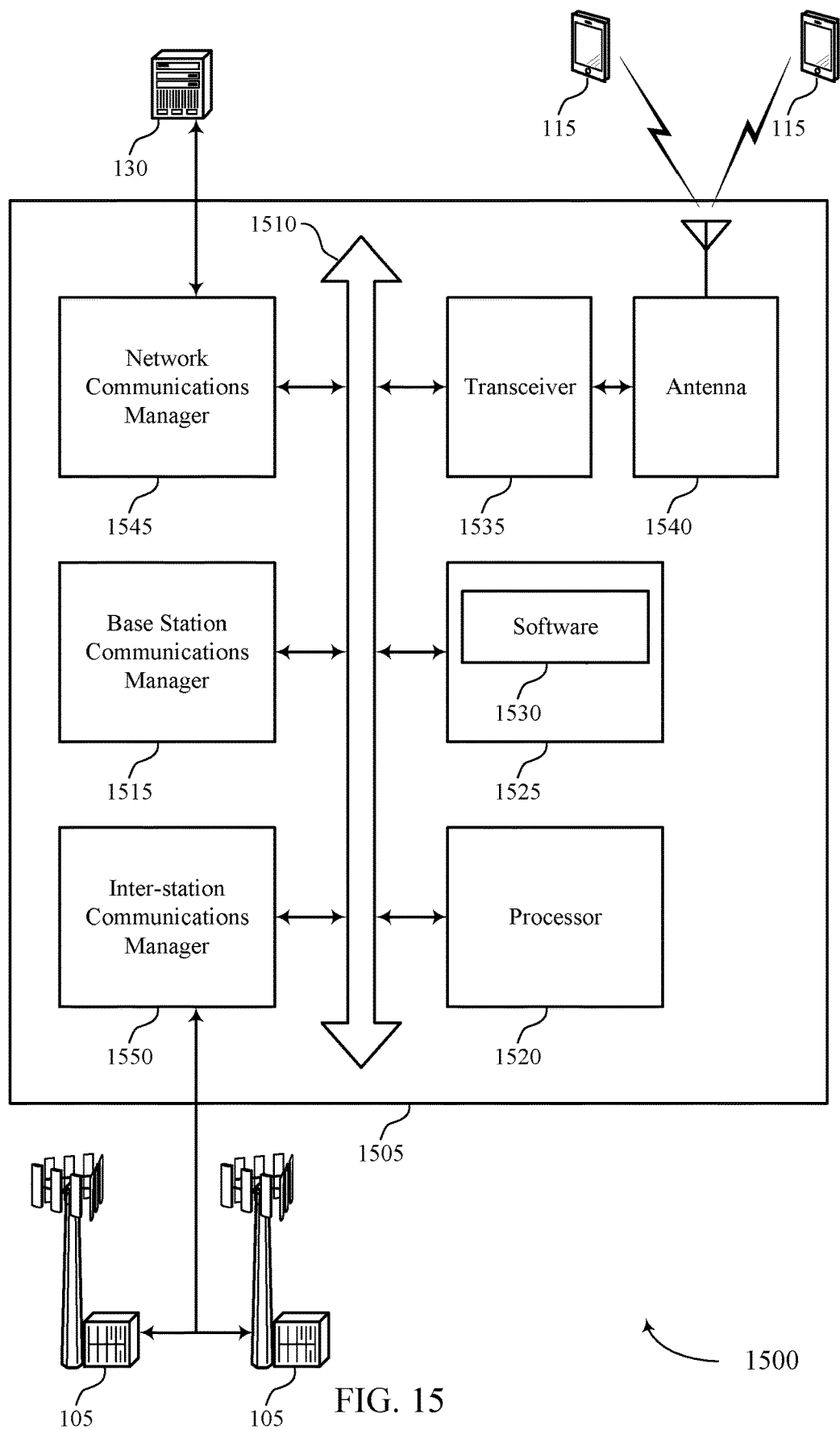
FIG. 15 illustrates a block diagram of a system including a base station that supports DCI signaling schemes for BWP switching in accordance with aspects of the present disclosure.

FIG. 15 shows a diagram of a system 1500 including a device 1505 that supports DCI signaling schemes for BWP switching in accordance with aspects of the present disclosure. Device 1505 may be an example of or include the components of base station 105 as described herein, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting DCI signaling schemes for BWP switching).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support DCI signaling schemes for BWP switching. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described herein. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
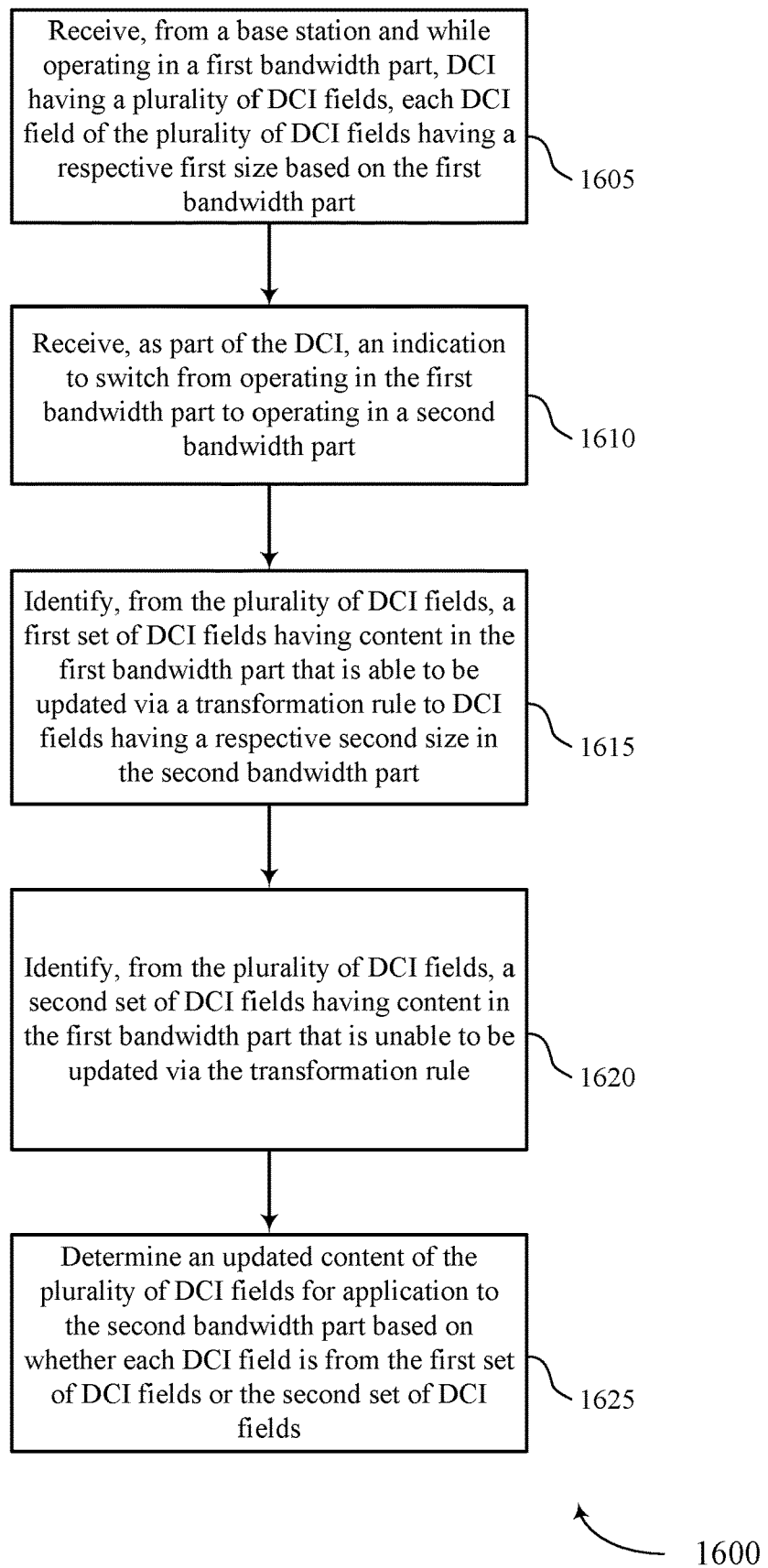
FIGS. 16 through 22 illustrate methods for DCI signaling schemes for BWP switching in accordance with aspects of the present disclosure.

FIG. 16 shows a flowchart illustrating a method 1600 for DCI signaling schemes for BWP switching in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive, from a base station 105 and while operating in a first BWP, DCI having a plurality of DCI fields, each DCI field of the plurality of DCI fields having a respective first size based on the first BWP. The operations of 1605 may be performed according to the methods described herein. In certain examples, aspects of the operations of 1605 may be performed by a UE DCI manager as described with reference to FIGS. 8 through 11.

At 1610 the UE 115 may receive, as part of the DCI, an indication that the UE 115 is to switch from operating in the first BWP to operating in a second BWP. The operations of 1610 may be performed according to the methods described herein. In certain examples, aspects of the operations of 1610 may be performed by a bandwidth part switching manager as described with reference to FIGS. 8 through 11.

At 1615 the UE 115 may identify, from the plurality of DCI fields, a first set of DCI fields having content in the first BWP that is able to be updated via a transformation rule to DCI fields having a respective second size in the second BWP (e.g., transformable DCI fields). The operations of 1615 may be performed according to the methods described herein. In certain examples, aspects of the operations of 1615 may be performed by a DCI field identification component as described with reference to FIGS. 8 through 11.

At 1620 the UE 115 may identify, from the plurality of DCI fields, a second set of DCI fields having content in the first BWP that is unable to be updated via the transformation rule (e.g., non-transformable DCI fields). The operations of 1620 may be performed according to the methods described herein. In certain examples, aspects of the operations of 1620 may be performed by a DCI field identification component as described with reference to FIGS. 8 through 11.

At 1625 the UE 115 may determine an updated content of the plurality of DCI fields for application to the second BWP based at least in part on whether each DCI field is from the first set of DCI fields or the second set of DCI fields. The operations of 1625 may be performed according to the methods described herein. In certain examples, aspects of the operations of 1625 may be performed by a content manager as described with reference to FIGS. 8 through 11.

Figure 17:
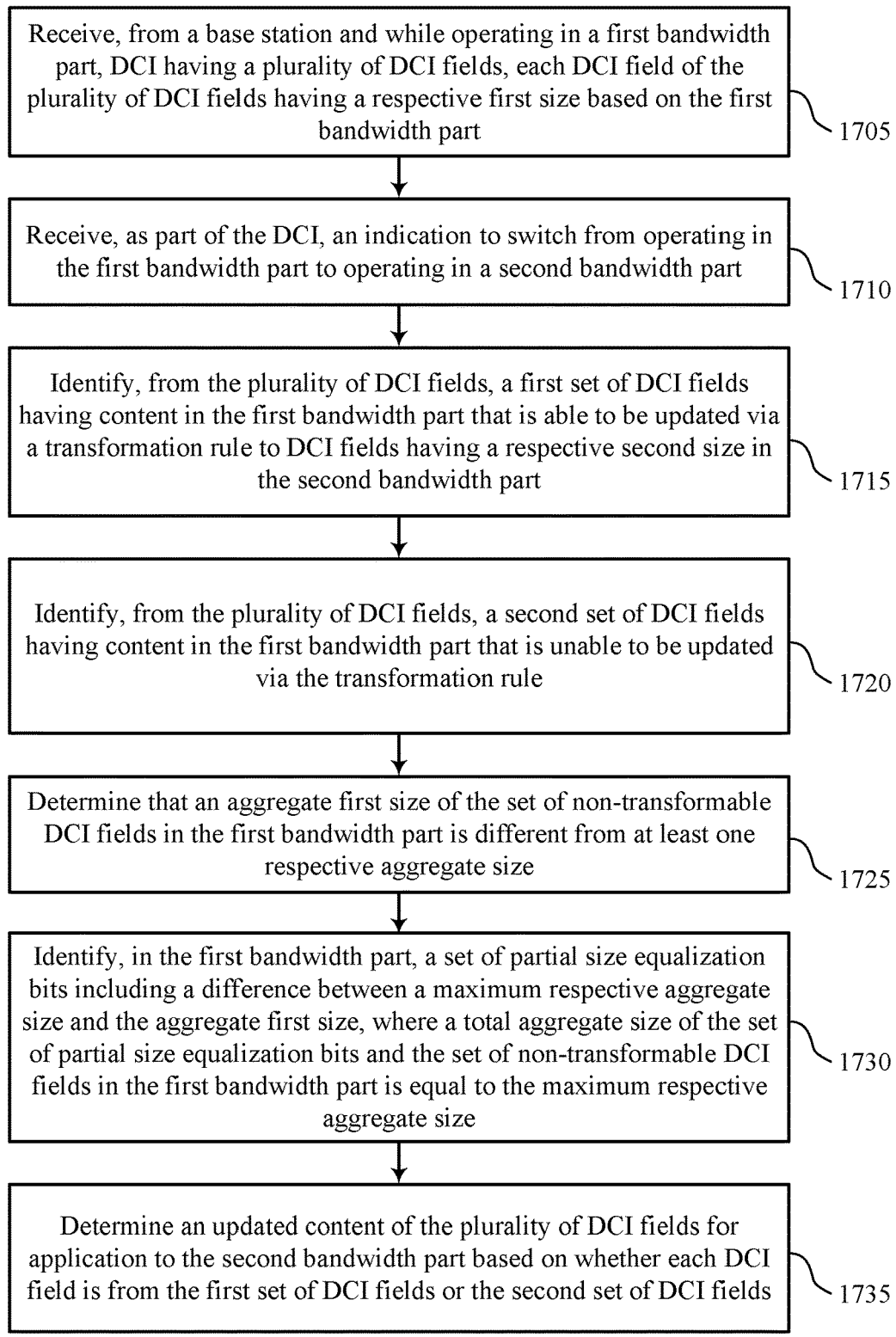

FIG. 17 shows a flowchart illustrating a method 1700 for DCI signaling schemes for BWP switching in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive, from a base station 105 and while operating in a first BWP, DCI having a plurality of DCI fields, each DCI field of the plurality of DCI fields having a respective first size based on the first BWP. The operations of 1705 may be performed according to the methods described herein. In certain examples, aspects of the operations of 1705 may be performed by a UE DCI manager as described with reference to FIGS. 8 through 11.

At 1710 the UE 115 may receive, as part of the DCI, an indication that the UE 115 is to switch from operating in the first BWP to operating in a second BWP. The operations of 1710 may be performed according to the methods described herein. In certain examples, aspects of the operations of 1710 may be performed by a bandwidth part switching manager as described with reference to FIGS. 8 through 11.

At 1715 the UE 115 may identify, from the plurality of DCI fields, a first set of DCI fields having content in the first BWP that is able to be updated via a transformation rule to DCI fields having a respective second size in the second BWP. The operations of 1715 may be performed according to the methods described herein. In certain examples, aspects of the operations of 1715 may be performed by a DCI field identification component as described with reference to FIGS. 8 through 11.

At 1720 the UE 115 may identify, from the plurality of DCI fields, a second set of DCI fields having content in the first BWP that is unable to be updated via the transformation rule. The operations of 1720 may be performed according to the methods described herein. In certain examples, aspects of the operations of 1720 may be performed by a DCI field identification component as described with reference to FIGS. 8 through 11.

At 1725 the UE 115 may determine that an aggregate first size of the set of non-transformable DCI fields in the first BWP is different from at least one respective aggregate size. The operations of 1725 may be performed according to the methods described herein. In certain examples, aspects of the operations of 1715 may be performed by a DCI field size manager as described with reference to FIGS. 8 through 11.

At 1730 the UE 115 may identify, in the first BWP, a set of partial size equalization bits including a difference between a maximum respective aggregate size and the aggregate first size, wherein a total aggregate size of the set of partial size equalization bits and the set of non-transformable DCI fields in the first BWP is equal to the maximum respective aggregate size. The operations of 1730 may be performed according to the methods described herein. In certain examples, aspects of the operations of 1730 may be performed by a UE DCI manager as described with reference to FIGS. 8 through 11.

At 1735 the UE 115 may determine an updated content of the plurality of DCI fields for application to the second BWP based at least in part on whether each DCI field is from the first set of DCI fields or the second set of DCI fields. The operations of 1735 may be performed according to the methods described herein. In certain examples, aspects of the operations of 1735 may be performed by a content manager as described with reference to FIGS. 8 through 11.

Figure 18:
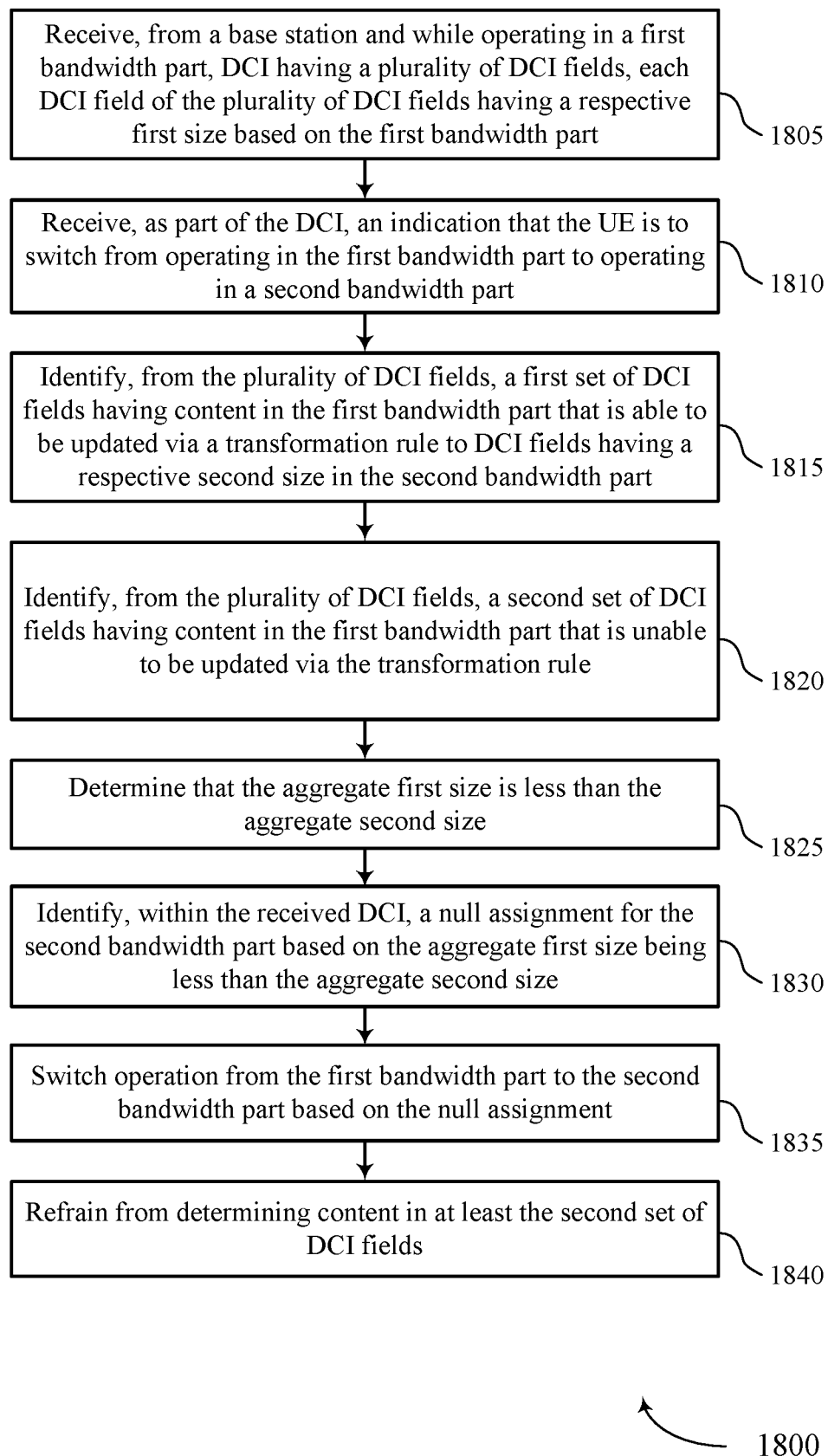

FIG. 18 shows a flowchart illustrating a method 1800 for DCI signaling schemes for BWP switching in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive, from a base station 105 and while operating in a first BWP, DCI having a plurality of DCI fields, each DCI field of the plurality of DCI fields having a respective first size based on the first BWP. The operations of 1805 may be performed according to the methods described herein. In certain examples, aspects of the operations of 1805 may be performed by a UE DCI manager as described with reference to FIGS. 8 through 11.

At 1810 the UE 115 may receive, as part of the DCI, an indication that the UE 115 is to switch from operating in the first BWP to operating in a second BWP. The operations of 1810 may be performed according to the methods described herein. In certain examples, aspects of the operations of 1810 may be performed by a bandwidth part switching manager as described with reference to FIGS. 8 through 11.

At 1815 the UE 115 may identify, from the plurality of DCI fields, a first set of DCI fields having content in the first BWP that is able to be updated via a transformation rule to DCI fields having a respective second size in the second BWP. The operations of 1815 may be performed according to the methods described herein. In certain examples, aspects of the operations of 1815 may be performed by a DCI field identification component as described with reference to FIGS. 8 through 11.

At 1820 the UE 115 may identify, from the plurality of DCI fields, a second set of DCI fields having content in the first BWP that is unable to be updated via the transformation rule. The operations of 1820 may be performed according to the methods described herein. In certain examples, aspects of the operations of 1820 may be performed by a DCI field identification component as described with reference to FIGS. 8 through 11.

At 1825 the UE 115 may determine that the aggregate first size is less than the aggregate second size. The operations of 1825 may be performed according to the methods described herein. In certain examples, aspects of the operations of 1825 may be performed by a DCI field size manager as described with reference to FIGS. 8 through 11.

At 1830 the UE 115 may identify, within the received DCI, a null assignment for the second BWP based at least in part on the aggregate first size being less than the aggregate second size. The operations of 1830 may be performed according to the methods described herein. In certain examples, aspects of the operations of 1830 may be performed by an assignment component as described with reference to FIGS. 8 through 11.

At 1835 the UE 115 may switch operation from the first BWP to the second BWP based at least in part on the null assignment. The operations of 1835 may be performed according to the methods described herein. In certain examples, aspects of the operations of 1835 may be performed by a BWP switching manager as described with reference to FIGS. 8 through 11.

At 1840 the UE 115 may refrain from determining content in at least the set of non-transformable DCI fields. The operations of 1840 may be performed according to the methods described herein. In certain examples, aspects of the operations of 1840 may be performed by a content manager as described with reference to FIGS. 8 through 11.

Figure 19:
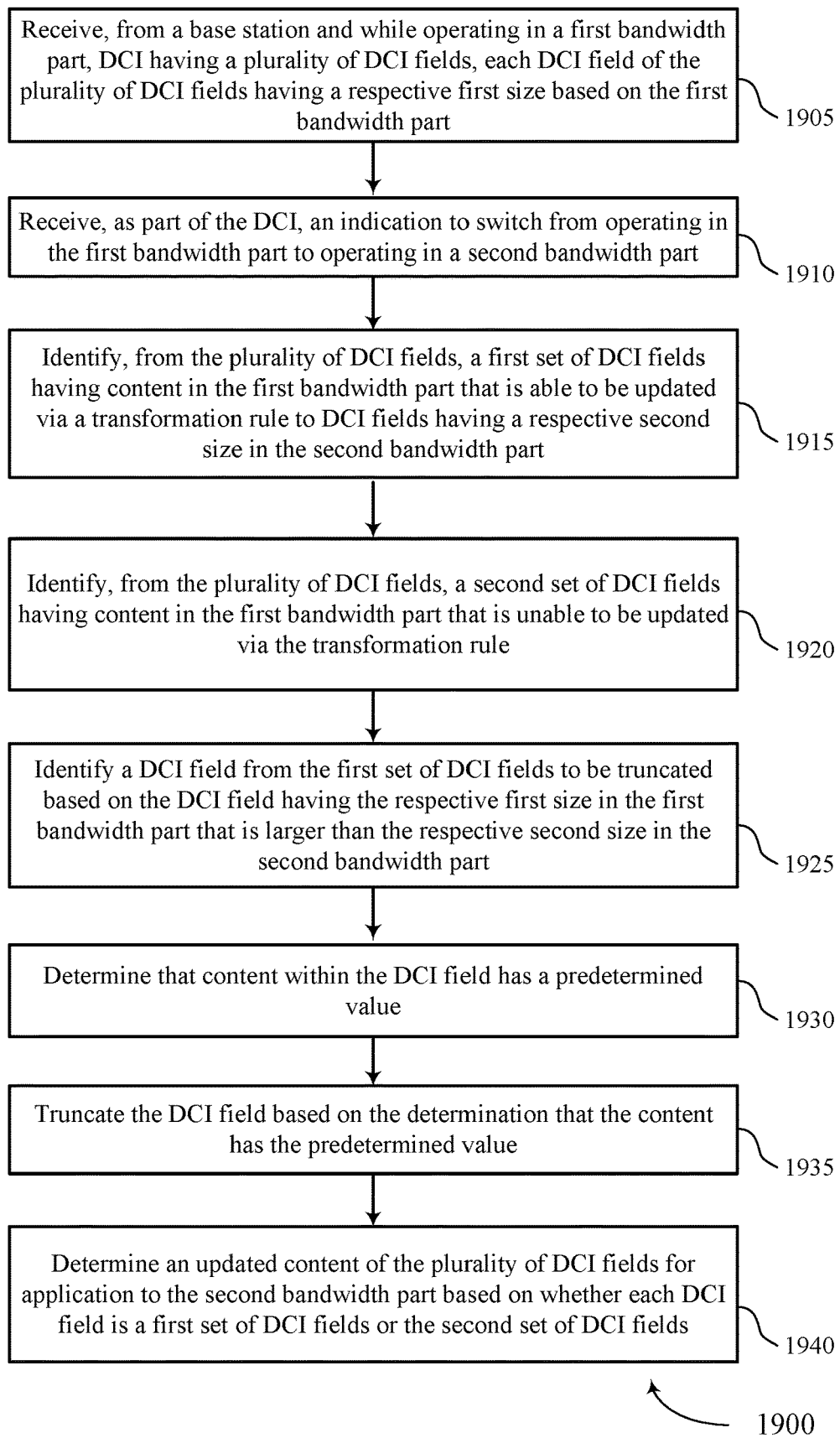

FIG. 19 shows a flowchart illustrating a method 1900 for DCI signaling schemes for BWP switching in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may receive, from a base station 105 and while operating in a first BWP, DCI having a plurality of DCI fields, each DCI field of the plurality of DCI fields having a respective first size based on the first BWP. The operations of 1905 may be performed according to the methods described herein. In certain examples, aspects of the operations of 1905 may be performed by a UE DCI manager as described with reference to FIGS. 8 through 11.

At 1910 the UE 115 may receive, as part of the DCI, an indication that the UE 115 is to switch from operating in the first BWP to operating in a second BWP. The operations of 1910 may be performed according to the methods described herein. In certain examples, aspects of the operations of 1910 may be performed by a bandwidth part switching manager as described with reference to FIGS. 8 through 11.

At 1915 the UE 115 may identify, from the plurality of DCI fields, a first set of transformable DCI fields having content in the first BWP that is able to be updated via a transformation rule to DCI fields having a respective second size in the second BWP. The operations of 1915 may be performed according to the methods described herein. In certain examples, aspects of the operations of 1915 may be performed by a DCI field identification component as described with reference to FIGS. 8 through 11.

At 1920 the UE 115 may identify, from the plurality of DCI fields, a second set of non-transformable DCI fields having content in the first BWP that is unable to be updated via the transformation rule. The operations of 1920 may be performed according to the methods described herein. In certain examples, aspects of the operations of 1920 may be performed by a DCI field identification component as described with reference to FIGS. 8 through 11.

At 1925 the UE 115 may identify a DCI field from the set of transformable DCI fields to be truncated based at least in part on the DCI field having the respective first size in the first BWP that is larger than the respective second size in the second BWP. The operations of 1925 may be performed according to the methods described herein. In certain examples, aspects of the operations of 1925 may be performed by a DCI truncation manager as described with reference to FIGS. 8 through 11.

At 1930 the UE 115 may determine that content within the DCI field has a predetermined value. The operations of 1930 may be performed according to the methods described herein. In certain examples, aspects of the operations of 1930 may be performed by a DCI truncation manager as described with reference to FIGS. 8 through 11.

At 1935 the UE 115 may truncate the DCI field based at least in part on the determination that the content has the predetermined value. The operations of 1935 may be performed according to the methods described herein. In certain examples, aspects of the operations of 1935 may be performed by a DCI truncation manager as described with reference to FIGS. 8 through 11.

At 1940 the UE 115 may determine an updated content of the plurality of DCI fields for application to the second BWP based at least in part on whether each DCI field is from the first set of DCI fields or the second set of DCI fields. The operations of 1940 may be performed according to the methods described herein. In certain examples, aspects of the operations of 1940 may be performed by a content manager as described with reference to FIGS. 8 through 11.

Figure 20:
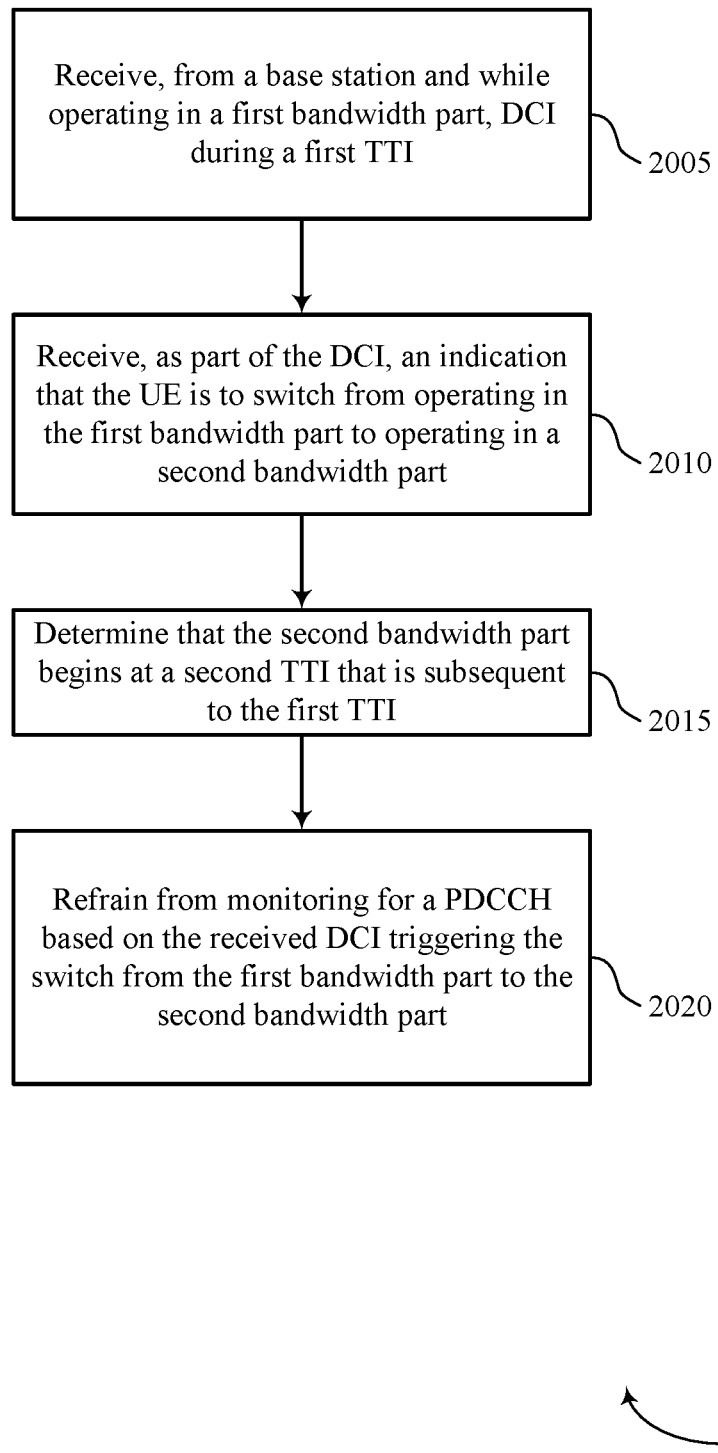

FIG. 20 shows a flowchart illustrating a method 2000 for DCI signaling schemes for BWP switching in accordance with aspects of the present disclosure. The operations of method 2000 may be implemented by a UE 115 or its components as described herein. For example, the operations of method 2000 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 2005 the UE 115 may receive, from a base station 105 and while operating in a first BWP, DCI during a first TTI. The operations of 2005 may be performed according to the methods described herein. In certain examples, aspects of the operations of 2005 may be performed by a UE DCI manager as described with reference to FIGS. 8 through 11.

At 2010 the UE 115 may receive, as part of the DCI, an indication that the UE 115 is to switch from operating in the first BWP to operating in a second BWP. The operations of 2010 may be performed according to the methods described herein. In certain examples, aspects of the operations of 2010 may be performed by a bandwidth part switching manager as described with reference to FIGS. 8 through 11.

At 2015 the UE 115 may determine that the second BWP begins at a second TTI that is subsequent to the first TTI. The operations of 2015 may be performed according to the methods described herein. In certain examples, aspects of the operations of 2015 may be performed by a BWP switching manager as described with reference to FIGS. 8 through 11.

At 2020 the UE 115 may refrain from monitoring for a PDCCH based at least in part on the received DCI triggering the switch from the first BWP to the second BWP. The operations of 2020 may be performed according to the methods described herein. In certain examples, aspects of the operations of 2020 may be performed by a UE DCI manager as described with reference to FIGS. 8 through 11.

Figure 21:
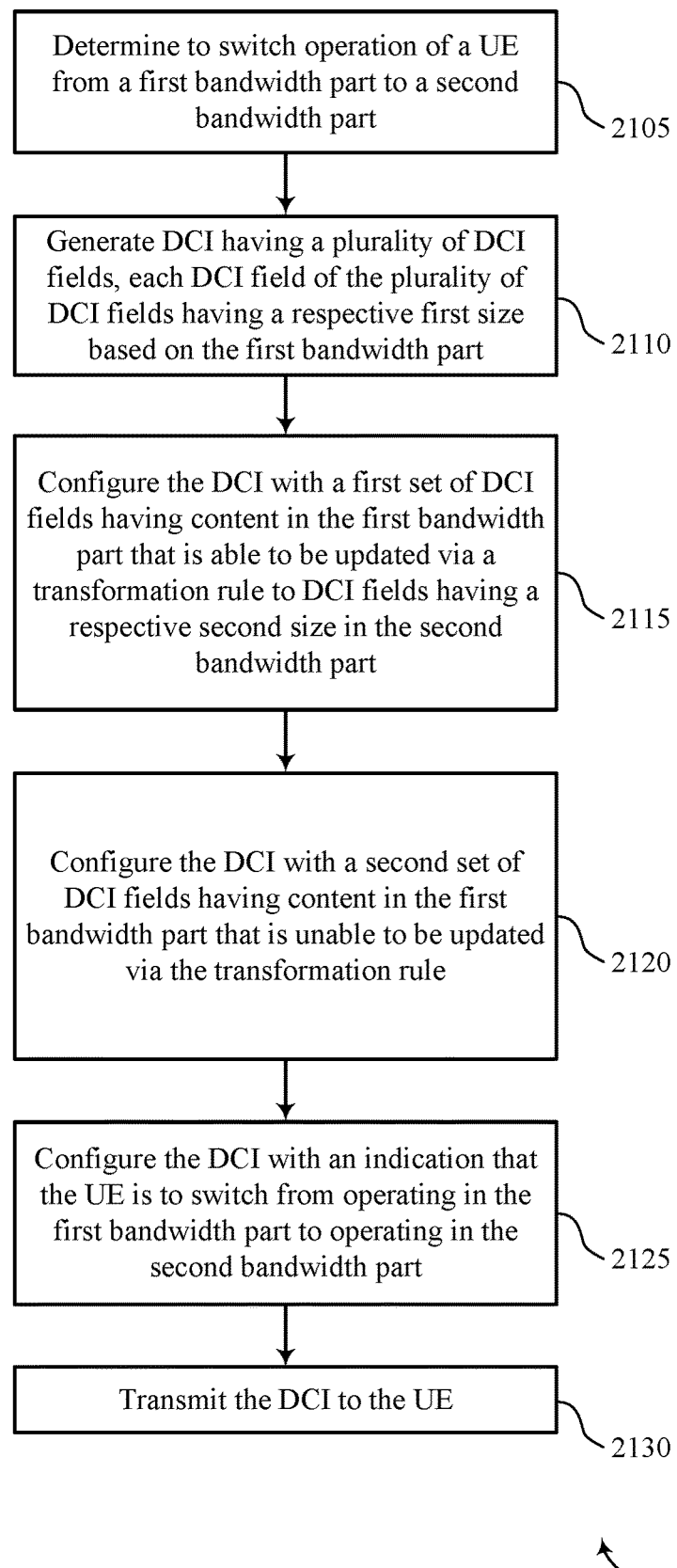

FIG. 21 shows a flowchart illustrating a method 2100 for DCI signaling schemes for BWP switching in accordance with aspects of the present disclosure. The operations of method 2100 may be implemented by a base station 105 or its components as described herein. For example, the operations of method 2100 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At 2105 the base station 105 may determine to switch operation of a UE 115 from a first BWP to a second BWP. The operations of 2105 may be performed according to the methods described herein. In certain examples, aspects of the operations of 2105 may be performed by a BWP switch component as described with reference to FIGS. 12 through 15.

At 2110 the base station 105 may generate DCI having a plurality of DCI fields, each DCI field of the plurality of DCI fields having a respective first size based on the first BWP. The operations of 2110 may be performed according to the methods described herein. In certain examples, aspects of the operations of 2110 may be performed by a base station DCI component as described with reference to FIGS. 12 through 15.

At 2115 the base station 105 may configure the DCI with a first set of DCI fields having content in the first BWP that is able to be updated via a transformation rule to DCI fields having a respective second size in the second BWP. The operations of 2115 may be performed according to the methods described herein. In certain examples, aspects of the operations of 2115 may be performed by a DCI configuration manager as described with reference to FIGS. 12 through 15.

At 2120 the base station 105 may configure the DCI with a second set of DCI fields having content in the first BWP that is unable to be updated via the transformation rule to DCI fields having the respective second size in the second BWP. The operations of 2120 may be performed according to the methods described herein. In certain examples, aspects of the operations of 2120 may be performed by a DCI configuration manager as described with reference to FIGS. 12 through 15.

At 2125 the base station 105 may configure the DCI with an indication that the UE 115 is to switch from operating in the first BWP to operating in the second BWP. The operations of 2125 may be performed according to the methods described herein. In certain examples, aspects of the operations of 2125 may be performed by a DCI configuration manager as described with reference to FIGS. 12 through 15.

At 2130 the base station 105 may transmit the DCI to the UE 115. The operations of 2130 may be performed according to the methods described herein. In certain examples, aspects of the operations of 2130 may be performed by a base station DCI component as described with reference to FIGS. 12 through 15.

Figure 22:
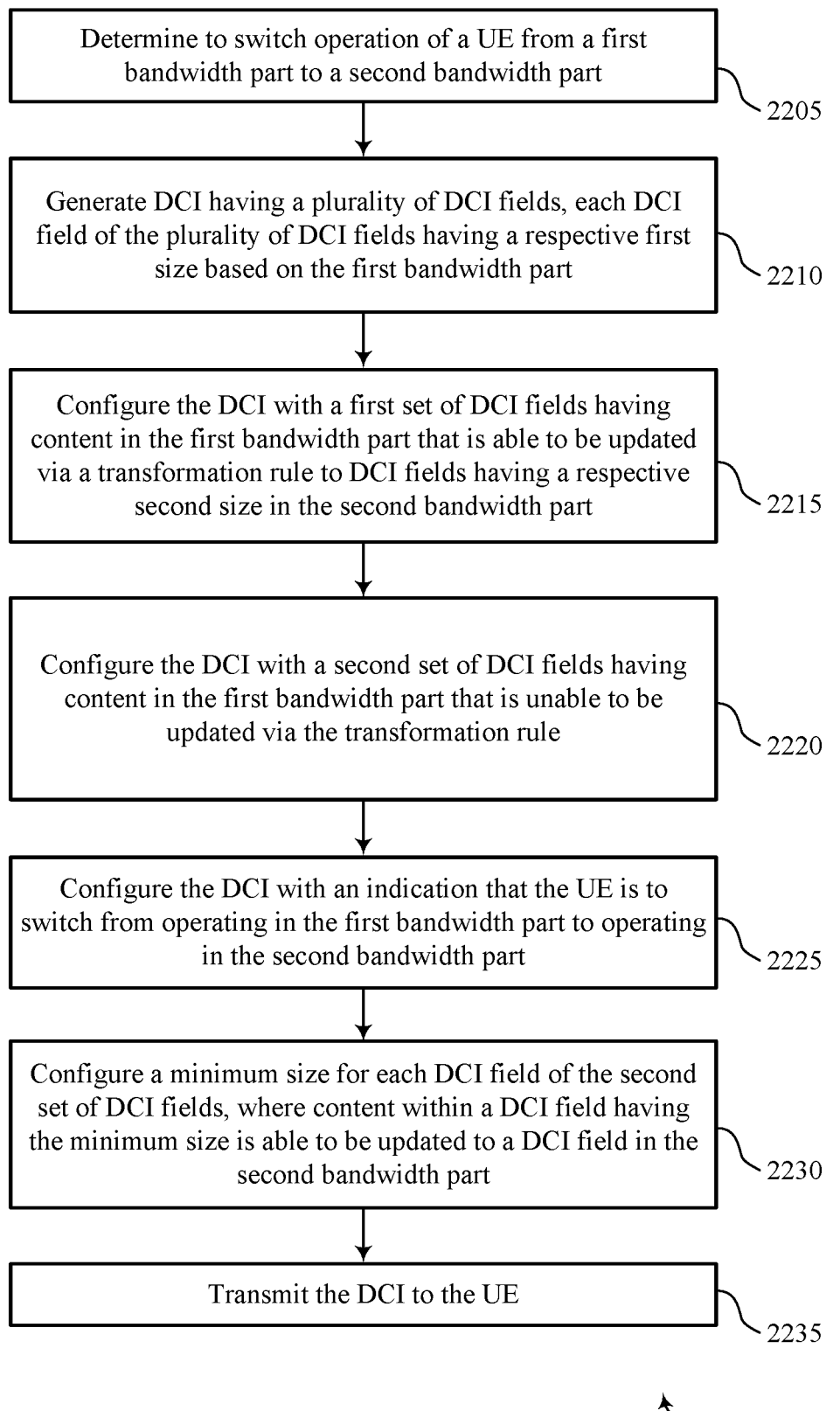

FIG. 22 shows a flowchart illustrating a method 2200 for DCI signaling schemes for BWP switching in accordance with aspects of the present disclosure. The operations of method 2200 may be implemented by a base station 105 or its components as described herein. For example, the operations of method 2200 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At 2205 the base station 105 may determine to switch operation of a UE 115 from a first BWP to a second BWP. The operations of 2205 may be performed according to the methods described herein. In certain examples, aspects of the operations of 2205 may be performed by a bandwidth part switch component as described with reference to FIGS. 12 through 15.

At 2210 the base station 105 may generate DCI having a plurality of DCI fields, each DCI field of the plurality of DCI fields having a respective first size based on the first BWP. The operations of 2210 may be performed according to the methods described herein. In certain examples, aspects of the operations of 2210 may be performed by a base station DCI component as described with reference to FIGS. 12 through 15.

At 2215 the base station 105 may configure the DCI with a first set of DCI fields having content in the first BWP that is able to be updated via a transformation rule to DCI fields having a respective second size in the second BWP. The operations of 2215 may be performed according to the methods described herein. In certain examples, aspects of the operations of 2215 may be performed by a DCI configuration manager as described with reference to FIGS. 12 through 15.

At 2220 the base station 105 may configure the DCI with a second set of DCI fields having content in the first BWP that is unable to be updated via the transformation rule to DCI fields having the respective second size in the second BWP. The operations of 2220 may be performed according to the methods described herein. In certain examples, aspects of the operations of 2220 may be performed by a DCI configuration manager as described with reference to FIGS. 12 through 15.

At 2225 the base station 105 may configure the DCI with an indication that the UE 115 is to switch from operating in the first BWP to operating in the second BWP. The operations of 2225 may be performed according to the methods described herein. In certain examples, aspects of the operations of 2225 may be performed by a DCI configuration manager as described with reference to FIGS. 12 through 15.

At 2230 the base station 105 may configure a minimum size for each DCI field of the second set of DCI fields, wherein content within a DCI field having the minimum size is able to be updated to a DCI field in the second BWP. The operations of 2230 may be performed according to the methods described herein. In certain examples, aspects of the operations of 2230 may be performed by a DCI field configuration component as described with reference to FIGS. 12 through 15.

At 2235 the base station 105 may transmit the DCI to the UE 115. The operations of 2235 may be performed according to the methods described herein. In certain examples, aspects of the operations of 2235 may be performed by a base station DCI component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
   one or more memories that store processor-executable code; and
   one or more processors coupled with the one or more memories and configured to, in association with executing the code, cause the UE to:
   obtain first downlink control information (DCI) that excludes a resource assignment from a network device while operating in a first bandwidth part, the first DCI comprising an indication to activate a second bandwidth part and an indication that a second DCI in a subsequent slot will comprise scheduling information for one or more data transmissions via the second bandwidth part; and
   obtain, in accordance with the first DCI and while operating in the second bandwidth part, the second DCI comprising the scheduling information for the one or more data transmissions.

2. The UE of claim 1, wherein the one or more processors are further configured to cause the UE to:
   detect content in a subset of fields from a plurality of fields of the first DCI in accordance with obtaining the first DCI that excludes the resource assignment.

3. The UE of claim 1, wherein the one or more processors are further configured to cause the UE to:
   detect a bandwidth part identity in accordance with obtaining the first DCI that excludes the scheduling information, the bandwidth part identity indicating the second bandwidth part different from the first bandwidth part, wherein a timing value is associated with obtaining the one or more data transmissions via the second bandwidth part.

4. The UE of claim 3, wherein the one or more processors are further configured to cause the UE to:
   switch to operating in the second bandwidth part in accordance with the first DCI.

5. The UE of claim 3, wherein the bandwidth part identity indicates switching to operating in the second bandwidth part.

6. The UE of claim 3, wherein the first DCI comprises an indication of the timing value.

7. The UE of claim 1, wherein the one or more processors are further configured to cause the UE to:
   output a data transmission to the network device in accordance with the scheduling information for the one or more data transmissions.

8. The UE of claim 1, wherein the one or more processors are further configured to cause the UE to:
   obtain, as part of the first DCI, an indication that the UE is to switch to operating in the second bandwidth part.

9. The UE of claim 1, wherein the first DCI is associated with the second bandwidth part different from the first bandwidth part.

10. A method for wireless communications at a user equipment (UE), the method comprising:
    receiving first downlink control information (DCI) that excludes a resource assignment from a network device while operating in a first bandwidth part, the first DCI comprising an indication to activate a second bandwidth part and in indication that a second DCI in a subsequent slot will comprise scheduling information for one or more data transmissions via the second bandwidth part; and
    receiving, in accordance with the first DCI and while operating in the second bandwidth part, the second DCI comprising the scheduling information for the one or more data transmissions.

11. The method of claim 10, further comprising:
    detecting content in a subset of fields from a plurality of fields of the first DCI in accordance with receiving the first DCI that excludes the resource assignment.

12. The method of claim 10, further comprising:
    detecting a bandwidth part identity in accordance with receiving the first DCI that excludes the scheduling information, the bandwidth part identity indicating the second bandwidth part different from the first bandwidth part, wherein a timing value is associated with obtaining the one or more data transmissions via the second bandwidth part.

13. The method of claim 12, further comprising:
    switching to operating in the second bandwidth part in accordance with the first DCI.

14. The method of claim 12, wherein the bandwidth part identity indicates switching to operating in the second bandwidth part.

15. The method of claim 12, wherein the first DCI comprises an indication of the timing value.

16. The method of claim 10, further comprising:
    transmitting a data transmission to the network device in accordance with the scheduling information for the one or more data transmissions.

17. The method of claim 10, further comprising:
receiving, as part of the first DCI, an indication that the UE is to switch to operating in the second bandwidth part.

18. The method of claim 10, wherein the first DCI is associated with the second bandwidth part different from the first bandwidth part.

19. An apparatus for wireless communications at a user equipment (UE), the apparatus comprising:
means for receiving first downlink control information (DCI) that excludes a resource assignment from a network device while operating in a first bandwidth part, the first DCI comprising an indication to activate a second bandwidth part and an indication that a second DCI in a subsequent slot will comprise scheduling information for one or more data transmissions via the second bandwidth part; and
means for receiving, in accordance with the first DCI and while operating in the second bandwidth part, the second DCI comprising the scheduling information for the one or more data transmissions.

20. The apparatus of claim 19, further comprising:
means for detecting content in a subset of fields from a plurality of fields of the first DCI in accordance with receiving the first DCI that excludes the resource assignment.

21. The apparatus of claim 19, further comprising:
means for detecting a bandwidth part identity in accordance with receiving the first DCI excludes the scheduling information, the bandwidth part identity indicating the second bandwidth part different from the first bandwidth part, wherein a timing value is associated with obtaining the one or more data transmissions via the second bandwidth part.

22. The apparatus of claim 21, further comprising:
mean for switching to operating in the second bandwidth part in accordance with the first DCI.

23. The apparatus of claim 21, wherein the bandwidth part identity indicates switching to operating in the second bandwidth part.

24. The apparatus of claim 21, wherein the first DCI comprises an indication of the timing value.

25. The apparatus of claim 19, further comprising:
means for transmitting a data transmission to the network device in accordance with the scheduling information for the one or more data transmissions.

26. A non-transitory computer-readable medium storing code for wireless communications at a user equipment (UE), the code comprising instructions executable by one or more processors to:
receive first downlink control information (DCI) that excludes a resource assignment from a network device while operating in a first bandwidth part, the first DCI comprising an indication to activate a second bandwidth part and an indication that a second DCI in a subsequent slot will comprise scheduling information for one or more data transmissions via the second bandwidth part; and
receive, in accordance with the first DCI and while operating in the second bandwidth part, the second DCI comprising the scheduling information for the one or more data transmissions.

27. The non-transitory computer-readable medium of claim 26, wherein the instructions are further executable by the one or more processors to:
detect content in a subset of fields from a plurality of fields of the first DCI based on receiving the first DCI that excludes the resource assignment.

28. The non-transitory computer-readable medium of claim 26, wherein the instructions are further executable by the one or more processors to:
detect a bandwidth part identity based on obtaining the first DCI that excludes the scheduling information, the bandwidth part identity indicating the second bandwidth part different from the first bandwidth part; and
obtain a timing value associated with the second bandwidth part.

29. The non-transitory computer-readable medium of claim 28, wherein the instructions are further executable by the one or more processors to:
switch to operating in the second bandwidth part in accordance with the first DCI.

30. The non-transitory computer-readable medium of claim 26, wherein the instruction are further executable by the one or more processors to:
transmit a data transmission to the network device in accordance with the scheduling information for the one or more data transmissions.

* * * * *